United States Patent
Weitzel et al.

(10) Patent No.: US 11,602,417 B2
(45) Date of Patent: Mar. 14, 2023

(54) DENTAL IMPLANT, INSERTION TOOL FOR DENTAL IMPLANT AND COMBINATION OF DENTAL IMPLANT AND INSERTION TOOL

(71) Applicant: NOBEL BIOCARE SERVICES AG, Kloten (CH)

(72) Inventors: Jorg Weitzel, Rielasingen-Worbligen (DE); Antony Quarry, Caslano (CH); Stephan Vonwiller, Winterthur (CH); Niki Pfister, Biel (CH); Edmund Burke, Niederbuchsiten (CH); Serif Ameti, Waltalingen (CH); David Sollberger, Glattpark (CH); Nicolai Bernhard, Winterthur (CH)

(73) Assignee: Nobel Biocare Services AG, Kloten (CH)

( * ) Notice: Subject to any disclaimer, the term of this patent is extended or adjusted under 35 U.S.C. 154(b) by 907 days.

(21) Appl. No.: 16/073,744

(22) PCT Filed: Jan. 30, 2017

(86) PCT No.: PCT/EP2017/051953
§ 371 (c)(1),
(2) Date: Jul. 27, 2018

(87) PCT Pub. No.: WO2017/129826
PCT Pub. Date: Aug. 3, 2017

(65) Prior Publication Data
US 2019/0008614 A1 Jan. 10, 2019

(30) Foreign Application Priority Data
Dec. 22, 2016 (EP) .................................... 16206385

(51) Int. Cl.
*A61C 8/00* (2006.01)

(52) U.S. Cl.
CPC .............. *A61C 8/0089* (2013.01); *A61C 8/00* (2013.01); *A61C 8/0018* (2013.01);
(Continued)

(58) Field of Classification Search
CPC ....... A61C 8/0089; A61C 8/00; A61C 8/0018; A61C 8/0022; A61C 8/0024; A61C 8/0037; A61C 8/0039
See application file for complete search history.

(56) References Cited

U.S. PATENT DOCUMENTS

| | | |
|---|---|---|
| 5,785,525 A | 7/1998 | Weissman |
| 5,902,109 A | 5/1999 | Reams, III et al. |

(Continued)

FOREIGN PATENT DOCUMENTS

| | | |
|---|---|---|
| DE | 102008063397 | 7/2010 |
| WO | WO 01/49199 A2 | 7/2001 |

(Continued)

OTHER PUBLICATIONS

International Search Report for Application No. PCT/EP2017/051953 dated Jul. 12, 2017 in 4 pages [the ISR for the PCT Application of this US national phase application].

(Continued)

*Primary Examiner* — Cris L. Rodriguez
*Assistant Examiner* — Drew S Folgmann
(74) *Attorney, Agent, or Firm* — Knobbe, Martens, Olson & Bear, LLP

(57) ABSTRACT

A dental implant (1), in particular for insertion into bone tissue of a patient, comprising: a core body (2) having an apical end (4), a coronal end (6), and an outer surface (8) extending along a longitudinal direction between said apical end (4) and said coronal end (6); and at least one thread (12) located on at least a threaded portion of said outer surface (8), should have superior properties regarding primary and secondary stability. According to the invention this is achieved in that the core body (2) comprises a core shaped zone (22), preferably next to said coronal end (6), in which core shaped zone (22) the cross-section of said core body (2) has a number of main directions in which the radius measuring the distance between the center (50) of the cross (Continued)

section and its outer contour takes a relative maximum value and thus a higher value than in neighboring orientations, a core circular zone (20), preferably next to said apical end (4), in which core circular zone (20) the cross-section of said core body (2) is basically circularly shaped, and, as seen in said longitudinal direction, a transition zone (26) positioned between said core shaped zone (22) and said core circular zone (20), in which transition zone (26) the geometry of the cross-section of said core body (2), as a function of a parameter characteristic for a coordinate in said longitudinal direction, changes continuously from a basically circular shape next to said core circular zone (20) to a shape in which the cross-section of said core body (2) corresponds to the shape of the cross section in said core shaped zone (32). The invention further relates to an insertion tool (200) for inserting a dental implant (1, 201, 401) into bone tissue of a patient. Moreover, the invention relates to a combination of such a dental implant (1, 201, 401) and such an insertion tool (200).

33 Claims, 35 Drawing Sheets

(52) U.S. Cl.
CPC .......... *A61C 8/0022* (2013.01); *A61C 8/0024* (2013.01); *A61C 8/0037* (2013.01); *A61C 8/0039* (2013.01)

(56) References Cited

U.S. PATENT DOCUMENTS

| | | |
|---|---|---|
| 7,179,088 B2 | 2/2007 | Schulter et al. |
| 2005/0019731 A1* | 1/2005 | Bjorn .................. A61C 8/0022 433/174 |
| 2005/0136380 A1 | 6/2005 | Niznick |
| 2007/0190491 A1 | 8/2007 | Blackbeard |
| 2012/0178049 A1 | 7/2012 | Holmstrom et al. |
| 2014/0329202 A1 | 11/2014 | Zahed |
| 2015/0044639 A1 | 2/2015 | Carlsson et al. |
| 2017/0049539 A1* | 2/2017 | Jacoby .................. A61C 8/006 |

FOREIGN PATENT DOCUMENTS

| | | |
|---|---|---|
| WO | WO 2005/117742 | 12/2005 |
| WO | WO 2012/007118 A1 | 1/2012 |
| WO | WO 2012/052480 | 4/2012 |
| WO | WO 2012/164560 | 12/2012 |
| WO | WO 2014/083614 A1 | 6/2014 |
| WO | WO 2015/010067 A1 | 1/2015 |
| WO | WO 2015/118543 A1 | 8/2015 |
| WO | WO 2015/125139 | 8/2015 |
| WO | WO 2015/125139 A2 | 8/2015 |

OTHER PUBLICATIONS

IPRP for Application No. PCT/EP2017/051953 dated Jul. 4, 2017 in 20 pages [the IPRP for the PCT Application of this US national phase application].
IPRP ($2^{nd}$) for Application No. PCT/EP2017/051953 completion date Jul. 20, 2018 in 48 pages [the IPRP for the PCT Application of the US national phase application].
Aug. 3, 2022 Decision rejecting the opposition from EU 17702602.8 (44 pgs).
Sep. 24, 2020 Notice of Opposition from EP 17702602.8 (328 pgs).
Feb. 11, 2021 Patent Owner's Response from EP 17702602.8 (43 pgs).
Dec. 22, 2021 Patent Owner's 2nd Response from EP 17702602.8 (91 pgs).
May 17, 2021 Response to Preliminary Opinion from EP 17702602.8 (70 pgs).
May 17, 2021 Preliminary Opinion from EP 17702602.8 (17 pgs).

\* cited by examiner

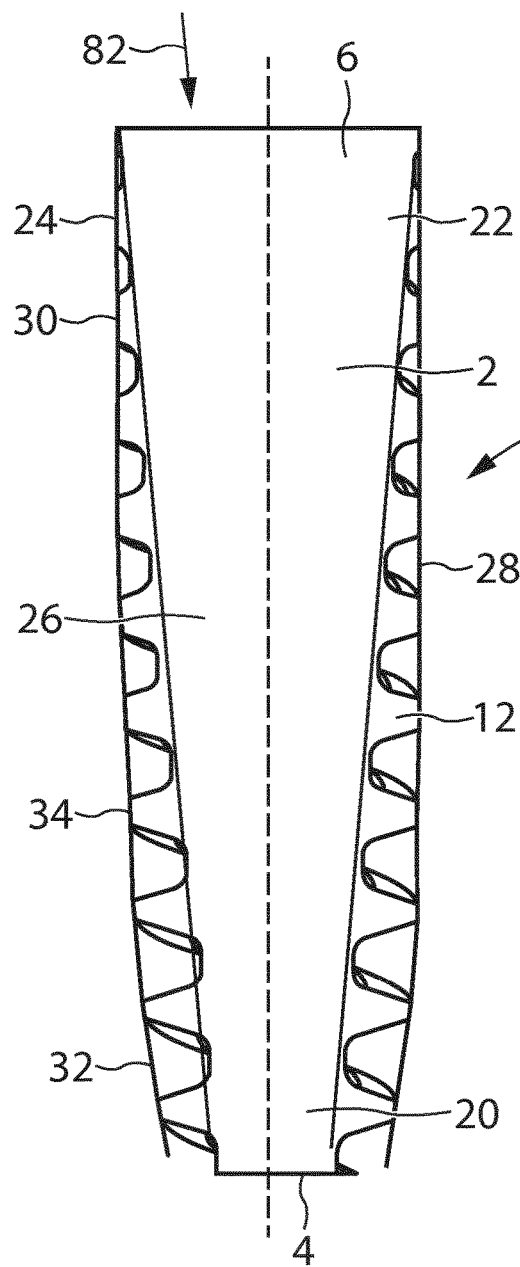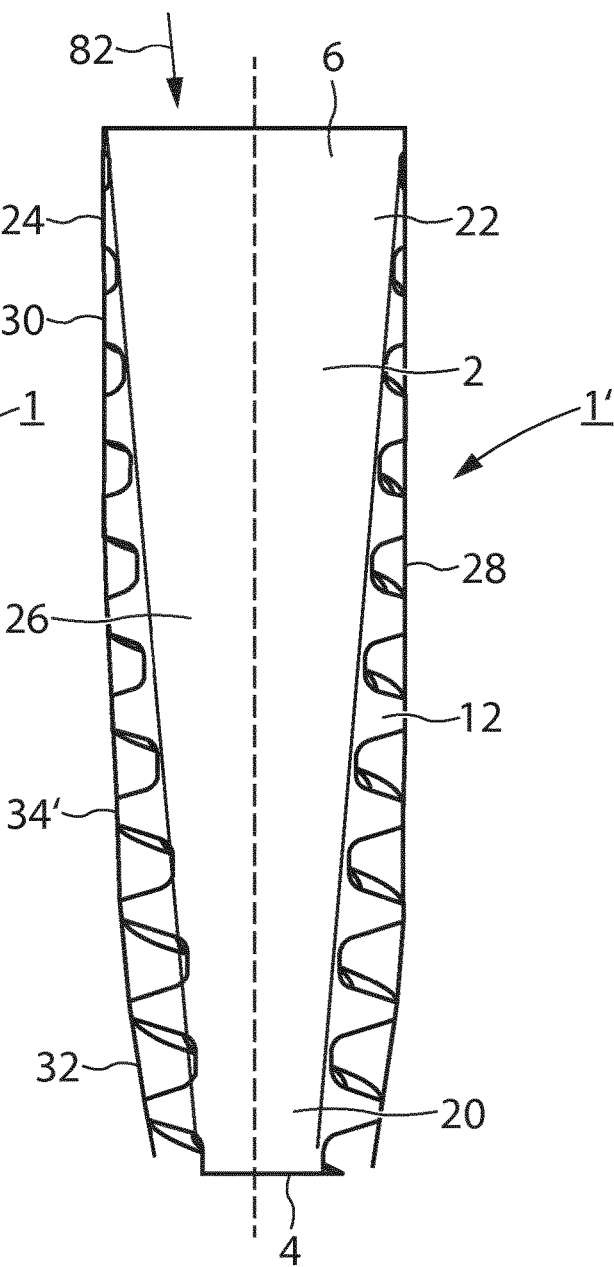

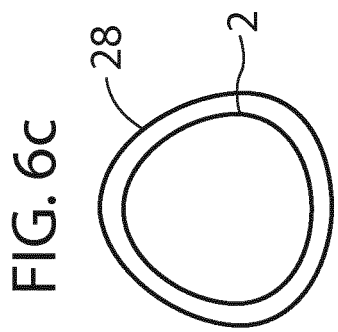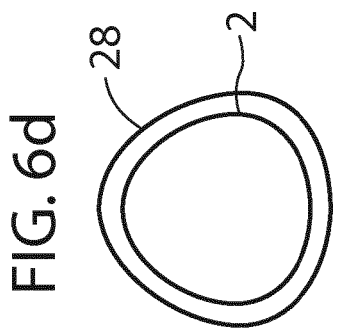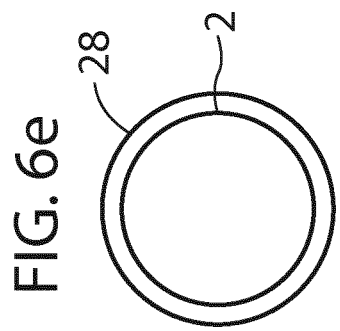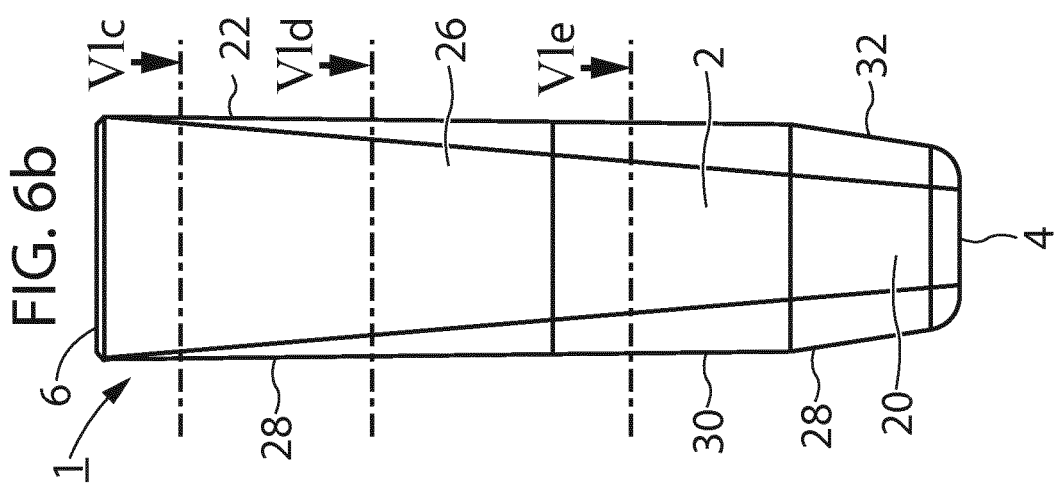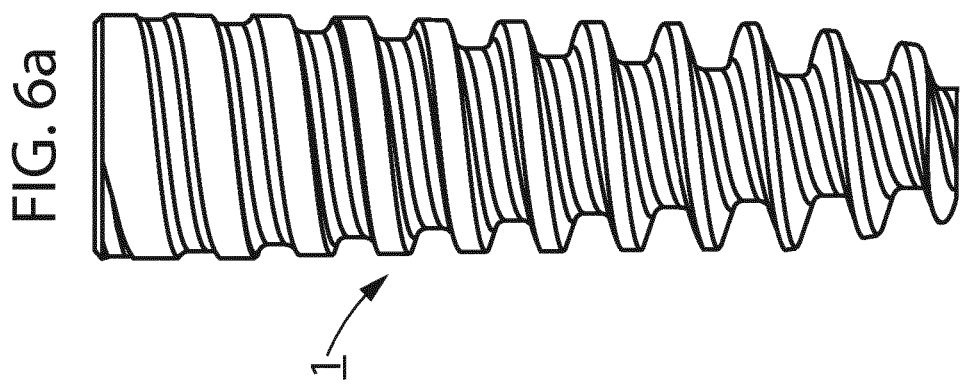

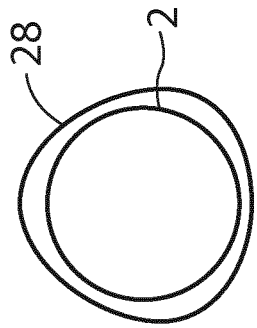
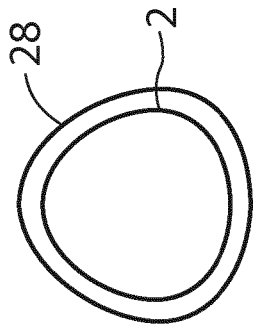
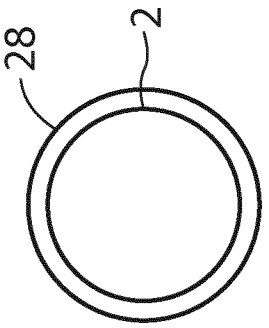
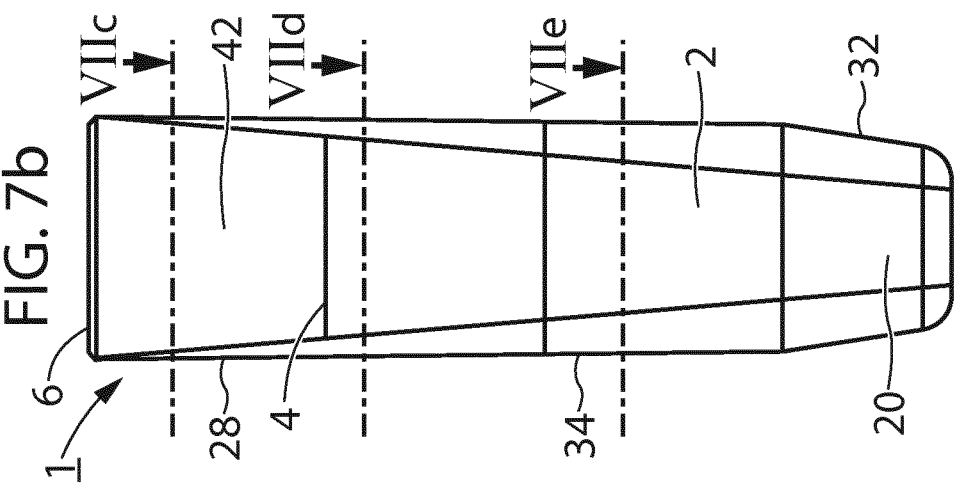
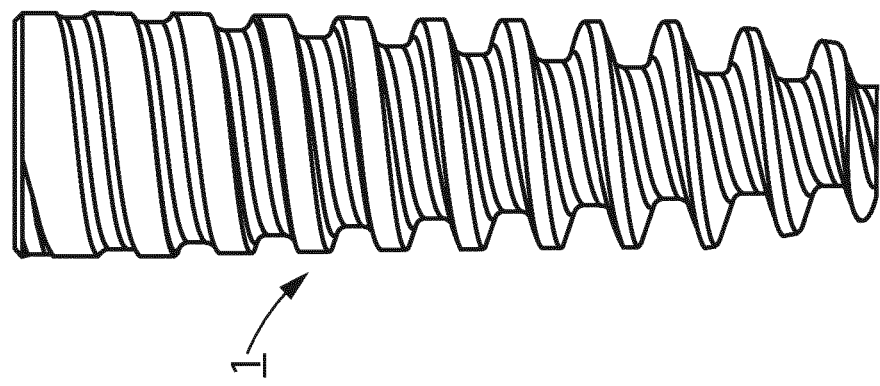

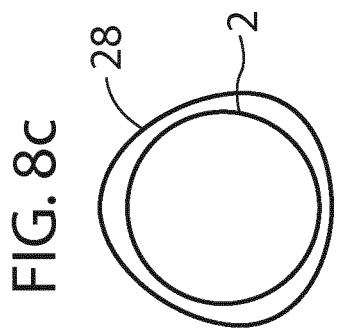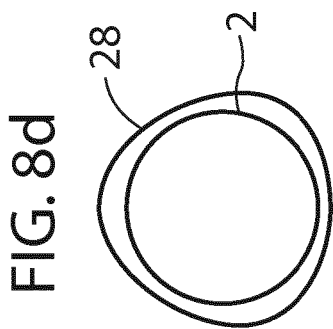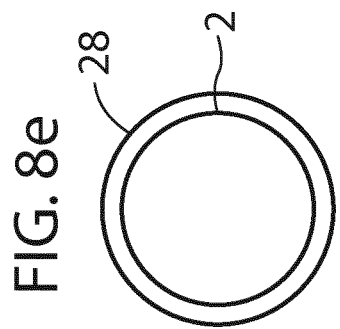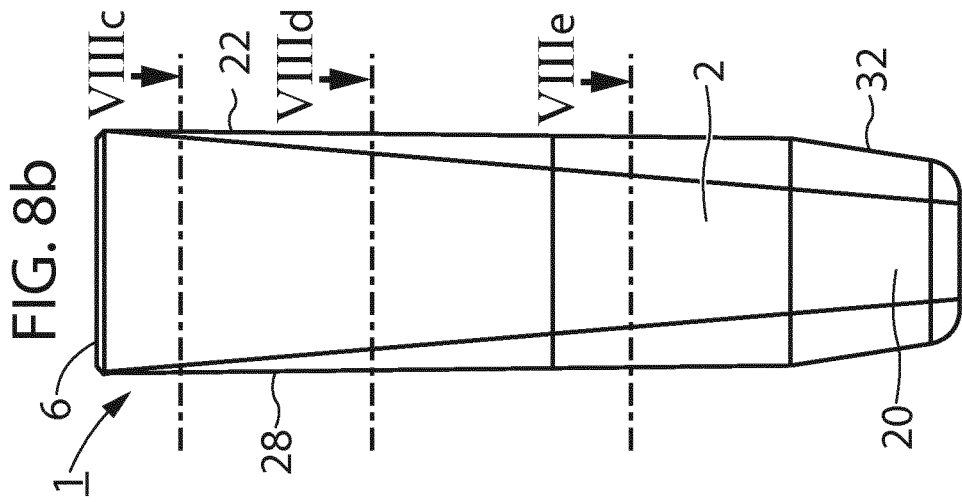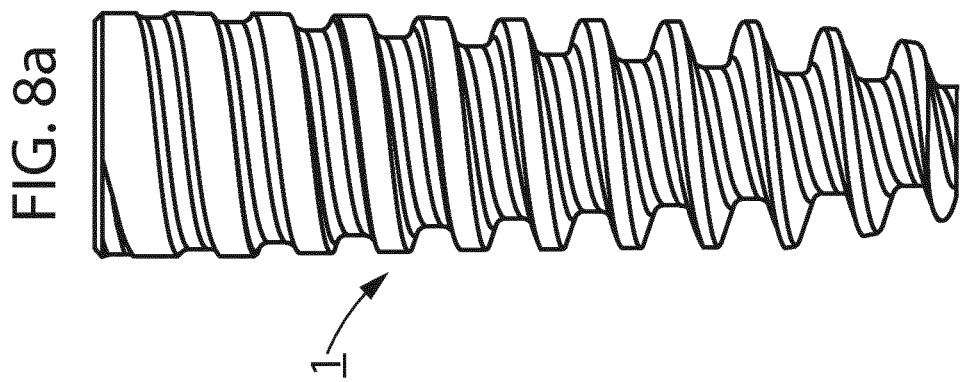

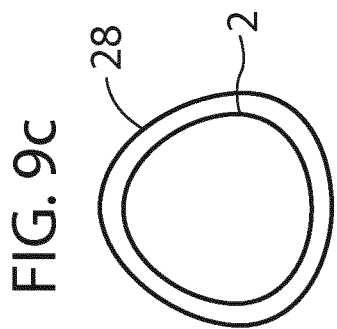
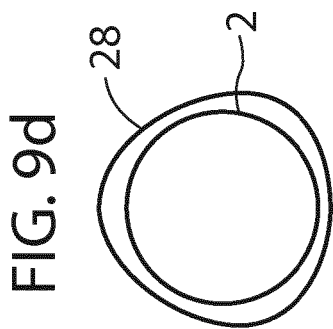
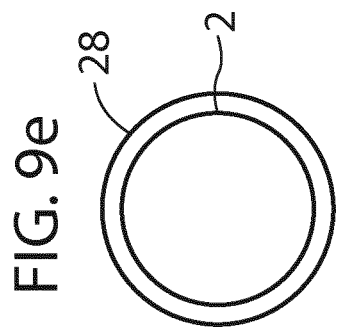
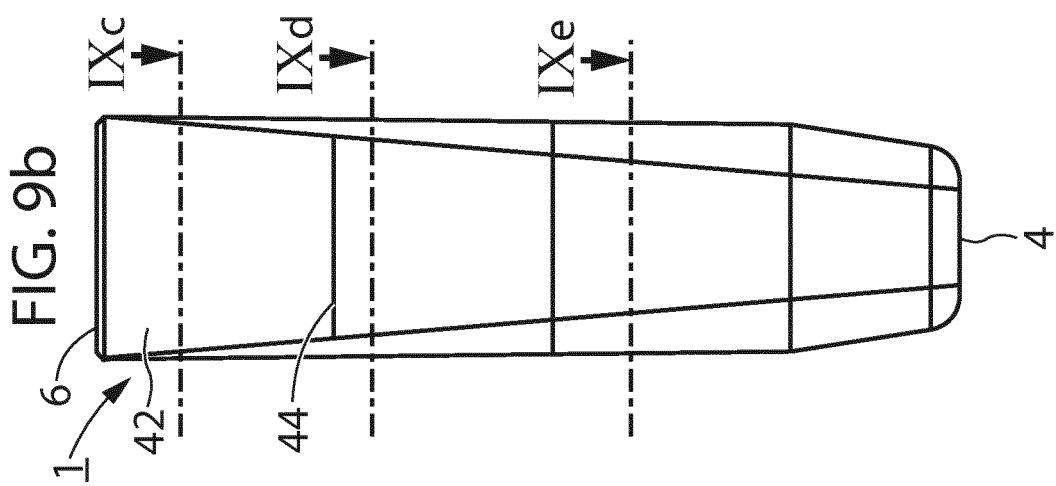
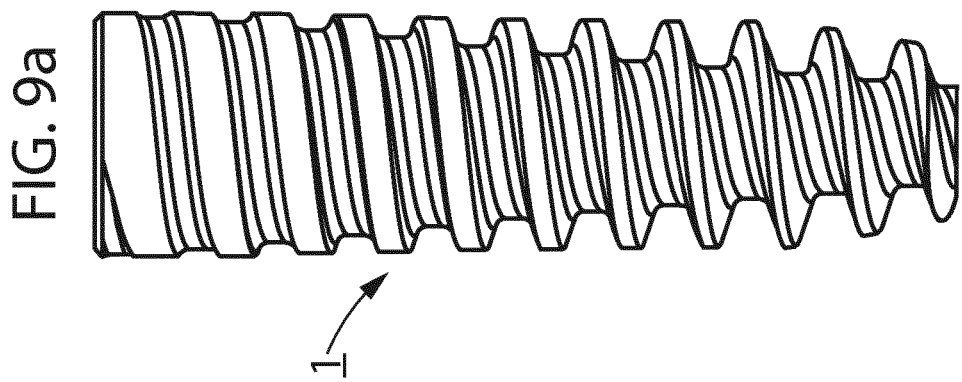

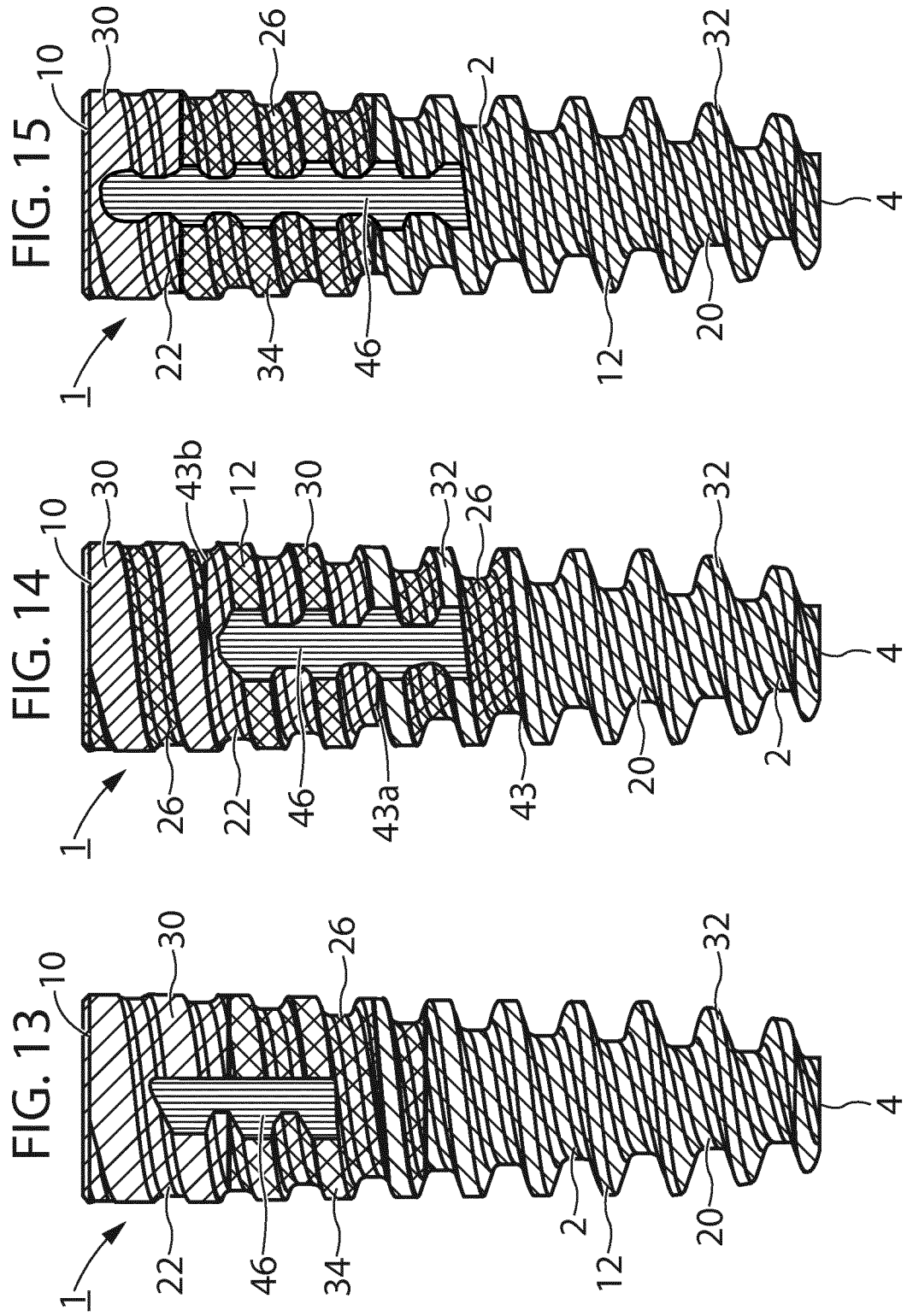

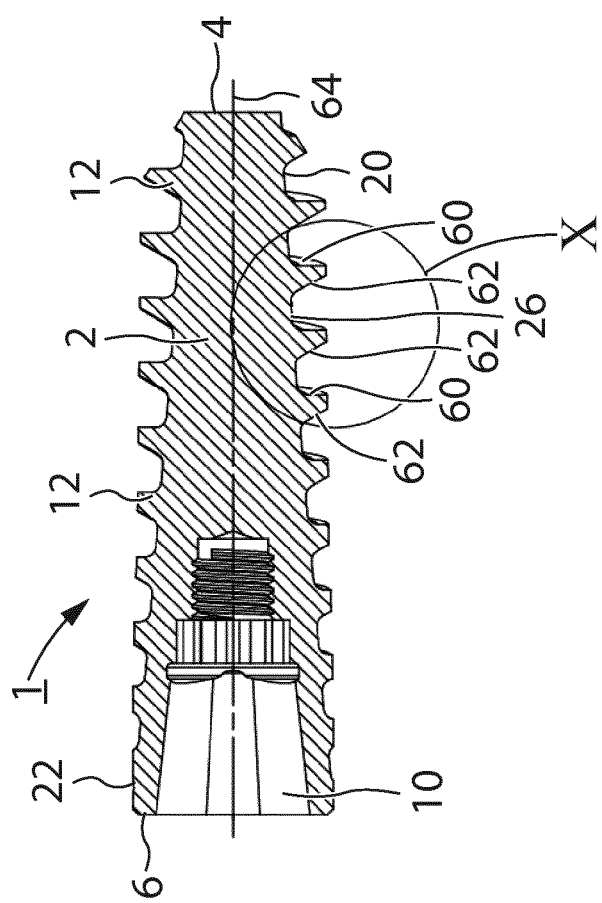

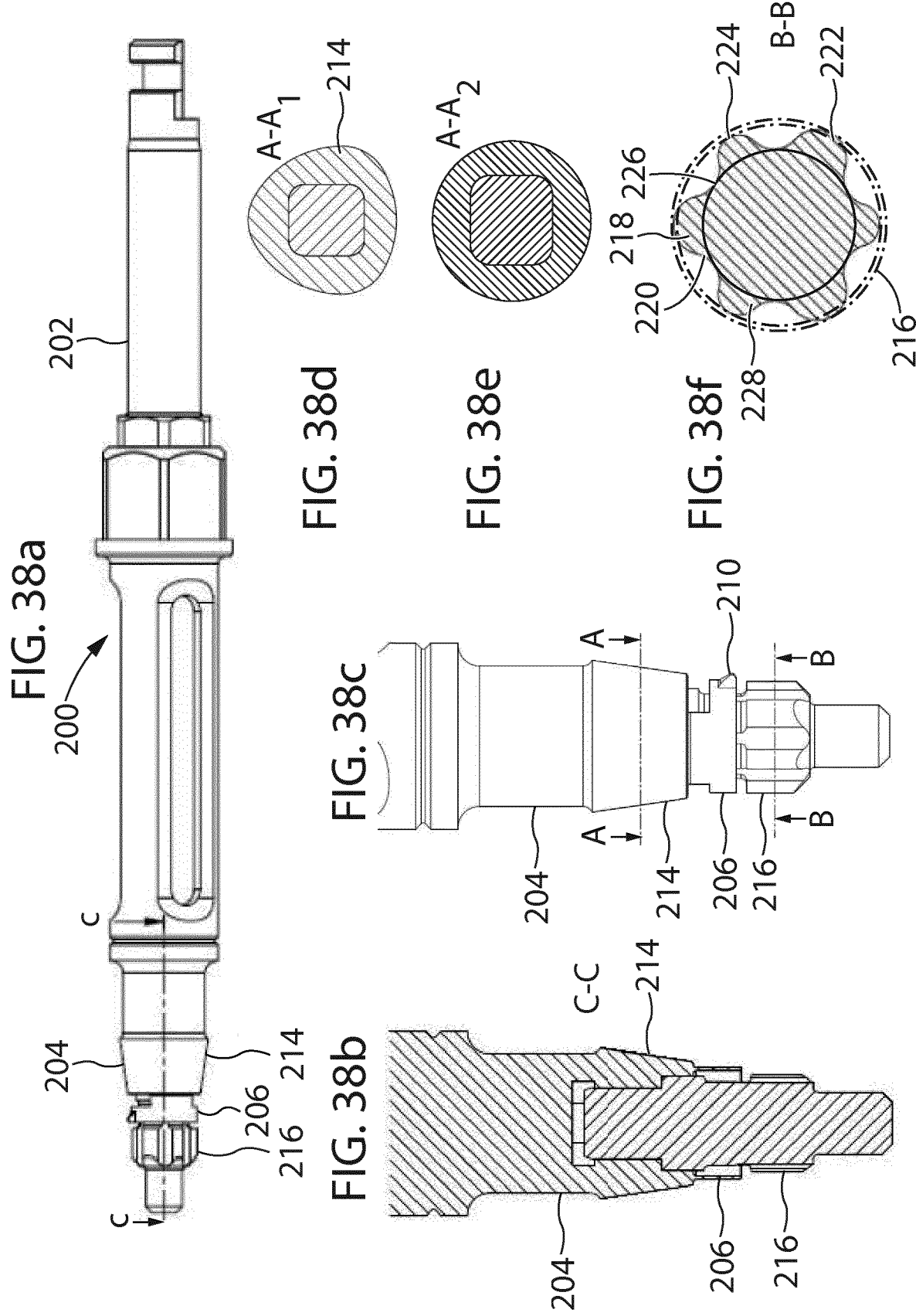

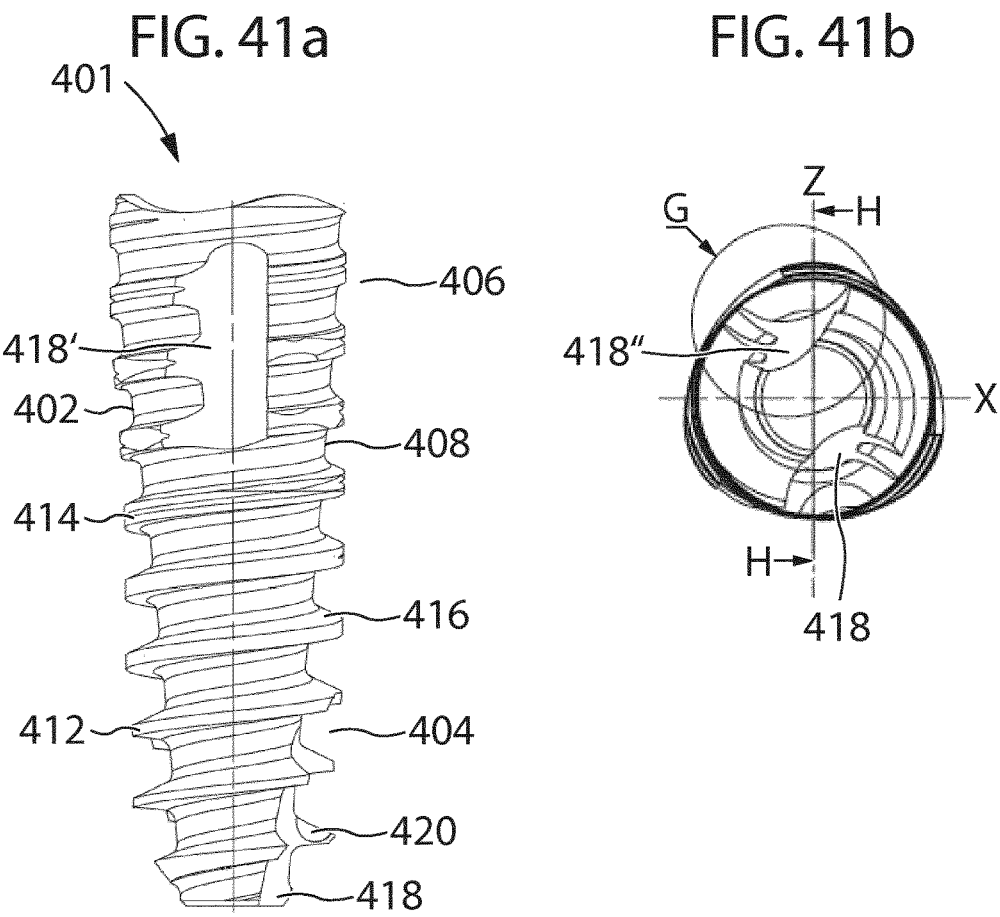
FIG. 41a
FIG. 41b
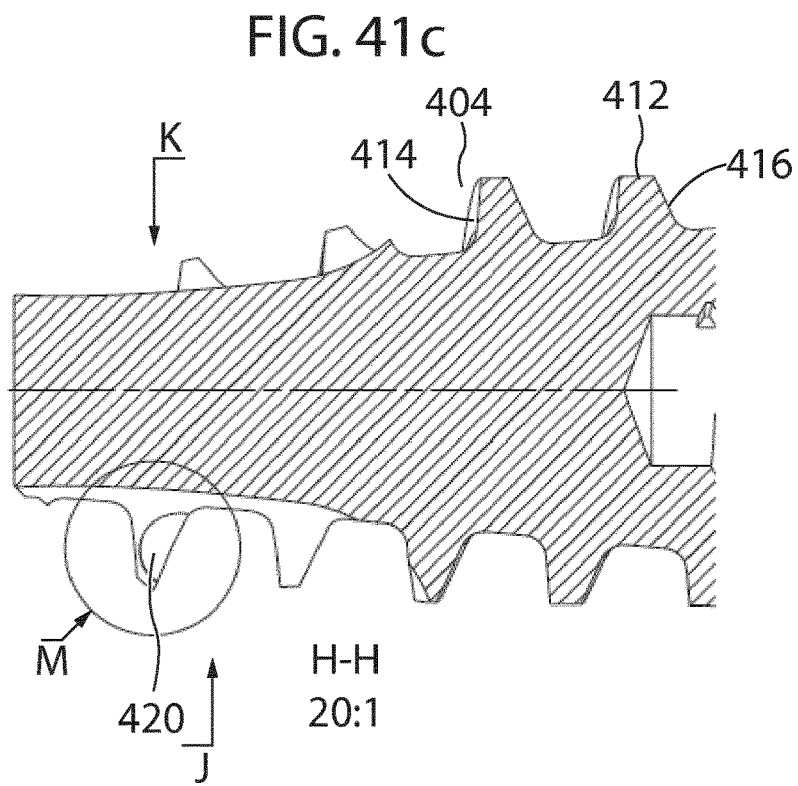
FIG. 41c

M
50:1

G
20:1

DENTAL IMPLANT, INSERTION TOOL FOR DENTAL IMPLANT AND COMBINATION OF DENTAL IMPLANT AND INSERTION TOOL

CROSS-REFERENCE TO RELATED APPLICATIONS

This application is a national stage application under 35 U.S.C. § 371 of International Application No. PCT/EP2017/051953, filed on Jan. 30, 2017, which published in English as WO 2017/129826 A9 on Aug. 3, 2017, and which claims priority benefit of EP Patent Application No. 16153466.4, filed on Jan. 29, 2016; EP Patent Application No. 16190958.5, filed on Sep. 27, 2016; and EP Patent Application No. 16206385.3, filed on Dec. 22, 2016.

TECHNICAL FIELD

The invention relates to a dental implant, in particular for insertion into bone tissue of a patient, comprising a core body having an apical end, a coronal end, and an outer surface extending along a longitudinal direction between said apical and said coronal end, and at least one thread located on at least a threaded portion of said outer surface and extending outwardly from said core body. The invention further relates to a dental implant, in particular for insertion into bone tissue of a patient, comprising a core body having an apical end and a coronal end, wherein the core body comprises a channel which is open to the coronal end and extends along the longitudinal direction of the implant from the coronal end towards the apical end. Moreover, the invention relates to an insertion tool for inserting a dental implant into bone tissue of a patient. Also, the invention relates to a combination of such an implant and such an insertion tool.

BACKGROUND ART

Dental implants are in widespread use in the reconstructive therapy to compensate for the loss of a tooth. They are usually inserted into the jawbone in the place of an extracted or shed tooth, in order to hold there, after a healing-in phase of approximately four to twelve weeks, a prosthetic part serving as a dental prosthesis or a crown. For this purpose, such a dental implant is usually configured as an appropriately shaped metallic body inserted into the jawbone or bone tissue by screwing-in, in the intended place. As a rule, the apical end of the dental implant includes a screw thread, in most cases a self-cutting screw thread, with which the dental implant is inserted into the correspondingly prepared implant bed.

Dental implants may be configured in a one-piece design, in which the dental prosthesis is attached directly to the implant after its insertion into the jaw bone. In an alternative, in particular in order to facilitate the insertion into the patient's mouth and in particular to enable a particularly extensive preparation of the prosthesis before its being fixed on the implant already prior to the patient's treatment, for example in a dental laboratory, dental-implant systems also can be of a multi-part configuration. In particular, a generally two-part construction can be provided, the dental-implant system comprising a first implant part, also referred to as the actual implant or post part, provided for being inserted into the jawbone, and in addition to this, a second implant part associated therewith, also referred to as mounting-part piece or abutment, on which, in turn, the dental prosthetic piece provided as a prosthesis or the like can be mounted.

The outer surface of the actual implant or post part is usually provided with a thread, which can be designed as a self-cutting thread or else as a not self-cutting thread. The implant or post part is usually anchored in a correspondingly prepared implant bed of the jawbone. The construction of the thread provided in the external area of the dental implant is usually configured for a high primary stability of the arrangement and a uniform forwarding of the forces arising under the chewing load of the dental implant into the jawbone.

For this purpose, in particular for a high primary stability after insertion of the implant into the bone tissue, various approaches for configuring the thread and the implant body are known from the prior art. Various thread geometries and combinations thereof, for example forming different thread types or threads of different thread parameters in different zones of the implant body, may be provided. From WO 2008/128757 A2, an implant of the above-mentioned type is known featuring additional helical grooves on the outer surface of the respective thread and/or directly on the implant body between two adjacent threads. In other systems, a compression type thread may be provided, featuring narrow grooves. High primary stability can also be achieved by undersizing the hole drilled into the patient's bone at the site provided for the implant, such that when the implant is screwed in the core body of the implant together with the threads provided thereon compress the surrounding bone material. However, too strong compression may make the blood vessels in the bone collapse, thereby hindering the bone to heal after the insertion.

Another widespread objective for the specific design of the implant and the thread provided thereon is the so called secondary stability or osseointegration, which is the regeneration of bone material in direct contact to the implant surface.

US 2007/0190491 A1 discloses an implant design with a non-round cross sectional geometry of the implant body. For this design, it has been recognized that most natural teeth also are non-round in cross section, and therefore a similar cross sectional structure of the implant body is assumed to match the natural position of the blood vessels in the bone tissue better, therefore supporting a good and fast osseointegration.

Dental implants, such as those described above, are commonly inserted into bone tissue of a patient by means of an insertion tool, e.g., an implant driver. For this purpose, a distal portion of the insertion tool is introduced into a socket provided in a coronal portion of the implant. This distal portion cooperates with the implant socket so that, upon rotation of the insertion tool about its longitudinal axis, the implant is screwed into the bone tissue.

In order to achieve a reliable and accurate placement of the implant in the bone tissue, the insertion tool has to be properly seated, i.e., fully engaged, in the implant.

Any misfits or misalignments between the insertion tool and the dental implant may render the insertion of the implant into the bone tissue complicated and cause the risk of improper placement of the implant.

Moreover, the insertion tool may be used to pick up the implant and transport it to the implantation site where it is to be inserted into the bone tissue. In this case, if misfits or misalignments between tool and implant arise, the implant may drop off from the insertion tool before it has reached the desired location. Such occurrences can even pose significant risks to the health of the patient if the implant is swallowed or aspirated.

In order to achieve a friction fit between insertion tool and implant, U.S. Pat. No. 7,131,840 B2 teaches the use of an O-ring at the distal portion of an implant driver. However, the configuration taught in this document does not allow a clinician to reliably assess whether insertion tool and implant are properly engaged with each other.

Another approach for improving connection between insertion and implant is disclosed in U.S. Pat. No. 8,864,494 B2, using a holding piece for connecting the insertion tool to the implant. After the implant has been inserted into bone tissue, the holding piece has to be removed from the implant. This approach thus necessitates the use of an additional dental component in the form of the holding piece and requires additional steps from the clinician, thus rendering the implant insertion process complicated and cumbersome.

Hence, there remains a need for a reliable, efficient and simple approach for attaching an insertion tool, such as an implant driver, to a dental implant, which provides a clear indication of whether the insertion tool and the dental implant are properly attached to each other.

Moreover, there remains a need for an insertion tool which allows for the reliable insertion of an implant into bone tissue, while minimising the risk of damage to or breakage of the implant, in particular, a socket thereof.

Also, there remains a need for a dental implant which allows for the reliable insertion thereof into bone tissue, while minimising the risk of damage to or breakage of the implant, in particular, a socket or channel thereof.

As has been detailed above, a dental implant is usually inserted into the jawbone or bone tissue of a patient by screwing-in, in the intended place. For this purpose, the apical end of the dental implant includes a screw thread, in most cases a self-cutting screw thread, with which the dental implant is inserted into the correspondingly prepared implant bed.

The screw thread plays an important role for the reliable and accurate placement and engagement of the implant in the jawbone or bone tissue. In particular, the screw thread has to allow for a smooth and precise insertion of the implant into the jawbone or bone tissue and ensure a stable engagement of the implant with the jawbone or bone tissue after insertion.

For this purpose, WO 2016/125171 A1 teaches the use of a threaded dental implant in which an apical surface of the thread has an apical surface recess extending proximally towards a coronal surface of the thread. However, the configuration disclosed in this document provides an improvement in implant placement and stability only for a limited range of thread angles, i.e., thread angles of more than approximately 15°.

Hence, there remains a need for a dental implant which allows for a reliable and accurate placement and engagement thereof in a jawbone or bone tissue for a wide variety of implant thread angles, in particular, small thread angles.

SUMMARY OF THE INVENTION

In view of these aspects as explained above, it is an object of the invention to provide a dental implant of the above-mentioned type with even superior properties regarding primary and secondary stability. It is a further object of the present invention to provide a dental implant which allows for the reliable insertion thereof into a jawbone or bone tissue, while minimising the risk of damage to or breakage of the implant, in particular, a socket or channel thereof. Moreover, the invention aims to provide a dental implant which allows for a reliable and accurate placement and engagement thereof in a jawbone or bone tissue for a wide variety of implant thread angles, in particular, small implant thread angles.

Further, it is an object of the present invention to provide an insertion tool for inserting a dental implant into bone tissue of a patient which efficiently provides reliable indication of whether the insertion tool and the dental implant are properly attached to each other. Also, the invention aims to provide an insertion tool for inserting a dental implant into bone tissue of a patient which enables reliable insertion, while minimising the risk of damage to or breakage of the implant, in particular, a socket or channel thereof. The invention also offers a combination of such an insertion tool and a dental implant.

These goals are achieved by a dental implant with the technical features of claim 1, by a dental implant with the technical features of claim 4, by a dental implant with the technical features of claim 8, by a dental implant with the technical features of claim 8, by a dental implant with the technical features of claim 24, by a dental implant with the technical features of claim 32, by an insertion tool with the technical features of claim 41, by an insertion tool with the technical features of claim 42, by an insertion tool with the technical features of claim 43 and by a combination with the technical features of claim 54. Preferred embodiments of the invention follow from the dependent claims.

According to the invention, in an embodiment this object is achieved by a dental implant (1), in particular for insertion into bone tissue of a patient, comprising:

a core body (2) having an apical end (4), a coronal end (6), and an outer surface (8) extending along a longitudinal direction between said apical end (4) and said coronal end (6);

at least one thread (12) extending outwardly from said core body (2), and a characteristic implant volume defined by said core body (2) or by the thread outer volume (28) as defined by said thread (12), in which for each value of a parameter characteristic for a coordinate in the implant's longitudinal direction the cross section of said characteristic implant volume is characterized by an eccentricity parameter defined as the ratio of the maximum distance of the contour of this cross section from its center to the minimum distance of the contour of this cross section from its center;

wherein said characteristic volume comprises at least one coronal zone in which said eccentricity parameter has a maximum, preferably a constant, value, said coronal zone extending along the implant's longitudinal axis over a coronal zone length of at least 10% of the total length of the implant;

at least one apical zone in which said eccentricity parameter has a minimum, preferably a constant, value, said apical zone extending along the implant's longitudinal axis over an apical zone length of at least 30% of the total length of the implant, and at least one transition zone positioned between said coronal zone and said apical zone in which said eccentricity parameter, as a function of a parameter characteristic for a coordinate in said longitudinal direction, changes continuously, preferably in a linear manner, from a minimum value next to said apical zone to a maximum value next to said coronal zone, said transition zone extending along the implant's longitudinal axis over a transition zone length of at least 10% of the total length of the implant.

In other words, in this embodiment the implant as defined either by its core body or by its thread outer volume comprises at least three functional sectors, each of which has a certain minimal functional length in order to provide its assigned functionality. The first of these functional zones or sectors is a coronal zone in which the core body and/or the thread outer volume has a certain eccentricity in its geometry, providing a number of maxima and minima for the radius as seen in the cross section. The second functional zone or sector is an apical zone in which the core body and/or the thread outer volume has a minimum eccentricity, preferably even an approximately circular cross section. The third functional zone, positioned between the first and the second zone, is a transition zone providing for a smooth transition of the eccentricity (and therefore cross sectional symmetry) over its length between the first and the second zone. By this design, due to the low-eccentricity, preferably even circular, cross section of the implant at its apical end, smooth and easy insertion of the implant into the bone material is supported, whereas in the final stages of insertion, when the implant is already deeply anchored in the bone material, the relatively highly eccentric coronal zone of the implant due to its eccentricity provides for alternating compression and relaxation phases in the surrounding bone material upon being screwed in. The transition zone, in turn, provides for a highly desirable smooth transition and therefore, upon insertion, a smooth increase of the alternating compression/relaxation phases in the bone material.

In a preferred embodiment, in its eccentric parts the implant is designed for a particularly smooth pulsation between compression and relaxation phases in the bone material upon being screwed in. For this purpose, in the preferred embodiment in said coronal zone and/or in said shaped zone and/or in said transition zone the cross-section of said characteristic implant volume has a number of main directions in which the radius measuring the distance between the center of the cross section and its outer contour takes a relative maximum value and thus a higher value than in neighboring orientations.

According to the invention, in an embodiment this object is achieved by a design in which the core body of the implant comprises at least a first core zone, in particular designed in the way of a shaped core zone, in which first core zone the cross-section of the core body has a number of main directions in which the radius measuring the distance between the center of the cross section and its outer contour takes a relative maximum value and thus a higher value than in neighbouring orientations. In addition, in this embodiment the core body comprises a second core zone, in particular a circular core zone, in which second zone the cross-section of said core body is basically circularly shaped, and a transition zone positioned, as seen in longitudinal direction of the implant, between said first, shaped zone and said second, circular zone, in which transition zone the geometry of the cross-section of said core body, as a function of a parameter characteristic for a coordinate in the longitudinal direction, changes from a basically circular shape next to said second, circular zone to a shape in which the cross-section of said core body, in particular with respect to the general geometry of the cross section and/or the values of its characterizing parameters, corresponds to the shape of the cross section in said first or shaped zone.

In other words, the dental implant according to the invention comprises a circular zone with circular or basically circular cross section, which in a preferred embodiment is positioned close to or neighboring the apical end of the implant. In this context and also for the context mentioned below, "basically circular" defines a shape approximating the circular shape to a high degree, allowing for minimal distortions or deviations, e. g. slight eccentricity, due to manufacturing tolerances or the like. This circular zone due to its circular cross section allows for a comparatively easy engagement of the thread with the bone material without exerting too much stress to the bone tissue during the first moments when the implant is screwed into the bone material. In contrast, in another zone of the implant, in a preferred embodiment positioned closer to the center region of the implant or even in the vicinity of the other end of the implant, the core body is designed with a non-round cross section featuring a number of lobes or local maxima of the radius. In this region, when the implant body is screwed into the bone tissue, the compression force exerted on the bone tissue varies in an oscillatory manner between maximal compression when (due to the rotational movement of the implant body) the local radius of the cross section becomes maximal, and minimal compression when the local radius of the cross section becomes minimal. In particular in the crestal zone, featuring comparatively hard bone tissue, after the insertion this shaped contour featuring local minimas will result in areas of low bone stress in the vicinity of the minima, thereby allowing for enhanced regeneration of the bone material and significantly minimizing the negative effects of overstrong compression to the blood vessels.

In order to allow for a smooth and beneficial transition between two different of these zones, the implant according to the invention provides an additional zone of the core body, located between a pair of one circular zone and one non-circular zone. This transitional zone is provided with transient cross section, changing (as seen in longitudinal direction) from circular cross section matching the cross section of the respective circular zone in the range close to the respective circular zone to a non-round, lobed cross section matching the cross section of the respective zone of non-round cross-section in the range close to this zone. Due to this transition zone, immediate and sudden changes in geometry, shearing effects to the bone tissue and other damaging effects to the bone tissue may be avoided.

In combination and in particular in the preferred embodiment in which the circular zone is positioned close to or neighboring the apical end of the implant, the implant therefore provides for relatively easy engagement of the thread with the bone tissue in the first phase of screwing in with oscillating compression effects on the bone tissue at a later stage.

In an alternative embodiment of the invention, similar or equivalent effects can be achieved by a design of the core body in which the transition between the circular zone and the shaped zone is effected in a step-wise manner. This alternative embodiment is considered inventive as such and may be used in accordance with the invention separate from the first embodiment or in combination therewith.

In this alternative embodiment of the invention, the object identified above is achieved by a design in which the core body of the implant comprises at least a first shaped core zone, in which first shaped core zone the cross-section of the core body has a number of main directions in which the radius measuring the distance between the center of the cross section and its outer contour takes a relative maximum value and thus a higher value than in neighbouring orientations. In addition, in this embodiment the core body comprises a second core zone, in particular a circular core zone, in which second zone the cross-section of said core body is basically circularly shaped, which in a preferred embodiment is positioned close to or neighboring the apical end of the implant, and a second core shaped zone, in which second core shaped zone the cross-section of the core body has a number of main directions in which the radius measuring the distance between the center of the cross section and its outer contour takes a relative maximum value and thus a higher value than in neighbouring orientations, wherein in said first core shaped zone a core eccentricity parameter defined as the ratio of the maximum radius of the cross section of said core body to its minimum radius is larger than in said second core shaped zone. In other words, in this embodiment the transition from basically circular or round geometry to shaped or non-round geometry can be effected in a step-wise manner by providing two or more non-round, shaped zones with different eccentricity parameters.

In yet another alternative embodiment of the invention, similar or equivalent effects can be achieved by a design of the outer contour of the thread analogous to the design of one or both of the embodiments as described above for the core. This alternative embodiment is considered inventive as such and may be used in accordance with the invention separate from the first embodiments or in combination therewith.

In particular for the purpose of explanation, the outer contour of the thread can be described by the aid of an outer volume or envelope volume defined by the thread. In this alternative embodiment of the invention, the object identified above is achieved by a design in which the thread of the implant comprises a first thread zone, in particular designed in the way of a first thread shaped zone, in which first thread shaped zone the cross-section of the outer volume enveloping the thread has a number of main directions in which the radius measuring the distance between the center of the cross section and its outer contour takes a relative maximum value and thus a higher value than in neighbouring orientations. In addition, in this embodiment the thread comprises a thread circular zone, in a preferred embodiment positioned next to the apical end of the implant, in which thread circular zone the cross-section of said outer enveloping volume is basically circularly shaped, and, as seen in longitudinal direction of the implant, a transition zone positioned between said first shaped zone and said circular zone, in which transition zone the geometry of the cross-section of said outer volume enveloping the thread, as a function of a parameter characteristic for a coordinate in the longitudinal direction, changes from a basically circular shape next to said thread circular zone to a shape in which the cross-section of said enveloping volume, in particular with respect to the general geometry of the cross section and/or the values of its characterizing parameters, corresponds to the shape of the cross section in said first shaped zone. As an alternative or in addition, a step-wise transition by providing a second thread shaped zone with an eccentricity different from the first thread shaped zone may also be provided.

Advantageous embodiments of the invention are the subject matter of the dependent claims.

In a preferred embodiment, said first or shaped zone of the core body and/or of the thread is configured as a crestal platform zone and positioned next to the coronal end of the implant. In particular the crestal platform zone may be designed to be connected directly with the dental prosthesis, i.e. for a one-piece version of the implant, or with the abutment carrying the dental prosthesis, i.e. for a two- or multi-piece version of the implant. In a further preferred embodiment, which is considered an independent invention by itself, said shaped crestal platform zone provided by the core body and/or the outer contour of the thread, as seen in longitudinal direction of the implant, has a length of at least 2.5 mm, preferably at least 3 mm. As was found surprisingly, the shaped, non-round zone, as compared to a contour of circular shape, induces less or reduced stress in the bone tissue at the local minimas, resulting in less cell death and less bone remodelling after insertion of the implant, faster bone apposition and improved maintenance of critical bone structure, defined as the crestal plate, buccal wall, and lingual walls. In consequence, the regeneration of bone material and also osseointegration is significantly improved by providing the local minima of the shaped zone in the area of the critical bone structure, and it is considered highly beneficial for the purpose of osseointegration to provide these effects for the top layer of at least 2.5 mm or even better at least 3 mm in the crestal plate.

The cross section of the core body and/or the outer volume enveloping the thread can be characterized by an eccentricity parameter characteristic for the deviation of the respective cross section from circular shape. For the purpose of this description and disclosure and in accordance with the present invention, this eccentricity parameter is defined as the ratio of the maximum radius of the cross section to its minimum radius, such that the eccentricity parameter adopts the value 1 for circular shape. This eccentricity parameter can be evaluated for each value of a parameter characteristic for a coordinate in said longitudinal direction, e.g. the implant longitudinal axis (y). In order to provide a particularly smooth transition between the tip end zone (=circular cross section, eccentricity parameter=1) and the first or shaped zone (=lobed or non-round cross section, eccentricity parameter>1), in a preferred embodiment the eccentricity parameter in said transition zone of the core body and/or the outer thread has a linear dependency on the coordinate parameter in longitudinal direction.

The main directions in the transition zone and/or in the first or shaped zone of the core body and/or of the thread, in which the respective radius of the cross section has a local maximum, in rotational direction may be positioned in accordance with a desired effect on the bone tissue, in particular with individually selected angles. In another preferred embodiment, however, they are positioned symmetrically with respect to the central longitudinal axis of said core body or said outer enveloping volume, respectively (axial symmetry). This design allows for a comparatively smooth and regular change in the degree of compression exerted on the surrounding bone tissue as a consequence of the screwing in process.

In an embodiment considered particularly preferable, the outer profile of the implant—as defined by the outer contour or enveloping volume of the thread—with respect to the longitudinal central axis of said core body and with respect to local maxima or minima matches the outer contour of said core body. In other words: in this preferred embodiment, in those orientations with respect to the longitudinal axis in which the radius of the core body has a local maximum, the outer contour of the outer volume enveloping the thread adopts a local maximum as well. This matching of the contours may be effected by an overlap of the respective main directions within a tolerance range of preferably +/−20°, and in a preferred embodiment may be exact. The "matching" design has the particular advantage that, while inserting the implant into the bone tissue, the bone condenses and relaxes in accordance with the outer geometry of the implant both on the outer surface of the core body and on the outer surface of the thread. The relaxation of the bone tissue on the minimum radii between the main directions (both on the outer surface of the core body and on the outer surface of the thread) allows for particularly high bone-to-implant contact and enhanced initial stability.

Advantageously, the number of main directions in the transition zone and/or in the shaped zone is three, i.e. the core body in the shaped zone and/or the transition zone has trioval cross section. In combination with the preferred embodiment of symmetrical positioning of the main directions with respect to the longitudinal direction, this triovality results in a rotational offset angle between two neighboring main directions of 120°.

The implant, due to its transition zone, is designed specifically for a smooth and beneficial transition (during the screwing in process) between first engagement of the thread in the bone tissue (in the circular zone) to the shaping and direct treatment of the bone tissue by varying compression (in the shaped zone, preferably in the crestal platform zone). The smooth transition between these zones can be improved further in a specifically advantageous embodiment in which the core body in the transition zone is conical or tapered, preferably with a cone/taper angle of between 1° and 12°, preferably between 4° and 8°. In a particularly preferred embodiment, the cone/taper angle is selected in accordance with the overall length and diameter of the implant.

Taking into account appropriate and convenient dimensions for the implant regarding the requirements in the bone environment, in a preferred embodiment, the transition zone, as seen in the longitudinal direction, starts at a distance of about 2 to 4 mm from the apical end of the implant. In other words, in an alternative or additional preferred embodiment, the positioning of the circular core and/or thread zone in the apical portion of the implant is considered highly beneficial in order to maximize the potential for high primary stability. This is beneficial in general, but also more specifically in extraction sockets, where immediate loading protocols could be preferred. In order to provide significant apical engagement, the circular zone, as seen in longitudinal direction of the implant, preferably has a length of at least 2.5 mm.

In addition to the geometrical design of the core body, in a particularly preferred embodiment the thread as such is also designed specifically in order to support reliable engagement with the bone tissue at high primary stability. For this purpose, the thread preferably is a flat thread. Even more advantageously, the free width of the flat thread, in dependence of a coordinate parameter in the longitudinal direction of the implant and starting from the apical end of the core body, is continuously increasing with increasing distance from said apical end. In this design, the thread in the region close to the apical end may feature a relatively sharp small outer width, thereby providing for high cutting ability when the thread enters the bone tissue.

With progressing screwing in of the implant (i.e. the implant entering the bone tissue further), at a given position in the bone tissue the width of the flat thread continuously increases, thereby continuously widening the respective local gap in the bone tissue and constantly enhancing the contact area between bone tissue and implant. A further improvement of the properties of the implant may be obtained by a supplemental modification of the thread profile in an alternative or additional preferred embodiment. In this modification, which also by itself is considered inventive, in particular considered an independent invention, the thread preferably has a profile with an apical face and with a coronal face, in which the apical face is oriented basically orthogonal to the longitudinal axis of the implant, i.e. the plane normal of the apical face is oriented basically parallel to the longitudinal axis of the implant. By this design a reliable contact of the apical face with the surrounding bone material can be maintained even if—as a consequence of the non-round outer contour—the lateral extension of the apical face of the thread varies between minimum and maximum radius. In this embodiment, the orientation of the coronal face is preferably chosen in accordance with the demands of the surrounding bone structure. Preferably, it is oriented at an angle, preferably of about 60°, to the longitudinal axis, i.e. the plane normal of the crestal face is oriented at an angle, preferably of about 30°, to the longitudinal axis of the implant, the thread in total thereby forming a buttress thread. Due to this inventive geometry, in particular the orientation of the apical face, the apical face can absorb the load of the biting forces very efficiently. The crestal face, in turn, in this geometry provides a comparatively small and sharp free edge, improving the process of cutting the bone, and a relatively broad and large base for a stronger thread and providing compression as the implant is inserted.

In particular, this design of the profile of the thread is beneficial in combination with the shape of the cross section of the outer contour of the core body and/or the outer volume enveloping the thread. This shaped contour, in particular a trioval cross section, generates an oscillation effect in bone compression in longitudinal direction of the implant when the implant is screwed into the bone material, the effects of which may be limited or decreased by using the orientation of the apical face.

In an alternative or additional preferred embodiment, a number of cutting flutes, preferably equal to the number of main directions, is provided in the transition zone and/or in the shaped zone of the implant. These cutting flutes allow for enhanced cutting abilities of the implant body during screwing in. Preferably, these cutting flutes are positioned symmetrically with respect to the central longitudinal axis of the core body. In particular, in an embodiment which is considered an independent invention and which according to the invention may also be used to improve other cutting flute systems, each cutting flute, as seen in orientational direction around the central longitudinal axis of the core body, is positioned at a given rotational offset to a neighboring main direction.

Preferably, the cutting flutes in orientational direction are positioned in relation to the neighboring main direction of the core body and/or outer thread under the consideration that upon screwing in of the implant, the local maximum associated with the main direction will result in maximum compression of the bone material, while the relaxation after the maximum has passed will allow the bone material to flow back towards the central axis of the implant to some degree. This relaxation according to this aspect of the invention is used to selectively improve the cutting effect of the cutting flutes. Preferably, the location of the cutting flutes relative to the local maxima is such that a normalization effect of the bone is achieved. In other words: by positioning the cutting flutes in rotational direction such that the relaxing bone material is engaged by the cutting flute with particularly high efficiency when cutting hard bone, but not in the case of soft bone, thus preserving the implant stability in softer bone qualities.

In a preferred, inventive embodiment, this is achieved by positioning the cutting flutes at an offset angle $\alpha$ with respect to the respective main directions. In this embodiment, the angle $\alpha$ is chosen in accordance with a selection criterion which by itself is considered an independent invention. According to this selection criterion, the cutting edge 48 should be positioned such that the cutting edge radius as defined by the outer limit of the radial extension of the cutting edge from the longitudinal axis of the implant is between 20 and 75 µm less than the maximum radius in the corresponding main direction. This criterion takes into account the specific elastic properties of the bone which depending on its density rebounds or relaxes by about this amount after compression. In the preferred embodiment, the cutting edge radius is chosen to be about 35 µm less than the maximum radius, which in accordance with the remaining geometry parameters of the core body converts into a preferred offset angle α of about 106°. In regard of typical properties of bone tissue and typical dimensions and rotation speeds when screwing the implant into the jaw bone, the rotational offset of the positioning of the flutes with respect to the neighboring main direction preferably is from 80°–120°, in particular about 108°.

The advantages achieved with the invention consist in particular in that both a high primary stability as well as a high secondary stability can be achieved by the specific geometrical design. The implant according to the invention features a circular zone with basically circular cross section, for the core body and/or the thread, allowing for smooth engagement of the thread with the bone tissue at reduced tumbling or wobbling of the implant, in combination with a shaped zone with a non-round, preferably tri-oval, cross section allowing for sequentially compressing and relaxing the bone tissue and thereby helping to retain buccal bone at the crestal or coronal region. The transition zone and/or the additional shaped zone with differing eccentricity provided between these zones allows for a smooth transition, allowing the bone tissue to softly adapt to the compression effects and reducing friction and unwanted grinding or cutting of the bone.

According to an aspect of the invention, there is provided an insertion tool for inserting a dental implant, in particular, the dental implant according to the present invention, into bone tissue of a patient. The insertion tool comprises a proximal portion and a distal portion, the distal portion being for cooperation with the implant. The distal portion has a retention element and the retention element comprises an attachment portion for attaching the insertion tool to the dental implant. The retention element is elastically deformable at least in all directions perpendicular to the longitudinal direction of the insertion tool. The attachment portion comprises at least one projection extending in one or more directions substantially perpendicular to the longitudinal direction of the insertion tool.

The retention element may be integrally formed with or integrally attached to the insertion tool, e.g., a remainder of the insertion tool.

The entire retention element of the insertion tool is elastically deformable. The retention element is elastically deformable along its entire length. The length of the retention element extends along the longitudinal direction thereof, i.e., the axial direction thereof, that is, the longitudinal direction of the insertion tool, i.e., the direction from the proximal portion of the insertion tool towards the distal portion of the insertion tool.

The proximal portion of the insertion tool is the portion thereof which is closer to the clinician in use of the insertion tool. The distal portion of the insertion tool is the portion thereof which is closer to the implantation site in use of the insertion tool.

The distal portion of the insertion tool is for cooperation with the implant. In particular, the distal portion may cooperate with a corresponding part of the coronal portion of the implant, such as a socket. The distal portion may be, at least partly, introduced into the socket. The distal portion of the insertion tool cooperates with the implant, e.g., an implant socket, so that, upon rotation of the insertion tool about its longitudinal axis, the implant is screwed into the bone tissue. Due to the cooperation or interaction between the distal tool portion and the implant, a rotational force applied to the insertion tool about its longitudinal axis, e.g., manually or by using a motor, is transferred to the implant so as to screw the implant into the bone tissue.

The distal portion of the insertion tool may have a drive part as the part thereof which cooperates with the implant. The drive part may comprise or be an anti-rotational structure. The anti-rotational structure is configured to avoid relative rotation between the insertion tool and the implant, about the longitudinal axis of the tool, when tool and implant are engaged with each other, e.g., by, at least partly, introducing the distal portion of the tool into the implant socket. Thus, a rotational force applied to the insertion tool about its longitudinal axis is transferred to the implant. The anti-rotational structure of the insertion tool may have a cross-section, i.e., an outer cross-section, perpendicular to the longitudinal direction of the insertion tool which is not rotationally symmetric, e.g., which is non-circular. The anti-rotational structure of the distal portion of the insertion tool may cooperate with a corresponding anti-rotational structure of the implant. The anti-rotational structure of the implant may have a cross-section, e.g., an inner cross-section, perpendicular to a longitudinal direction of the implant which is not rotationally symmetric, e.g., which is non-circular. The cross-sections of the anti-rotational structures of the tool and the implant may be substantially the same or may have the same or a corresponding shape.

For example, the drive part of the distal portion of the insertion tool may be a drive region and/or a drive section, as will be further detailed below. The drive region and/or the drive section of the insertion tool may cooperate with a drive portion and/or a drive zone of the implant, respectively.

The entire retention element can thus be elastically deformed at least in or along all directions perpendicular to the longitudinal direction of the insertion tool, i.e., in or along all the transverse directions of the retention element, that is, all the radial directions of the retention element.

An elastic deformability of the remainder of the distal portion of the insertion tool in the directions perpendicular to the longitudinal direction of the insertion tool may be lower than that of the retention element. The remainder of the distal portion of the insertion tool may not be elastically deformable in the directions perpendicular to the longitudinal direction of the insertion tool.

The retention element may be integrally formed with or integrally attached to the insertion element, e.g., a remainder of the insertion tool. The retention element thus may form an integral part of the insertion tool.

The attachment portion of the retention element comprises at least one projection or protrusion extending from an outer surface of the remainder of the retention element in one or more directions substantially perpendicular to the longitudinal direction of the insertion tool.

The at least one projection or protrusion of the attachment portion is configured to be received in a corresponding cavity formed in a coronal portion of the dental implant.

The insertion tool is attached to the dental implant by attaching the attachment portion of the retention element to the dental implant.

When attaching the attachment portion of the retention element to the dental implant, the retention element is initially elastically deformed, i.e., elastically compressed, along the transverse directions, i.e., the radial directions, of the retention element and subsequently restored to its initial shape when the at least one projection or protrusion has been received in the corresponding cavity of the dental implant, due to the restoring force of the retention element. Hence, the attachment portion can be attached to the dental implant by snap fit in a reliable and efficient manner. The engagement of the at least one projection or protrusion of the attachment portion with the corresponding cavity of the dental implant provides an audible and/or tactile feedback to a user, such as a clinician or a technician, e.g., in a dental laboratory, providing a clear and unambiguous indication that the retention element, and thus also the insertion tool, is properly attached to the dental implant.

The whole retention element, rather than only a portion thereof, is elastically deformable along its transverse directions. In this way, a particularly high degree of flexibility of the retention element is achieved. Further, the entire retention element is elastically deformed upon attachment of the insertion tool to the dental implant, thus minimising the risk of wear or breakage of the retention element, even if the retention element is repeatedly engaged with and removed from different dental implants.

Therefore, the insertion tool of the invention provides a clear, reliable and efficient indication of whether the insertion tool is properly attached to the dental implant.

The retention element may be integrally formed with the insertion tool, e.g., a remainder of the insertion tool. Herein, the term "integrally formed" denotes that the retention element and the insertion tool, e.g., a remainder of the insertion tool, are formed in a one-piece configuration.

Forming the retention element and the insertion tool in a one-piece configuration allows for the insertion tool to be manufactured in a particularly simple and efficient manner, e.g., by injection moulding, milling, such as CNC milling, etc.

The retention element may be integrally attached to the insertion tool, e.g., a remainder of the insertion tool. Herein, the term "integrally attached" denotes that the retention element is attached to the insertion tool in such a manner that the retention element cannot be detached or separated from the insertion tool without damaging or destroying the retention element and/or the insertion tool.

If the retention element is integrally formed with or integrally attached to the insertion tool, a particularly robust and stable configuration of the insertion tool is achieved.

The retention element may have a substantially cylindrical shape, e.g., with a substantially circular cross-section perpendicular to the longitudinal direction of the insertion tool.

The at least one projection or protrusion of the attachment portion of the retention element extends in one or more directions substantially perpendicular to the longitudinal direction of the insertion tool, i.e., in one or more transverse directions thereof. In particular, the attachment portion may comprise at least one projection or protrusion which extends in plural transverse directions of the retention element, i.e., extends along a portion of the outer surface of the remainder of the retention element in the circumferential direction of the retention element. The at least one projection or protrusion may extend along 1% or more, 1.5% or more, 2% or more, 5% or more, 10% or more, 20% or more or 30% or more of the outer circumference of the remainder of the retention element.

The insertion tool may be made of, for example, a metal, such as stainless steel, a polymer or a composite material.

The retention element and a remainder of the insertion tool may be made from the same material or from different materials. If the retention element is made of a material which is different from that of the remainder of the insertion tool, the retention force provided by the retention element can be set in a particularly simple manner.

The retention element may have at least one portion extending from a distal end of the retention element to a proximal end of the retention element, the at least one portion being more flexible than the remainder of the retention element. This flexible portion of the retention element contributes to or even provides the elastic deformability of the retention element. Hence, the retention element can be configured in an elastically deformable manner in a simple and efficient way.

The at least one portion extending from the distal end of the retention element to the proximal end of the retention element may be made or formed of a material which is more flexible than a material of the remainder of the retention element. Alternatively or additionally, the at least one portion may have a configuration or structure with a higher degree of flexibility than the configuration or structure of the remainder of the retention element. For example, the at least one portion may be made more flexible by providing, for example, perforations, recesses, openings or the like therein. Also, e.g., the at least one portion may have a smaller thickness, i.e., wall thickness, than the remainder of the retention element.

The retention element may have two or more, three or more or four or more portions extending from the distal end of the retention element to the proximal end of the retention element, these portions being more flexible than the remainder of the retention element.

The retention element may have at least one cut-out or recessed portion extending from the distal end of the retention element to the proximal end of the retention element. The at least one cut-out or recessed portion contributes to or even provides the elastic deformability of the retention element. Forming the retention element with such an at least one cut-out or recessed portion provides a particularly flexible configuration of the retention element. Further, the retention element has an especially simple structure.

The retention element may be a hollow and/or tubular body, wherein the at least one cut-out or recessed portion penetrates an outer wall of the retention element. The retention element may have an open ring shape or open annular shape, i.e., the shape of a ring with an opening in the circumference thereof, or substantially a C-shape, in a cross-section perpendicular to the longitudinal direction of the retention element, i.e., the longitudinal direction of the insertion tool.

The retention element may have a closed ring shape or closed annular shape, i.e., the shape of a ring without an opening in the circumference thereof.

The retention element may be integrally formed with or integrally attached to the insertion tool, e.g., a remainder of the insertion tool, through one or more link portions arranged between the retention element and the insertion tool, e.g., the remainder thereof. The one or more link portions may be arranged between the retention element and the insertion tool in the longitudinal direction of the retention element. Each of the one or more link portions may extend along only a part of the retention element in a circumferential direction of the retention element.

In this way, the retention element can be integrated with the insertion tool in a particularly simple and reliable manner.

At least one or some of the one or more link portions may extend along 1% or more, 1.5% or more, 2% or more, 5% or more, 10% or more, 20% or more, 30% or more, or 40% or more of the circumference of the retention element. Each of the one or more link portions may extend along 10% or more, 20% or more, 30% or more, or 40% or more of the circumference of the retention element.

The retention element may be integrally formed with or integrally attached to the insertion tool through a plurality of link portions, e.g., two link portions, three link portions, four link portions or five link portions, the link portions being arranged between the retention element and the insertion tool, e.g., a remainder thereof. The link portions may be separated from each other in the circumferential direction of the retention element, i.e., respectively arranged so that there is a gap between adjacent link portions in the circumferential direction of the retention element. The link portions may be equidistantly spaced from each other in the circumferential direction of the retention element or spaced from each other at different intervals in the circumferential direction of the retention element. The link portions may have the same or different extensions along the circumference of the retention element, i.e., in the circumferential direction of the retention element.

The retention element may be integrally formed with or integrally attached to the insertion tool, e.g., a remainder thereof, through a single link portion. The retention element may have a single portion extending from the distal end of the retention element to the proximal end of the retention element, the single portion being more flexible than the remainder of the retention element. The single link portion may be arranged opposite to the single portion in the radial direction of the retention element or adjacent to the single portion in the circumferential direction of the retention element.

The retention element may be integrally formed with or integrally attached to the insertion tool through a single link portion. The retention element may have a single cut-out or recessed portion extending from the distal end of the retention element to the proximal end of the retention element. The single link portion may be arranged opposite to the cut-out or recessed portion in the radial direction of the retention element or adjacent to the cut-out or recessed portion in the circumferential direction of the retention element.

The retention element may be integrally formed with or integrally attached to the insertion tool through a single link portion. The single link portion may be arranged opposite to the at least one projection or protrusion of the attachment portion in the radial direction of the retention element or adjacent to the at least one projection or protrusion of the attachment portion in the circumferential direction of the retention element.

The retention element may be integrally formed with or integrally attached to the insertion tool through at least two link portions. The at least two link portions may be arranged opposite to each other in the radial direction of the retention element.

The attachment portion of the insertion tool may comprise a plurality, e.g., two or more, three or more, four or more, or five or more, projections or protrusions, each extending in one or more directions substantially perpendicular to the longitudinal direction of the insertion tool.

The plurality of projections or protrusions may have the same or different extensions in the circumferential direction of the retention element. The plurality of projections or protrusions may have the same or different protruding heights from an outer surface of the remainder of the retention element, i.e., heights from this outer surface in one or more directions substantially perpendicular to the longitudinal direction of the insertion tool.

The plural projections or protrusions of the attachment portion may be sequentially or consecutively arranged in the circumferential direction of the retention element, i.e., so that one is arranged after the other in this circumferential direction. The plural projections or protrusions may be equidistantly spaced from each other or spaced from each other at different intervals in the circumferential direction of the retention element.

The plural projections or protrusions of the attachment portion are configured to be received in a corresponding cavity or corresponding cavities formed in the coronal portion of the dental implant.

As has been detailed above, the retention element may have at least one portion extending from the distal end of the retention element to the proximal end of the retention element, the at least one portion being more flexible than the remainder of the retention element. The retention element may have or may define at least one cut-out or recessed portion extending from the distal end of the retention element to the proximal end of the retention element. At least one projection or protrusion of the attachment portion of the insertion tool may be arranged adjacent to the at least one more flexible portion or the at least one cut-out or recessed portion of the retention element. In this way, a particularly reliable and efficient snap fit connection between the retention element and the dental implant can be ensured.

The insertion tool may have a visual indicator, such as a marking, which is configured to provide further indication of whether the insertion tool and the dental implant are properly attached to each other. For example, the visual indicator may comprise or be a coating, a laser mark, a groove or the like. The visual indicator may be provided on the distal portion of the insertion tool.

The retention element may be formed of a single material. The retention element may be made of, for example, a metal, such as titanium, a titanium alloy or stainless steel, a polymer or a composite material. In this way, the retention element can be configured in an elastically deformable manner in a particularly simple and reliable way.

The material of the retention element may be metallic, superelastic, amorphous etc.

The retention element may be manufactured, for example, by injection moulding, milling, such as CNC milling, etc. For example, the retention element may be manufactured by injection moulding using coloured plastic, e.g., so as to provide a colour code as a marking. If the retention element is made of a metal, such as titanium, a titanium alloy or stainless steel, the retention element may be anodised.

According to an aspect of the invention, there is provided an insertion tool for inserting a dental implant, in particular, the dental implant according to the present invention, into bone tissue of a patient. The insertion tool comprises a proximal portion and a distal portion, the distal portion being for cooperation with the implant. The distal portion has a drive region, in which drive region a cross-section of the distal portion perpendicular to the longitudinal direction of the insertion tool has a number of main directions in which the radius measuring the distance between the center of the cross-section and its outer contour takes a relative maximum value and thus a higher value than in neighbouring orientations.

The drive region of the distal portion of the insertion tool cooperates with the implant. The drive region constitutes an anti-rotational structure, e.g., an anti-rotational structure as detailed above. The drive region is configured to avoid relative rotation between the insertion tool and the implant, about the longitudinal axis of the tool, when tool and implant are engaged with each other, e.g., by, at least partly, introducing the distal portion of the tool into an implant socket.

The cross-sectional shape of the drive region as detailed above allows for an efficient, reliable and homogeneous transfer of a rotational force applied to the insertion tool about its longitudinal axis to the implant. The insertion tool thus enables the reliable insertion of an implant into the bone tissue of a patient, while minimising the risk of damage to or breakage of the implant, in particular, a socket thereof.

The drive region of the distal portion of the insertion tool is configured to cooperate with a corresponding anti-rotational structure, in particular, a drive portion, of the implant. In the drive portion of the implant, the cross-section, i.e., the inner cross-section, of a socket or channel of the implant perpendicular to the longitudinal direction of the implant has a number of main directions in which the radius measuring the distance between the center of the cross-section and its outer contour takes a relative maximum value and thus a higher value than in neighbouring orientations. The cross-sections of the drive region of the insertion tool and the drive portion of the implant may be substantially the same.

The cross-section of the drive region of the insertion tool can be characterized by an eccentricity parameter characteristic for the deviation of the respective cross section from circular shape. For the purpose of this description and disclosure and in accordance with the present invention, this eccentricity parameter is defined as the ratio of the maximum radius of the cross-section to its minimum radius, such that the eccentricity parameter adopts the value 1 for a circular shape. The eccentricity parameter of the cross-section of the drive region of the insertion tool is greater than 1. The eccentricity parameter may be, for example, in the range of 1.1 to 1.6, 1.2 to 1.5 or 1.3 to 1.4.

This eccentricity parameter can be evaluated for each value of a parameter characteristic for a coordinate in the longitudinal direction of the insertion tool. The eccentricity parameter of the drive region may be constant in the longitudinal direction of the insertion tool. Alternatively, the eccentricity parameter of the drive region may vary in the longitudinal direction of the insertion tool, e.g., decrease in the direction from the proximal end of the tool towards the distal end of the tool. The eccentricity parameter of the drive region may have a linear dependency on the coordinate parameter in the longitudinal direction of the insertion tool.

In some embodiments, the main directions in the drive region of the insertion tool, in which the respective radius of the cross-section has a local maximum, are positioned symmetrically, in particular, axially symmetrically, with respect to the central longitudinal axis of the insertion tool.

The number of main directions in the drive region of the insertion tool may be three or more, four or more, five or more, or six or more.

In some embodiments, the number of main directions in the drive region of the insertion tool is three, i.e., the drive region has a trioval cross-section. In combination with the symmetrical positioning of the main directions with respect to the longitudinal direction of the insertion tool, as detailed above, this triovality results in a rotational offset angle between two neighboring main directions of 120°.

The drive region may have a tapered configuration such that, in the drive region, the lateral dimensions or extensions of the cross-section of the distal portion perpendicular to the longitudinal direction of the insertion tool decrease along the direction from the proximal end of the insertion tool towards the distal end of the insertion tool.

In the drive region, the area of the cross-section of the distal portion perpendicular to the longitudinal direction of the insertion tool, i.e., the cross-sectional area of the distal portion, may decrease along the direction from the proximal end of the insertion tool towards the distal end of the insertion tool.

According to an aspect of the invention, there is provided an insertion tool for inserting a dental implant, in particular, the dental implant according to the present invention, into bone tissue of a patient. The insertion tool comprises a proximal portion and a distal portion, the distal portion being for cooperation with the implant. The distal portion has a drive section. In the drive section, the cross-section of the distal portion perpendicular to the longitudinal direction of the insertion tool has a plurality of radially convex portions and a plurality of radially concave portions which are alternatingly arranged along the circumference of the cross-section. Each of the radially outermost points of the radially convex portions lies on a respective circle around the center of the cross-section. At least two of these circles have different radii from each other.

The drive section of the distal portion of the insertion tool cooperates with the implant. The drive section constitutes an anti-rotational structure, e.g., an anti-rotational structure as detailed above. The drive section is configured to avoid relative rotation between the insertion tool and the implant, about the longitudinal axis of the tool, when tool and implant are engaged with each other, e.g., by, at least partly, introducing the distal portion of the tool into an implant socket.

The cross-sectional shape of the drive section as detailed above allows for an efficient, reliable and homogeneous transfer of a rotational force applied to the insertion tool about its longitudinal axis to the implant. The insertion tool thus enables the reliable insertion of an implant into the bone tissue of a patient, while minimising the risk of damage to or breakage of the implant, in particular, a socket thereof.

The drive section of the distal portion of the insertion tool is configured to cooperate with a corresponding anti-rotational structure, in particular, a drive zone, of the implant. In the drive zone of the implant, the cross-section, i.e., the inner cross-section, of a socket or channel of the implant perpendicular to the longitudinal direction of the implant has a plurality of radially convex portions and a plurality of radially concave portions which are alternatingly arranged along the circumference of the cross-section, wherein each of the radially outermost points of the radially convex portions lies on a respective circle around the center of the cross-section, at least two of these circles having different radii from each other. The cross-sections of the drive section of the insertion tool and the drive zone of the implant may be substantially the same or correspond to each other The radially innermost points of the radially concave portions may lie on a single circle around the center of the cross-section. Thus, all the radially innermost points of the radially concave portions may lie on the same circle around the center of the cross-section. Alternatively, at least two of the radially innermost points of the radially concave portions may lie on different circles around the center of the cross-section, having different radii from each other.

The cross-section of the distal portion of the insertion tool in the drive section may have the same number of radially convex portions and radially concave portions. The number of radially convex portions and/or radially concave portions may be 2 or more, 3 or more, 4 or more, 5 or more, 6 or more, 7 or more, 8 or more, or 9 or more. In a particularly preferred embodiment, the cross-section has 6 radially convex portions and 6 radially concave portions.

The radially convex portions may comprise one or more first radially convex portions and one or more second radially convex portions, wherein the one or more radially outermost points of the one or more first radially convex portions all lie on a single first circle around the center of the cross-section, and the one or more radially outermost points of the one or more second radially convex portions all lie on a single second circle around the center of the cross-section.

The second circle may have a smaller radius than the first circle.

The first radially convex portions and the second radially convex portions may be alternatingly arranged along the circumference of the cross-section, with the respective radially concave portions disposed therebetween.

The number of the first radially convex portions may be the same as the number of the second radially convex portions.

The radially convex portions of the cross-section of the distal portion of the insertion tool in the drive section may only comprise the first radially convex portions and the second radially convex portions, i.e., apart from the first and second radially convex portions, no further radially convex portions may be present in the cross-section.

The radially convex portions and/or the radially concave portions of the cross-section of the drive section each may have a curved shape, e.g., an at least partially circular shape, an at least partially elliptical shape, an at least partially oval shape or the like.

The radially convex portions and the radially concave portions of the cross-section of the drive section may be arranged directly or immediately adjacent to each other. A radially convex portion may be directly or immediately neighboured by two radially concave portions and vice versa.

The distal portion of the insertion tool of the invention may have the drive region and the drive section as detailed above. The drive region may be arranged proximally of the drive section.

By providing the distal portion of the insertion tool with both the drive region and the drive section, any damage to or breakage of the implant, in particular, a socket thereof, upon insertion of the implant into bone tissue can be particularly reliably avoided. In particular, due to the presence of two anti-rotational structures on the distal portion of the insertion tool, i.e., the drive region and the drive section, which can cooperate with two corresponding anti-rotational structures on the implant, e.g., the drive portion and the drive zone, the rotational force or load applied to the implant upon insertion thereof into bone tissue can be shared by the two structures. Hence, any damage to either of these two structures in the implant can be minimised. Thus, one or both of these structures in the implant can be reliably and efficiently used as an index for an abutment, a scan post, an impression post or the like after insertion of the implant into bone tissue.

The distal portion of the insertion tool of the invention may have the retention element and the drive region as detailed above. The drive region may be arranged proximally of the retention element.

The distal portion of the insertion tool of the invention may have the retention element and the drive section as detailed above. The drive section may be arranged distally of the retention element.

The distal portion of the insertion tool of the invention may have the retention element, the drive region and the drive section as detailed above. The drive section may be arranged distally of the retention element. The drive region may be arranged proximally of the retention element. The drive section, the retention element and the drive region may be arranged in this order in the direction from the distal end of the insertion tool towards the proximal end of the insertion tool.

The insertion tool may consist of a single piece of material. In this case, all the components of the insertion tool are integrally formed with each other.

The insertion tool may consist of two separate parts, e.g., a distal part and a proximal part, which are attached to each other, in particular, releasably attached to each other.

The two separate parts of the insertion tool may be permanently attached to each other.

For example, the distal part of the insertion tool may have a protrusion which fits into a corresponding recess of the proximal part of the insertion tool. The distal part and the proximal part may be attached to each other, in particular, releasably attached to each other, by inserting the protrusion into the recess.

The protrusion and the recess may have corresponding anti-rotational features or structures so as to prevent any rotation of the distal part and the proximal part relative to each other about the longitudinal axis of the insertion tool.

The anti-rotational structure of the distal part may have a cross-section, e.g., an outer cross-section of the protrusion, perpendicular to the longitudinal direction of the insertion tool which is not rotationally symmetric, e.g., which is non-circular, for example, elliptic, oval, polygonal, such as rectangular, square or hexagonal, or the like. The anti-rotational structure of the distal part of the insertion tool can cooperate with the corresponding anti-rotational structure of the proximal part of the insertion tool. The anti-rotational structure of the proximal part of the insertion tool may have a cross-section, e.g., an inner cross-section of the recess, perpendicular to the longitudinal direction of the insertion tool which is not rotationally symmetric, e.g., which is non-circular, for example, elliptic, oval, polygonal, such as rectangular, square or hexagonal, or the like. The cross-sections of the anti-rotational structures of the distal part and the proximal part may be substantially the same.

Providing the insertion tool in the form of two separate parts, e.g., a distal part and a proximal part as detailed above, renders the production of the insertion tool, in particular, the production of the retention element, simpler and easier. This applies, in particular, if the retention element is provided on the proximal part of the insertion tool. For example, the production of the retention element can be carried out by milling.

One of the two separate parts of the insertion tool, in particular, the distal part, may comprise the drive section and the other of the two separate parts, in particular, the proximal part, may comprise the retention element and the drive region. In this way, production of the insertion tool, in particular, production of the retention element, can be further simplified.

The retention element may be integrally formed with the other of the two separate parts, in particular, the proximal part.

The retention element may be integrally attached to the other of the two separate parts, in particular, the proximal part.

The invention further provides a combination of the dental implant according to the present invention and the insertion tool according to the present invention.

The explanations, features and definitions provided above for the dental implant and the insertion tool of the invention fully apply to the combination of the invention.

The combination of the invention provides the effects and advantages already described in detail above for the dental implant and the insertion tool of the invention.

The dental implant may have at least one cavity formed in a coronal portion thereof for receiving the at least one projection or protrusion of the attachment portion of the retention element.

According to an aspect of the invention, there is provided a dental implant, in particular for insertion into bone tissue of a patient, comprising a core body having an apical end and a coronal end. The core body comprises a channel or socket which is open to the coronal end and extends along the longitudinal direction of the implant from the coronal end towards the apical end. The core body has a drive zone, in which drive zone the cross-section of the channel perpendicular to the longitudinal direction of the implant has a plurality of radially convex portions arranged along the circumference of the cross-section. Each of the radially outermost points of the radially convex portions lies on a respective circle around the center of the cross-section. At least two of these circles have different radii from each other. The inner cross-section, of a socket or channel of the implant perpendicular to the longitudinal direction of the implant can have a plurality of radially convex portions and a plurality of radially concave portions which are alternatingly arranged along the circumference of the cross-section.

The longitudinal direction of the dental implant extends from a coronal end of the implant towards an apical end of the implant. The cross-section of the channel perpendicular to the longitudinal direction of the implant is an inner cross-section of the channel.

The drive zone of the core body of the implant cooperates with an insertion tool, in particular, the insertion tool of the invention as detailed above, i.e., with the drive section thereof. The drive zone constitutes an anti-rotational structure, e.g., an anti-rotational structure as detailed above. The drive zone is configured to avoid relative rotation between the insertion tool and the implant, about the longitudinal axis of the tool, when tool and implant are engaged with each other, e.g., by, at least partly, introducing the distal portion of the tool into the channel or socket of the implant.

The cross-sectional shape of the drive zone as detailed above allows for an efficient, reliable and homogeneous transfer of a rotational force applied to the insertion tool about its longitudinal axis to the implant. The implant thus enables the reliable insertion thereof into the jawbone or bone tissue of a patient, while minimising the risk of damage to or breakage of the implant, in particular, the channel or socket thereof.

The drive zone of the implant is configured to cooperate with a corresponding anti-rotational structure, in particular, the drive section, of the distal portion of the insertion tool. The cross-sections of the drive zone of the implant and the drive section of the insertion tool may be substantially the same.

The radially innermost points of the radially concave portions of the channel cross-section in the drive zone may lie on a single circle around the center of the cross-section. Thus, all the radially innermost points of the radially concave portions may lie on the same circle around the center of the cross-section. Alternatively, at least two of the radially innermost points of the radially concave portions may lie on different circles around the center of the cross-section, having different radii from each other.

The cross-section of the channel in the drive zone may have the same number of radially convex portions and radially concave portions. The number of radially convex portions and/or radially concave portions may be 2 or more, 3 or more, 4 or more, 5 or more, 6 or more, 7 or more, or 8 or more. In a particularly preferred embodiment, the cross-section has 6 radially convex portions and 6 radially concave portions.

The radially convex portions may comprise one or more first radially convex portions and one or more second radially convex portions, wherein the one or more radially outermost points of the one or more first radially convex portions all lie on a single first circle around the center of the cross-section, and the one or more radially outermost points of the one or more second radially convex portions all lie on a single second circle around the center of the cross-section.

The second circle may have a smaller radius than the first circle.

At least one of the one or more radially outermost points of the one or more first radially convex portions can be located at an angular position matching the angular position of a relative maximum of the core of the dental implant, within an angular tolerance range. The tolerance range can be approximately +−10°, preferably approximately +−5°. The radially outermost points of the one or more first radially convex portions can be located at the same (or substantially at the same) angular position as the relative maximum of the core of the dental implant.

The number of radially outermost points of the one or more first radially convex portions can be the same as the number of relative maximum of the implant core body.

At least one of the one or more radially outermost points of the one or more second radially convex portions can be located at an angular position matching the angular position of a minima of the core of the dental implant within a angular tolerance range. The tolerance range can be approximately +−10°, preferably approximately +−5°. The radially outermost points of the one or more second radially convex portions can be located at the same (or substantially at the same) angular position as the relative maximum of the core of the dental implant.

The above mentioned configuration of outermost points of the drive zone ensures that the maximum of material is present between said outermost points and the periphery of the core body of the implant in a given cross section.

The first radially convex portions and the second radially convex portions may be alternatingly arranged along the circumference of the cross-section, with the respective radially concave portions disposed therebetween.

The number of the first radially convex portions may be the same as the number of the second radially convex portions.

The radially convex portions of the cross-section of the channel in the drive zone may only comprise the first radially convex portions and the second radially convex portions, i.e., apart from the first and second radially convex portions, no further radially convex portions may be present in the cross-section.

The radially convex portions and/or the radially concave portions of the cross-section of the channel in the drive zone each may have a curved shape, e.g., an at least partially circular shape, an at least partially elliptical shape, an at least partially oval shape or the like.

The radially convex portions and the radially concave portions of the cross-section of the channel in the drive zone may be arranged directly or immediately adjacent to each other. A radially convex portion may be directly or immediately neighboured by two radially concave portions and vice versa.

The core body may further have a drive portion, in which drive portion the cross-section of the channel perpendicular to the longitudinal direction of the implant has a number of main directions in which the radius measuring the distance between the center of the cross-section and its outer contour takes a relative maximum value and thus a higher value than in neighbouring orientations.

The drive portion of the core body of the implant cooperates with an insertion tool, in particular, the insertion tool of the invention as detailed above, i.e., with the drive region thereof. The drive portion constitutes an anti-rotational structure, e.g., an anti-rotational structure as detailed above. The drive portion is configured to avoid relative rotation between the insertion tool and the implant, about the longitudinal axis of the tool, when tool and implant are engaged with each other, e.g., by, at least partly, introducing the distal portion of the tool into the implant channel or socket.

The cross-sectional shape of the drive portion as detailed above allows for an efficient, reliable and homogeneous transfer of a rotational force applied to the insertion tool about its longitudinal axis to the implant. The implant thus enables the reliable insertion thereof into the jawbone or bone tissue of a patient, while minimising the risk of damage to or breakage of the implant, in particular, the channel or socket thereof.

The drive portion of the implant is configured to cooperate with a corresponding anti-rotational structure, in particular, the drive region, of the distal portion of the insertion tool. The cross-sections of the drive portion of the implant and the drive region of the insertion tool may be substantially the same.

The cross-section of the drive portion of the implant can be characterized by an eccentricity parameter characteristic for the deviation of the respective cross section from circular shape. For the purpose of this description and disclosure and in accordance with the present invention, this eccentricity parameter is defined as the ratio of the maximum radius of the cross-section to its minimum radius, such that the eccentricity parameter adopts the value 1 for a circular shape. The eccentricity parameter of the cross-section of the drive portion of the implant is greater than 1. The eccentricity parameter may be, for example, in the range of 1.1 to 1.6, 1.2 to 1.5 or 1.3 to 1.4.

This eccentricity parameter can be evaluated for each value of a parameter characteristic for a coordinate in the longitudinal direction of the dental implant. The eccentricity parameter of the drive portion may be constant in the longitudinal direction of the implant. Alternatively, the eccentricity parameter of the drive portion may vary in the longitudinal direction of the implant, e.g., decrease in the direction from the coronal end of the implant towards the apical end of the implant. The eccentricity parameter of the drive portion may have a linear dependency on the coordinate parameter in the longitudinal direction of the implant.

In some embodiments, the main directions in the drive portion of the implant, in which the respective radius of the cross-section has a local maximum, are positioned symmetrically, in particular, axially symmetrically, with respect to the central longitudinal axis of the implant.

The number of main directions in the drive portion of the implant may be three or more, four or more, five or more, or six or more.

In some embodiments, the number of main directions in the drive portion of the implant is three, i.e., the drive portion has a trioval cross-section. In combination with the symmetrical positioning of the main directions with respect to the longitudinal direction of the implant, as detailed above, this triovality results in a rotational offset angle between two neighboring main directions of 120°.

The drive portion may have a tapered configuration such that, in the drive portion, the lateral dimensions or extensions of the cross-section of the channel perpendicular to the longitudinal direction of the implant decrease along the direction from the coronal end of the core body towards the apical end of the core body.

In the drive portion, the area of the cross-section of the channel perpendicular to the longitudinal direction of the implant, i.e., the cross-sectional area of the channel, may decrease along the direction from the coronal end of the core body towards the apical end of the core body.

The core body of the implant of the invention may thus have the drive zone and the drive portion as detailed above. The drive zone may be arranged apically of the drive portion.

By providing the core body of the implant with both the drive zone and the drive portion, any damage to or breakage of the implant, in particular, the channel or socket thereof, upon insertion of the implant into a jawbone or bone tissue can be particularly reliably avoided. In particular, due to the presence of two anti-rotational structures on the core body of the implant, i.e., the drive zone and the drive portion, which can cooperate with two corresponding anti-rotational structures on the distal portion of the insertion tool, e.g., the drive section and the drive region, the rotational force or load applied to the implant upon insertion thereof into bone tissue can be shared by the two structures. Hence, any damage to either of these two structures in the implant can be minimised. Thus, one or both of these structures in the implant can be reliably and efficiently used as an index for an abutment, a scan post, an impression post or the like after insertion of the implant into a jawbone or bone tissue.

The core body may have an outer surface extending along the longitudinal direction of the implant between the apical end and the coronal end.

The dental implant may further comprise at least one thread extending outwardly from the core body, wherein the thread has an apical surface, facing towards the apical end of the core body, and a coronal surface, facing towards the coronal end of the core body.

The thread may have a flute, i.e., a cutting flute, formed therein, wherein the flute extends from an apical end of the thread towards a coronal end of the thread.

The thread may have, at an apical portion thereof, a recess formed in its coronal surface, the recess extending in the direction from the coronal surface towards the apical surface along part of the thickness of the thread, wherein the recess is open to the flute, i.e., opens to the flute.

According to an aspect of the invention, there is provided a dental implant, in particular for insertion into bone tissue of a patient, comprising a core body having an apical end, a coronal end, and an outer surface extending along the longitudinal direction of the implant between the apical end and the coronal end. The implant further comprises at least one thread extending outwardly from the core body. The thread has an apical surface, facing towards the apical end of the core body, and a coronal surface, facing towards the coronal end of the core body. The thread has a flute, i.e., a cutting flute, formed therein. The flute extends from an apical end of the thread towards a coronal end of the thread. The thread has, at an apical portion thereof, a recess formed in its coronal surface, the recess extending in the direction from the coronal surface towards the apical surface along part of the thickness of the thread. The recess is open to the flute, i.e., opens to the flute.

The thickness of the thread extends in the direction from the coronal surface of the thread towards the apical surface of the thread. The width of the thread extends in a direction radially outward from the core body. The length of the thread extends in the longitudinal direction of the implant.

By providing the thread with the flute and the recess as detailed above, the implant is rendered self-cutting. Moreover, the arrangement of the flute and the recess helps to reduce the insertion torque or rotational force required to insert the implant into a jawbone or bone tissue. This is particularly advantageous for the case of hard bone. When inserting the implant, no application of axial pressure thereto is required. Rather, the implant efficiently and reliably pulls itself into the implantation site upon rotation thereof.

The recess has a cutting function, i.e., a function of cutting bone tissue. The recess thus helps to efficiently cut and remove bone material and, further, to transport the removed bone material towards the coronal end of the core body.

In particular, when inserting the implant at an implantation site, e.g., an extraction site, where the implant has to cut sideways, e.g., due to a tilted or angled arrangement between implant and the bone tissue, the implant of the invention ensures a smooth and precise placement thereof in the bone. Further, the recess greatly helps with the insertion of the implant into an underprepared hole in bone tissue or into a tooth extraction socket wherein the bone wall is not uniform and therefore it is not possible to create a cylindrically shaped osteotomy that usually results from a drilling.

The implant of the invention thus allows for the insertion thereof into bone tissue with reduced force and with a high degree of accuracy. In this way, a particularly stable and robust connection or engagement of the implant with the bone tissue, i.e., a high implant stability, can be achieved.

Due to the arrangement of the recess in the coronal surface of the thread, the above-identified advantageous effects can be achieved over a broad range of implant thread angles, i.e., for substantially all implant thread angles, in particular, for small implant thread angles.

Hence, the invention provides a dental implant which enables a reliable and accurate placement and engagement thereof in a jawbone or bone tissue for a wide variety of implant thread angles, in particular, small implant thread angles.

The dental implant comprises at least one thread. The dental implant may comprise a plurality of threads, for example, two or more threads, three or more threads, or four or more threads.

The at least one thread has at least one flute, i.e., at least one cutting flute, formed therein. The at least one flute extends, in the length direction of the at least one flute, from the apical end of the thread towards the coronal end of the thread. The at least one flute thus starts at the apical end of the thread and extends from there towards the coronal end of the thread. The at least one flute may extend over 20% or more, 30% or more, 40% or more, 50% or more, or 60% or more of the length of the thread.

The at least one flute may extend in a direction substantially parallel to the longitudinal direction of the implant or in a direction which is inclined or tilted with respect to the longitudinal direction of the implant. In the latter case, an angle between the extension direction of the at least one flute and the longitudinal direction of the implant may be in the range of 2° to 20°, 5° to 15°, or 8° to 12°.

The at least one flute extends, in the width direction of the at least one flute, along part of the circumference of the core body. The at least one flute may extend over 10% to 30%, 15% to 25%, or 18% to 22% of the circumference of the core body. The thread may have a plurality of flutes, i.e., a plurality of cutting flutes, formed therein. One of the plurality of flutes extends from the apical end of the thread towards the coronal end of the thread. The thread may have two or more flutes, three or more flutes, or four or more flutes formed therein.

The plurality of flutes may be arranged in a staggered or shifted arrangement along the length of the thread and/or along the circumference of the thread, i.e., the circumference of the core body.

The thread has at least one recess formed in its coronal surface, the at least one recess extending in the direction from the coronal surface towards the apical surface along part of the thickness of the thread. The at least one recess thus starts at the coronal surface and extends from there towards the apical surface. The at least one recess does not completely penetrate the thread in the thickness direction of the thread. The at least one recess is open to, i.e., opens to, the coronal surface of the thread.

Further, the recess is open to the flute, i.e., opens to the flute. The recess is provided adjacent, i.e., directly or immediately adjacent, to the flute.

The at least one recess may extend in the direction from the coronal surface towards the apical surface along 20% to 90%, 30% to 80%, 40% to 70%, or 50% to 60% of the thickness of the thread. In this way, it can be ensured that the recess can efficiently contribute to the bone cutting process, while maintaining sufficient stability of the implant.

If the first threads are allowed to cut into the bone, in the case of low volumes of available bone (e.g., extraction socket), the drilled hole can be undersized resulting in better stability of the implant gained from the tip.

The extension of the at least one recess in the direction from the coronal surface towards the apical surface, i.e., the depth of the at least one recess, may be constant along the directions parallel to the coronal or apical surface.

The extension of the at least one recess in the direction from the coronal surface towards the apical surface, i.e., the depth of the at least one recess, may vary along the directions parallel to the coronal or apical surface. In this case, the largest extension of the at least one recess in the direction from the coronal surface towards the apical surface may range over 20% to 90%, 30% to 80%, 40% to 70%, or 50% to 60% of the thickness of the thread. The largest extension of the at least one recess in the direction from the coronal surface towards the apical surface may be present at the portion of the recess which is arranged directly adjacent the flute.

The extension of the at least one recess in the direction from the coronal surface towards the apical surface may decrease along the direction circumferentially away from the flute to which the recess opens. In this way, a particularly efficient cutting functionality of the recess can be achieved.

The at least one recess may have a curved shape. For example, the at least one recess may have the shape of a portion or segment of a sphere or an ellipsoid, e.g., of a quarter sphere or a quarter ellipsoid. Such a curved shape of the at least one recess allows for the recess, and thus also the implant, to be manufactured in a particularly simple and cost-efficient manner.

The at least one recess may extend, in the width direction of the recess, over 50% to 90%, 60% to 80%, or 65% to 75% of the width of the thread.

The at least one recess may be arranged on an upstream side of the flute in a rotation direction of the implant. The rotation direction of the implant is the direction in which the implant is screwed into the bone tissue.

The at least one recess may be formed in the coronal surface of the thread at the first complete or full turn of the thread. The first complete or full turn of the thread is the first complete turn when the complete turns are counted starting from the apical end of the thread and going towards the coronal end of the thread. The first complete turn of the thread is thus the most apical complete turn of the thread. Such an arrangement of the at least one recess allows for a particularly stable and robust engagement of the implant with the jawbone or bone tissue.

The at least one recess may be formed in the coronal surface of the thread at the second complete or full turn of the thread. The at least one recess may be formed in the coronal surface of the thread at the third complete or full turn of the thread.

The thread may have a plurality of recesses formed in its coronal surface. For example, one of the plurality of recesses may be formed in each of the coronal surfaces of the thread at the first and second complete or full turns of the thread. One of the plurality of recesses may be formed in each of the coronal surfaces of the thread at the first, second and third complete or full turns of the thread.

The thread angle, i.e., the inclination angle of the thread relative to a plane perpendicular to the longitudinal direction of the implant, may be 25° or less, 20° or less, 15° or less, 12° or less, or 10° or less. In a particularly preferred embodiment, the thread angle is 10° or less.

Such small thread angles offer the advantage that the implant is introduced into the bone tissue more slowly, i.e., with less forward movement per turn of the implant, allowing for a particularly smooth and precise placement of the implant.

As has been indicated above, the recess of the implant of the invention works particularly well in combination with threads having such small thread angles. In particular, the arrangement of the recess in the coronal surface of the thread can provide a local increase in the thread angle, due to the presence of the recess. For example, the thread angle may be locally increased to 20° to 40°, or 25° to 35°.

Hence, the recess can greatly contribute to the cutting of bone tissue.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

BRIEF DESCRIPTION OF THE DRAWINGS

FIG. 4 is a longitudinal sectional view of the implant of FIG. 3, FIG. 5 is a longitudinal sectional view of the implant of FIG. 2, FIGS. 6-12 are views of different embodiments of implants according to the invention, FIGS. 13-18 are side views of different embodiments of implants according to the invention equipped with cutting flutes, FIG. 22 is a longitudinal sectional view of the implant of FIG. 1, 2, 11, FIG. 23 is an enlargement of a portion of FIG. 22, FIG. 38 shows the insertion tool according to the first embodiment of the present invention, wherein FIG. 38(*a*) is a side view of the entire insertion tool, FIG. 38(*b*) is a cross-sectional view of the distal portion of the insertion tool taken along the line C-C in FIG. 38(*a*), FIG. 38(*c*) is a side view of the distal portion of the insertion tool, FIG. 38(*d*) is a cross-sectional view of the distal portion of the insertion tool taken along the line A-A in FIG. 38(*c*), FIG. 38(*e*) is a cross-sectional view of the distal portion of the insertion tool taken along the line A-A in FIG. 38(*c*) for a modification of the first embodiment of the insertion tool, and FIG. 38(*f*) is a cross-sectional view of the distal portion of the insertion tool taken along the line B-B in FIG. 38(*c*), FIG. 41 shows a dental implant according to an embodiment of the present invention, wherein FIG. 41(*a*) is a side view of the implant, FIG. 41(*b*) is a bottom view of the implant, and FIG. 41(*c*) is a cross-sectional view of the implant taken along the line H-H in FIG. 41(*b*)

DETAILED DESCRIPTION OF PREFERRED EMBODIMENTS

Preferred embodiments of the present invention will now be described with reference to the accompanying drawings.

Identical parts are marked with the same reference numbers in all figures. The individual features as shown may be combined in further variations all of which are considered to be within the scope of the present invention.

Figure 1:
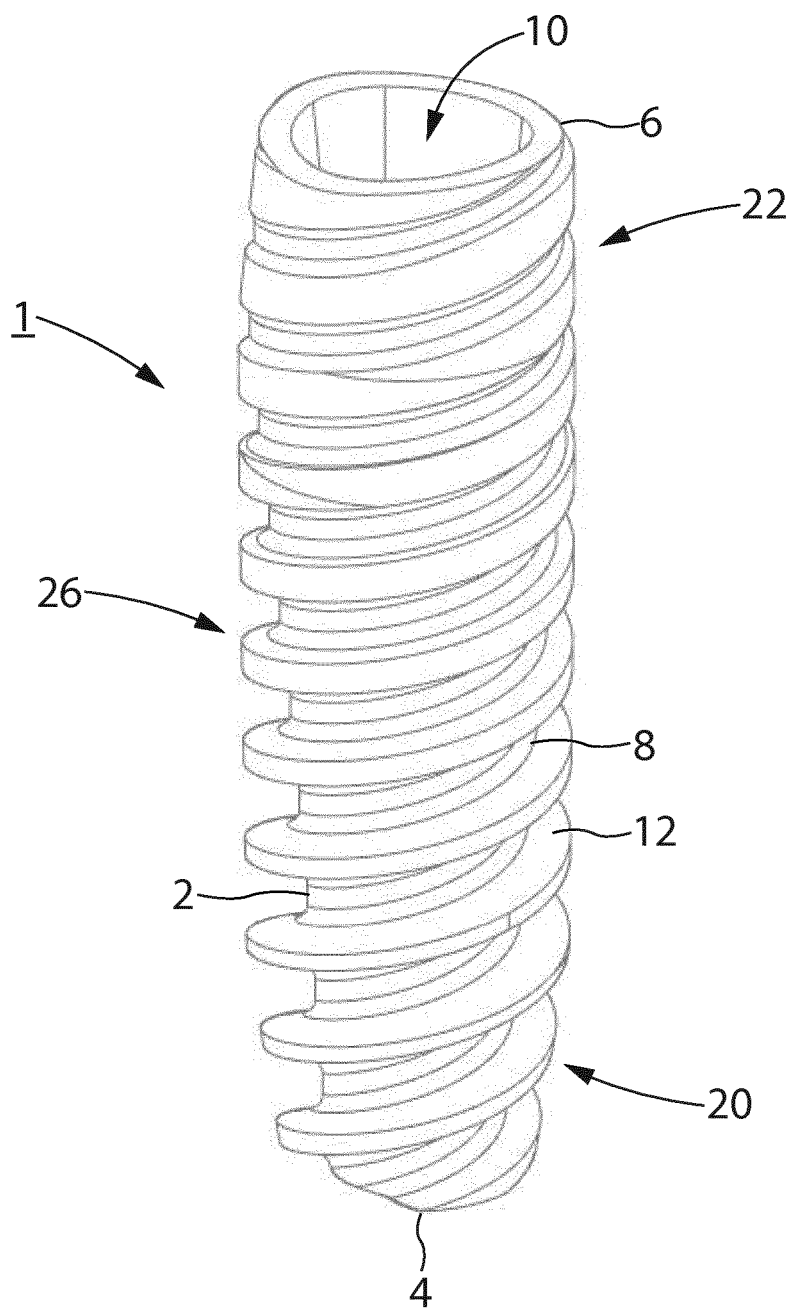
FIG. 1 is a side perspective view of a dental implant according to one embodiment of the invention.

The dental implant 1 shown in FIG. 1 is provided for use in the jawbone of a patient in the place of an extracted or shed tooth, in order to hold there a prosthetic part serving as a dental prosthesis or a crown. In the exemplary embodiment as shown, the dental implant 1 is designed for use in so called a multi-part configuration and is configured as a so-called post part for insertion into the patient's bone tissue. The dental implant system in which the dental implant 1 is intended to be used also comprises a second implant part (not shown) associated therewith, also referred to as mounting-part piece or abutment, provided for fixing a dental prosthetic piece or any other prosthetic component which can cooperate with the implant 1.

Alternatively, however, and still in accordance with the present invention, the dental implant 1 might also be configured to be used in a one-piece dental implant system, in which the dental implant 1 on its top region also carries means for attaching the dental prosthetic piece or prosthetic component directly.

The implant 1 comprises as its main body a core body 2 having an apical end 4, a coronal end 6, and an outer surface 8 extending along the longitudinal direction of the core 2 between the apical end 4 and the coronal end 6. In a one piece configuration, the coronal end 6 of the core body 2 might be designed appropriately such that the dental prosthesis can be attached properly and with high mechanical stability. In the example as shown, however, due to the multi-piece configuration of the dental implant system, the coronal end 6 is designed to form a connection of high mechanical stability with the second implant part or abutment. In order to provide such high mechanical stability, after having suitably fixed the dental prosthetic piece or the prosthesis on the mounting-part piece or abutment, the implant 1 features a receiving channel 10 into which a corresponding connection pin of the abutment can be inserted. By pushing the connection pin into the receiving channel 10, the implant 1 and the abutment are mechanically connected with each other. The mechanical connection of the implant 1 and the abutment is effected via an associated connection screw, the external thread of which is screwed into an internal thread provided in the implant 1, whereby the screw head of the connection screw presses the abutment onto the implant 1.

On its outer surface 8, the core body 2 of the implant 1 is provided with an external thread 12 extending outwardly from the core body 2. The thread 12 is configured, in particular in a zone close to the apical end 4, as a self-cutting screw thread, with which the implant 1 can be inserted into the jawbone by screwing in the intended place. The pitch of the thread 12 can be uniform or else variable.

The implant 1 including its thread 12 is specifically designed in particular in view of a desired high primary and secondary stability and a uniform forwarding of the forces arising under the chewing load on the dental implant 1 into the jawbone. For this purpose, the implant comprises a number of specialized zones or sections, each of which is designated for a specific contribution to either high primary stability or high secondary stability.

First, the core body 2 of the dental implant 1 comprises a circular zone 20, in the preferred embodiment as shown located next to the apical end 4. In the core circular zone 20, the core body 2 of the implant 1 is designed for a comparatively easy engagement of the thread 12 with the bone material without exerting too much stress to the bone tissue during the first moments when the implant 1 is screwed into the bone material. For this purpose, in the core circular zone 20 the core body 2 has circular cross section. The positioning of the core circular zone 20 in the apical portion of the implant 1 is considered highly beneficial in order to maximize the potential for high primary stability. This is beneficial in general, but also more specifically in extraction sockets, where immediate loading protocols could be preferred. In order to provide significant apical engagement, the circular zone 20, as seen in longitudinal direction of the implant, in the embodiment shown has a length of at least 2.5 mm.

In contrast and second, the core body 2 comprises a core shaped zone 22. In the embodiment shown in the figures, the core shaped zone 22 is positioned in the vicinity of the other end of the implant 2, i.e. next to the coronal end 6, and thereby constitutes a crestal platform zone 24, but alternatively it might also be positioned in some middle or intermediate range of the core body 2. In this zone 22, in the embodiment shown next to the coronal end 6 which is designed to be connected to the abutment carrying the dental prosthesis, the core body 2 is designed with a non-round cross section featuring a number of main directions in which the radius measuring the distance between the center of the cross section and its outer contour takes a relative maximum value and thus a higher value than in neighbouring orientations.

Due to this design of the cross section in this core shaped zone 22, when the core body 2 is screwed into the bone tissue, the compression force exerted on the bone tissue varies in an oscillatory manner between maximal compression when (due to the rotational movement of the implant body) the local radius of the cross section becomes maximal, and minimal compression when the local radius of the cross section becomes minimal. Therefore, when the implant body is screwed in, in this zone the surrounding bone tissue is put under fluctuating compression, changing between periods of high compression and periods of relaxation when compression is lowered. In the preferred embodiment shown, the shaped zone 22 is positioned at the crestal end of the implant 1. Therefore, after insertion of the implant 1 the shaped zone 22 will come to rest in the crestal zone of the patient's jaw, featuring comparatively hard bone tissue. After the insertion this shaped contour featuring local minimas will result in areas of low bone stress in the vicinity of the minima, thereby allowing for enhanced regeneration of the bone material and significantly minimizing the negative effects of overstrong compression to the blood vessels. In consequence, the regeneration of bone material and also osseointegration is significantly improved by providing the local minima of the shaped zone 22 in the area of the critical bone structure, and it is considered highly beneficial for the purpose of osseointegration to provide these effects for the top layer of at least 2.5 mm or even better at least 3 mm in the crestal plate. Accordingly, the first shaped zone 22, as seen in longitudinal direction of the implant, in the embodiment shown has a length of at least 2.5 mm.

Third, the core body 2 of the implant 1 comprises a transition zone 26 positioned, as seen in longitudinal direction of the implant 1, between the core circular zone 20 and the core shaped zone 22. In order to allow for a smooth and beneficial transition between the zones 20, 22, the transition zone 26 is provided with a transient cross section, changing (as seen in longitudinal direction) from circular cross section matching the cross section of the core circular zone 20 in the range close to the core circular zone 20 to a non-round, lobed cross section matching the cross section of the shaped zone 22 in the range close to the shaped zone 22. Due to this transition zone 26, immediate and sudden changes in geometry, shearing effects to the bone tissue and other damaging effects to the bone tissue may be avoided.

Figure 2:
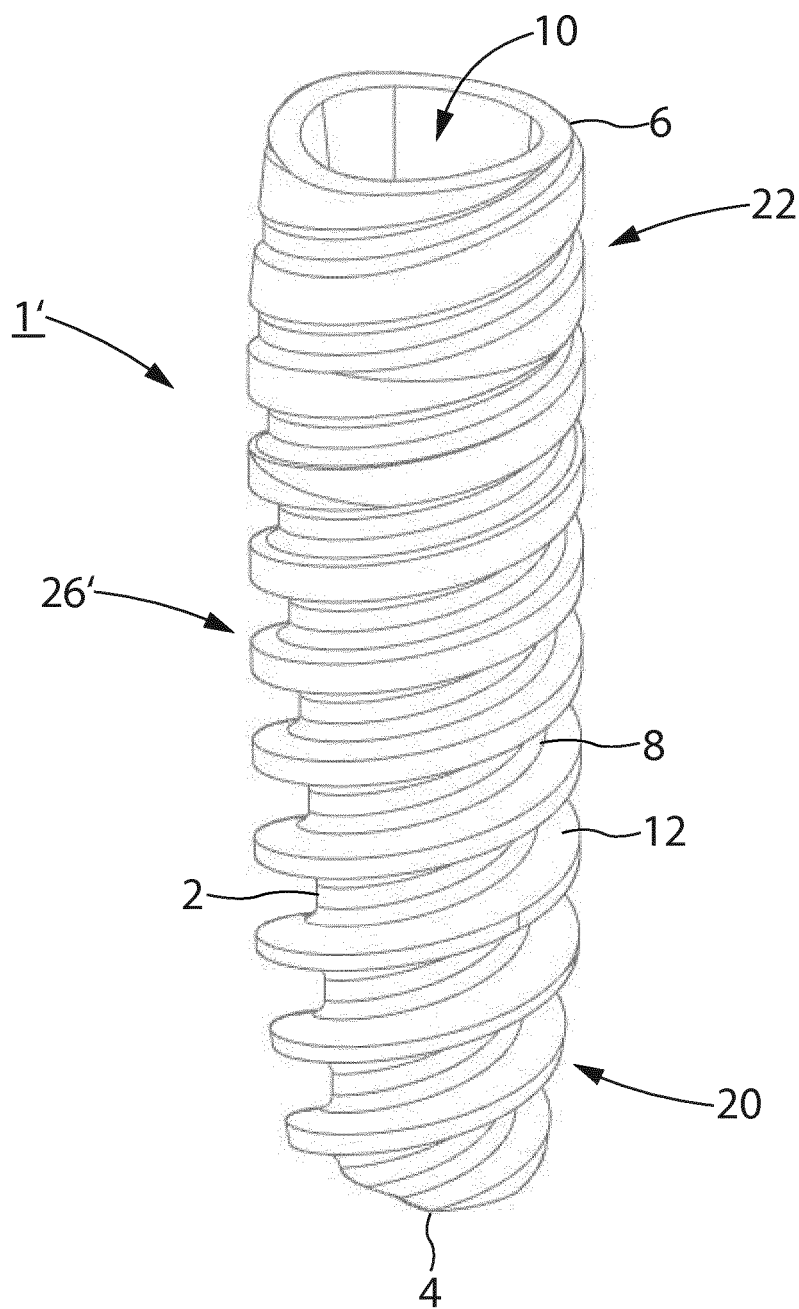
FIG. 2 is a side perspective view of an alternative dental implant according to the invention.

An alternative embodiment of the present invention is shown in FIG. 2. This embodiment can be used separately or in combination with the embodiment of FIG. 1. In this alternative embodiment, the dental implant 1" in analogy to the embodiment of FIG. 1 also is equipped with a core body 2 comprising the core circular zone 20 and the core shaped zone 22. Instead of or in addition to the transition zone 26, however, the dental implant 1' comprises a second core shaped zone 26', in which second core shaped zone 26'—as in the first core shaped zone 22, the cross-section of the core body 2 has a number of main directions in which the radius measuring the distance between the center of the cross section and its outer contour takes a relative maximum value and thus a higher value than in neighbouring orientations. The second core shaped zone 26' is positioned, as seen in longitudinal direction of the implant 1, between the zones 20, 22. In order to allow for the desired smooth and beneficial transition between the zones 20, 22, in this embodiment in the first core shaped zone 22 the core eccentricity parameter defined as the ratio of the maximum radius of the cross section of the core body 2 to its minimum radius is larger than in the second core shaped zone 26'. Evidently, as a further option this second shaped zone 26' may by itself also be constituted from a sequence or number of individual shaped zones of this type, having different eccentricities.

Figure 3:
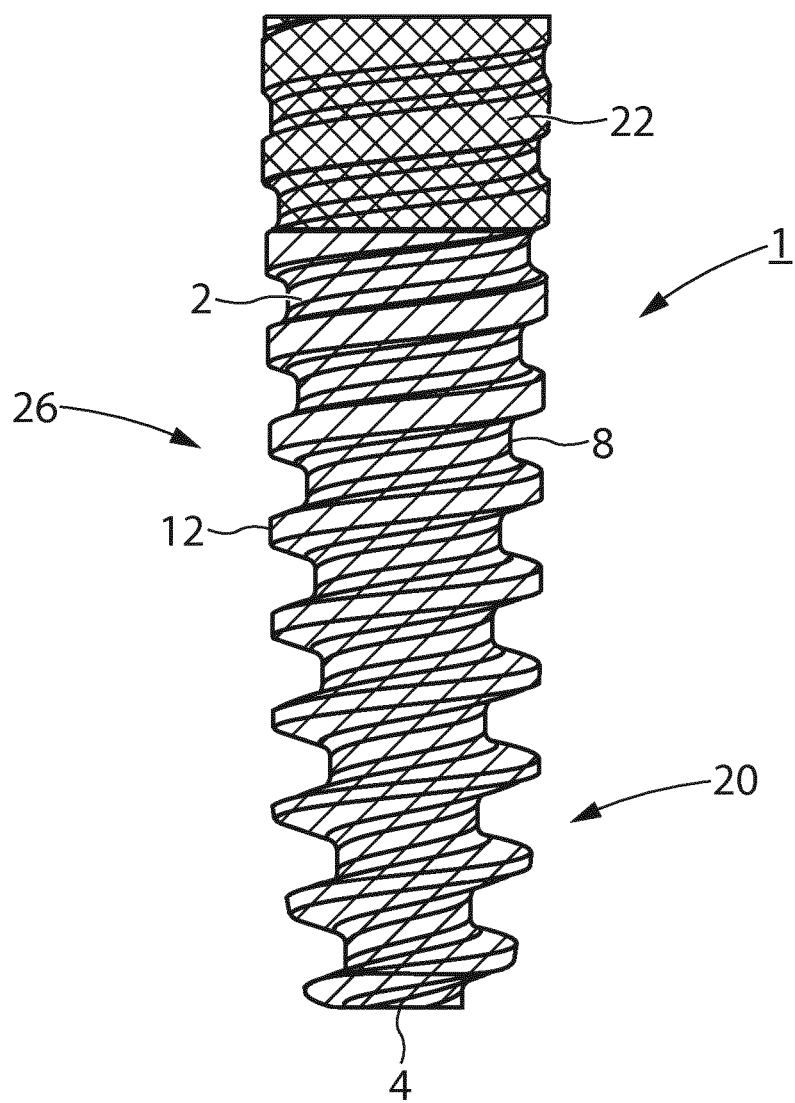
FIG. 3 is a side view of an embodiment on a dental implant according to the invention with distinguished zones.

FIG. 3 shows a schematical representation of the implant 1, 1" of FIG. 1, 2, in which the zones 20, 22, 26, 26' are distinguishably identified. In the example shown, the transition zone 26, as seen in the longitudinal direction, starts at a distance of about 2 to 3 mm from the apical end 4 of the implant 1.

This design concept for the core body 2, i.e. providing the three zones 20, 22, and 26 or 26', respectively, is considered one first possible group of embodiments for the present inventive concept. In an alternative, independent second group of embodiments for the present inventive concept which can be used independently or in combination with an embodiment of the first group, similar or equivalent effects for beneficial cutting properties and bone treatment can be achieved by a design of the outer contour of the thread 12 analogous to the design as described above for the core body 2. In FIG. 4, an embodiment of the implant 1 is shown featuring both of these alternative groups of embodiments of the invention in combination, but they may be used independently as well. For better explanation of the design of the outer contour of the thread 12, in the following it is referred to the "outer volume" or enveloping volume 28 as defined by the outer contour of the thread 12, as represented explicitly in the longitudinal sectional view according to FIG. 4.

In the combined embodiment as shown, the thread 12 of the implant 1 as well comprises a first or shaped thread zone 30, in which the cross-section of the outer volume 28 enveloping the thread 12 has a number of main directions in which the radius measuring the distance between the center of the cross section and its outer contour takes a relative maximum value and thus a higher value than in neighbouring orientations. In addition, in this embodiment the thread 12 comprises a thread circular zone 32, in the preferred embodiment as shown also positioned next to the apical end 4 of the implant 1, in which the cross-section of the outer enveloping volume 28 is basically circularly shaped, and, as seen in longitudinal direction of the implant, a thread transition zone 34 positioned between said first, shaped zone 30 and said second, circular zone 32, in which the geometry of the cross-section of said outer volume 28 enveloping the thread 12, as a function of a parameter characteristic for a coordinate in the longitudinal direction, changes from a basically circular shape next to said circular zone 32 to a shape in which the cross-section of said enveloping volume 28, in particular with respect to the general geometry of the cross section and/or the values of its characterizing parameters, corresponds to the shape of the cross section in said first or shaped zone 30.

An alternative embodiment of this group of embodiments of the present invention is shown in FIG. 5. This embodiment can be used separately or in combination with the embodiment of FIG. 4. In this alternative embodiment, the dental implant 1" in analogy to the embodiment of FIG. 4 also features an enveloping volume 28 of the thread 12 comprising the thread circular zone 32 and the thread shaped zone 30. Instead of or in addition to the thread transition zone 34, however, the dental implant 1" comprises a second thread shaped zone 34", in which second thread shaped zone 34"—as in the first thread shaped zone 30—the cross-section of the outer volume 28 has a number of main directions in which the radius measuring the distance between the center of the cross section and its outer contour takes a relative maximum value and thus a higher value than in neighbouring orientations. The second thread shaped zone 34" is positioned, as seen in longitudinal direction of the implant 1, between the zones 30, 32. In order to allow for the desired smooth and beneficial transition between the zones 30, 32, in this embodiment in the first thread shaped zone 30 the thread eccentricity parameter defined as the ratio of the maximum radius of the cross section of the outer volume 28 to its minimum radius is larger than in the second thread shaped zone 34". Evidently, as a further option this second shaped zone 34" may by itself also be constituted from a sequence or number of individual shaped zones of this type, having different eccentricities.

The implant 1, 1" due to its transition zones 26, 26', 34, 34", is designed specifically for a smooth and beneficial transition (during the screwing in process) between first engagement of the thread 12 in the bone tissue (in the core circular zone 20 and/or the thread circular zone 32) to the shaping and direct treatment of the bone tissue by varying compression (in the shaped zone 22, 30). In order to improve the smooth transition between these zones even further, the core body 2 in the transition zone 26 is conical or tapered, in particular with a cone/taper angle of between 1° and 12°, preferably between 4° and 8°.

The cross section of the core body 2 can be characterized by an eccentricity parameter defined as the ratio of the maximum radius of the cross section to its minimum radius. This eccentricity parameter, which adopts the value 1 for circular shape, is characteristic for the deviation of the respective cross section from circular shape. In order to provide a particularly smooth transition between the core circular zone 20 with circular cross section and the core shaped zone 22 with non-round cross section, this eccentricity parameter in the transition zone 26 has a linear dependency on the coordinate parameter of the implant 1 in longitudinal direction. In the example shown, the core body 2 in its core shaped zone 22 has an eccentricity value of about 1.1. The same concept can be used for the transition zone 34 of the thread 12 and the eccentricity parameter of the outer volume 28 in the thread shaped zone 30.

In the following, various considerations regarding the individual elements and components of the implant 1, 1" and their geometry parameters are discussed by reference to the group of embodiments according to implant 1. Obviously, they may as well be applied to the group of embodiments according to implant 1" or a combination of these groups of embodiments.

The positions and boundaries of the various core zones 20, 22, 26 (or 26', resp.) and the various thread zones 30, 32, 34 (or 34', resp.) in longitudinal direction of the implant 1 may differ in differing embodiments, seven of which are shown as general examples in FIGS. 6 through 9. In each of these representations, FIGS. 6a, 7a, 8a, 9a, show a perspective view of the respective implant 1, FIGS. 6b, 7b, 8b, 9b show a longitudinal sectional view of the respective implant 1, and FIGS. 6c through 6e, 7c through 7e, 8c through 8e, and 9c through 9e show the cross sections of the outer contour of the core body 2 and the outer contour of the enveloping volume 28.

In the embodiment of FIG. 6, the core body 2 and the enveloping volume 28 in their cross sections are tri-oval from crest-mid portion to the coronal end 6 in order to increase buccal bone and to help bone normalization.

In the embodiment of FIG. 7, in contrast, in a crestal zone 42 above transition line 4, the cross section of the core body 2 is round (as shown in FIG. 7c) with the outer contour of the enveloping volume 28 being tri-oval. This is done to improve torques and initial stability and implant strength during insertion while maintaining outside trioval shape for bone normalization effect and increased buccal bone.

In the embodiment as shown in FIG. 8, the cross section of the core body 2 is round over the entire length of the implant 1, and only the outer contour of the enveloping volume 28 is changing from round next to the apical end 4 to tri-oval next to the coronal end 6.

FIG. 9 shows an embodiment in which the cross section of the core body 2 in the middle of the implant 1 (FIG. 9d) is round while being tri-oval in the crestal zone 42. In the middle range, as shown in FIG. 9d, the region with round cross section of the core body 2 overlaps with the region of tri-oval cross section of the enveloping volume 28.

FIG. 10 by way of example shows an embodiment of the implant 1 together with the possible input data for CNC-machining of the respective shapes. In FIG. 10a, the implant 1 is shown in longitudinal sectional view, whereas FIG. 10b shows the implant 1 in side view. FIG. 10c is a longitudinal cross-section of the outer volume 28 of the thread of an embodiment of the implant 1, with said implant lying on the side of minimum radius. The profile of the outer volume 28 may be obtained by CNC-machining with a profile of the tooling matching at least one of the line shown in FIG. 10c. After machining the original material into this form, the thread 12 is machined by engraving the thread grooves, the depth of which is given by the profile as shown in FIG. 10d. This results in a final shape of the core body 2 as described above.

Figure 10A:
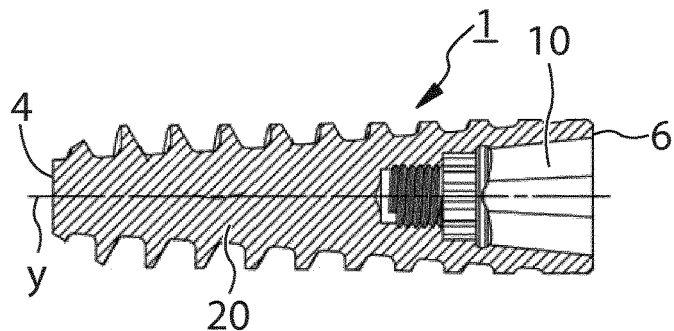
Figure 10E:
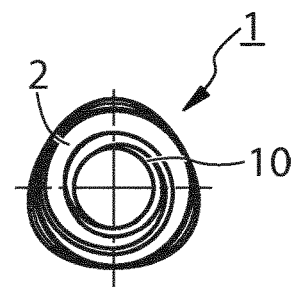
Figure 10B:
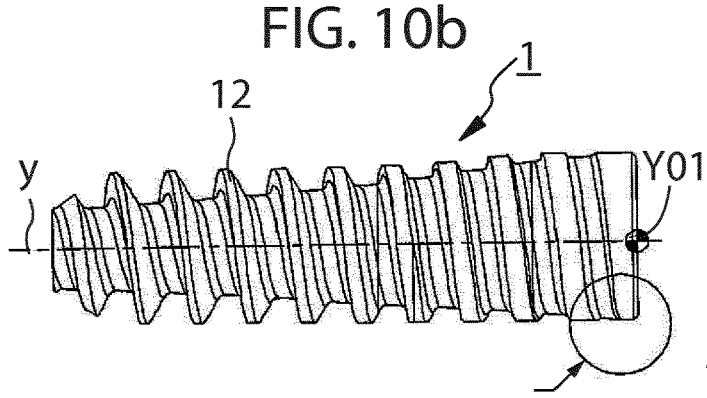
Figure 10F:
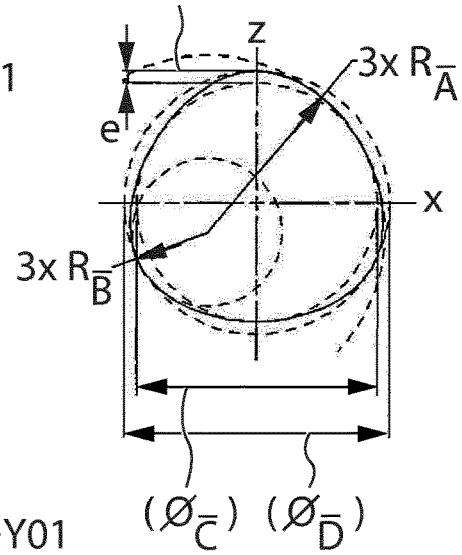

The triovality of the design of the implant 1 may be obtained by CNC machining the circular modes of which are shown in FIG. 10f. As can be seen from FIG. 10f, the differential ovality parameter e, which is an alternative definition for the shape of the core body 2/outer volume 28, and which is defined by the difference between the maximum radius of the cross section and its minimum radius, for a typical diameter of about 4 mm preferably is chosen to be about 0.23 mm.

Figure 10C:
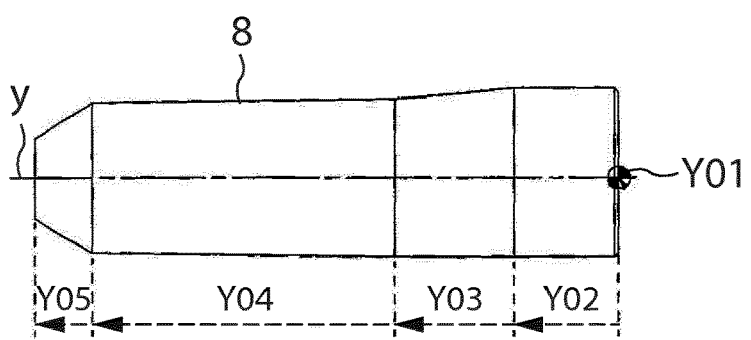

FIG. 10c also shows a plurality of longitudinal coordinates/points Y01 to Y05 along an axis y (implant longitudinal axis) defining zones along said axis y. Y01 is the point with coordinate 0 mm. In the embodiment shown in FIG. 10c the value of the ovality parameter e varies depending on the coordinate y along said axis. For example, in the first zone Y01-Y02 the ovality parameter e can have a constant value comprised/chosen between 0.10 and 0.50 mm, and more preferably between 0.20 and 0.25 mm. Furthermore, said zone Y1-Y2 (outer zone 1 or first outer zone) can be a zone with a constant eccentricity. In said zone Y1-Y2, the maximum diameter ØD of the outer volume 28 may be constant and have a value of 4 mm. Within the zone Y2-Y3 (outer zone 2 or second outer zone) the ovality parameter e may have a value varying from a value comprised/chosen between 0.20 and 0.30 mm at point Y2 and a value of 0 mm at point Y03. In said zone Y02-Y03, the maximum diameter ØD of the outer volume 28 may vary between 4 and 3.54 mm. The variation of the ovality parameter and/or the variation of eccentricity as above defined may be linear in said zone Y2-Y3. Finally, the ovality parameter e may have a value of 0 mm between points Y03 and Y05. As a non limiting example, the outer volume 28 can have a conical shape between points Y03 and Y04 (outer zone 3 or third outer zone), with a diameter varying between 3.54 and 3.40 mm. The outer volume 28 can also have a conical shape between points Y04 and Y05 (outer zone 4 or fourth outer zone) with a diameter varying between 3.40 and 1.80 mm.

Obviously the length of each zone depends on the total length of the implant but as a non limiting example for an implant with a total length of 13 mm, Y2 can be located at 2.30 mm from Y1, Y3 can be located at 5 mm from Y1, Y4 can be located at 11.70 mm from Y1 and Y5 can be located at 13 mm from Y1.

Figure 10D:
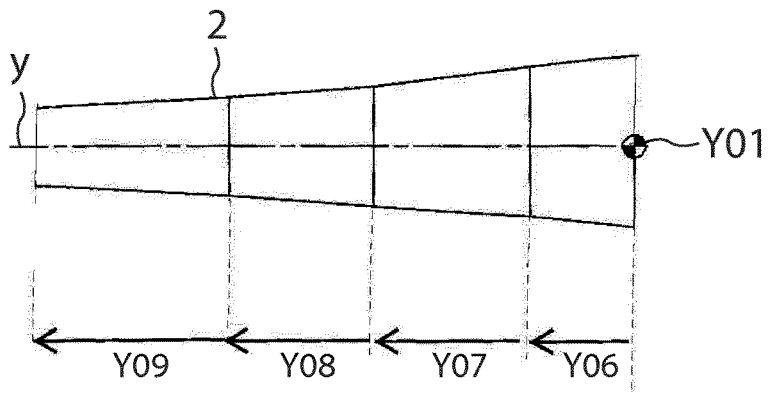

FIG. 10d shows a longitudinal cross-section of the core body 2 of implant 1 of FIG. 10a. FIG. 10d also shows a plurality of longitudinal coordinates/points Y6 to Y09 located along the axis y. Said points also define zones along said axis y. Y1 is the point with coordinate 0 mm. In the embodiment shown in FIG. 10d the value of the ovality parameter e varies depending on the coordinate y along said axis. For example, in the first zone Y1-Y6 the ovality parameter e can have a constant value comprised/chosen between 0.10 and 0.50 mm. In said first zone, the maximum core diameter ØD can varies along the longitudinal axis between 4 and 3.60 mm. Said zone Y1-Y6 (core zone 1 or first core zone) can have a constant eccentricity. Within the zone Y6-Y7 (core zone 2 or second core zone) the ovality parameter e may have a value varying from a constant value comprised/chosen between 0.10 and 0.50 mm at point Y6 and a value of 0 mm at point Y7. The variation of the ovality parameter may be linear in said zone Y6-Y7. In said zone Y6-Y7 the maximum core diameter ØD may vary between 3.30 and 2.70 mm. Finally, the ovality parameter e may have a value of 0 mm between points Y07 and Y09. As a non-limiting example, the core body 2 can have a conical shape between points Y07 and Y08, with a core diameter varying between 2.70 and 2.2 mm (core zone 3 or third core zone) and a conical shape between points Y08 and Y09 (core zone 4 or fourth core zone) with a core diameter varying between 2.2 and 1.6 mm.

Obviously the length of each zone depends on the total length of the implant but as a non limiting example for an implant with a total length of 13 mm, Y6 can be located at 2.30 mm from Y1, Y7 can be located at 5 mm from Y1, Y8 can be located at 11.70 mm from Y1 and Y9 can be located at 13 mm from Y1.

Figure 11:
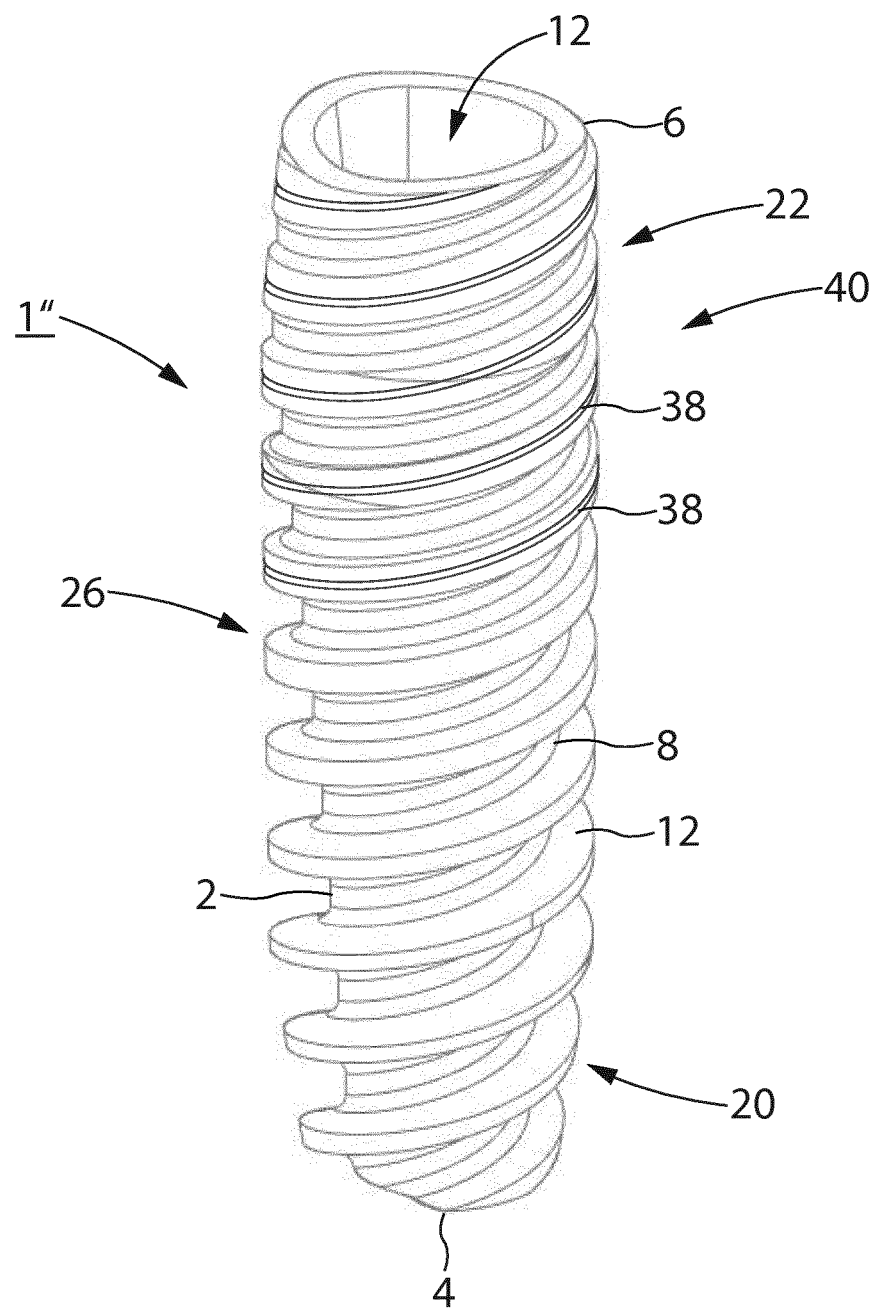
Figure 12A:
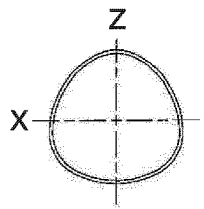
Figure 12B:
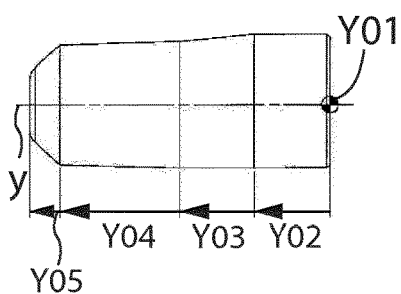
Figure 12C:
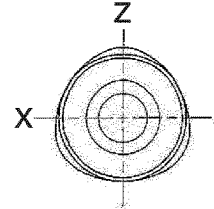
Figure 12D:
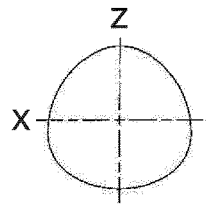
Figure 12E:
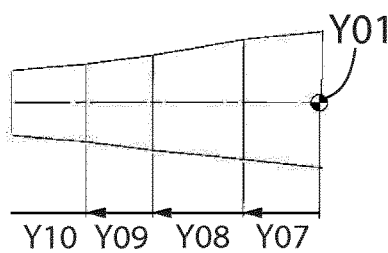
Figure 12F:
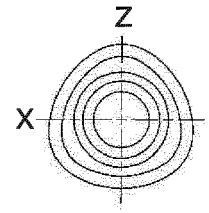
Figure 12G:
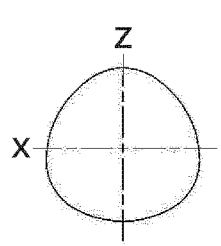
Figure 12H:
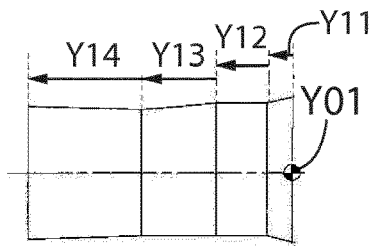
Figure 12I:
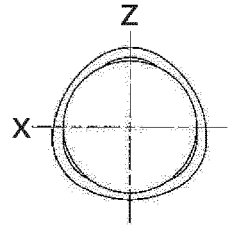
Figure 12J:
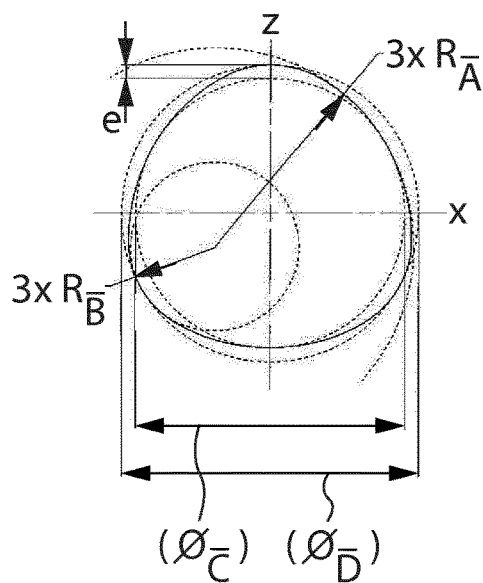

Yet another alternative embodiment of the present invention is shown in FIG. 11. This embodiment can be used separately or in combination with the embodiments of FIG. 1 and/or FIG. 2. In this alternative embodiment as shown in FIG. 11, the dental implant 1" in analogy to the embodiments of FIG. 1 and/or FIG. 2 also is equipped with a core body 2 comprising the core circular zone 20, the core shaped zone 22, the circular thread zone 32, and a thread shaped zone 30, however, this alternative embodiment may also be used without one or more of these zones. In this alternative embodiment, the thread 12 in a coronal section is superimposed by an additional groove 38 defined in the outer width or face of the thread 12. This additional groove promotes bone attachment to the implant. This groove 38 in accordance with its groove depth defines a bottom level at its bottom. For better explanation of the design of the alternative embodiment, in the following it is referred to the "bottom volume" as defined by the bottom levels of the groove 38 in the thread 12. In other words, this "bottom" volume (also called "groove core volume") is a volume passing by all the most internal points of the grooves or by all points of the grooves closest to the longitudinal axis of the implant 1". In the combined embodiment as shown in FIG. 11, the groove 38 in the thread 12 of the implant 1 as well comprises a first or shaped groove zone 40, in which the cross-section of the bottom volume in the thread 12 has a number of main directions in which the radius measuring the distance between the center of the cross section and its outer contour takes a relative maximum value and thus a higher value than in neighbouring orientations.

In analogy to FIG. 10, FIG. 12 by way of example shows the possible input data for CNC-machining of the respective shapes for the implant 1". In particular, FIG. 12a shows the right side view of the outer volume 28, FIG. 12b the profile of the outer volume 28, FIG. 12c the left side view of the outer volume 28. FIG. 12d the right size view of the core body 2, FIG. 12e the profile of the core body 2, FIG. 12f the left side view of the core body 2, FIG. 12g the right side view of the bottom volume, FIG. 12h the profile of the bottom volume, FIG. 12i the left side view of the bottom volume, and FIG. 12j the circular modes for CNC machining. As can be seen from FIG. 12j, the differential ovality parameter e, which is an alternative definition for the shape of the core body 2/outer volume 28/bottom volume, and which is defined by the difference between the maximum radius of a cross section and its minimum radius, for a typical maximum diameter of about 4.20 mm preferably is chosen between 0.10 and 0.50 and more preferably can be about 0.23 mm.

In the embodiment of FIG. 12 the variation of the ovality parameter e, and therefore of the eccentricity parameter, for the core body 2/outer volume 28/bottom volume along the longitudinal axis y of the implant is similar to what has been explained in relation with FIG. 10 and reference is made to said explanation. The main differences between the embodiment of FIGS. 10 and 12 is the length of the implant and the presence of grooves in the embodiment of FIG. 12. As a non limiting example, the implant of FIG. 12 might have a total length of 9 mm and have the points with the following coordinates from Y01:

for the outer volume 28 (see FIG. 12b): Y02 at 2.30 mm, Y03 at 4.5 mm, Y04 at 8.10 and Y05 at 9 mm for the core body: Y07 at 2.30 mm; Y08 at 5 mm; Y09 at 7 mm and Y10 at 9 mm for the "bottom" volume or "groove core volume": Y11 at 0.75 mm; Y12 at 2.30 mm; Y13 at 4.50 mm and Y14 at 7.90 mm As a non-limiting example, between points Y01 and Y02, the implant might have a maximum outer diameter ØD of 4.20 mm. Between points Y02 and Y03 the implant might have a maximum outer diameter ØD varying between 4.20 and 3.80 mm. Between points Y03 and Y04 the implant might have a conical shape with an outer diameter varying between 3.80 and 3.57 mm and between points Y04 and Y05 the implant might have an outer diameter varying between 3.57 and 1.90 mm.

Furthermore, and as a non limiting example, between points Y01 and Y07, the implant might have a maximum core diameter ØD varying between 4.20 and 3.78 mm. Between points Y07 and Y08 the implant might have a maximum core diameter varying between 3.78 and 2.84 mm. Between points Y08 and Y09 the implant might have an outer diameter varying between 2.84 and 2.31 mm and between points Y09 and Y10 the implant might have an outer diameter varying between 2.31 and 1.68 mm.

Furthermore, the "bottom" volume or "groove core volume" may have a differential ovality parameter e varying along the y axis. As a non limiting example, the ovality parameter e may have a constant or varying value comprised/chosen between 0.10 and 0.50 mm. In one embodiment, the "bottom" volume or "groove core volume" may have parameters varying as follows:

- from Y1 to Y11 (first bottom volume zone) the differential ovality parameter e, may have a value, for example constant, comprised between 0.10 and 0.50 mm, and the eccentricity may be constant,
- from Y11 to Y12 (second bottom volume zone) e may vary from a starting value chosen between 0.20 and 0.30 mm and a final value of 0 mm, the variation may be linear and the eccentricity may also vary linearly,
- from Y12 to Y13 (third bottom volume zone) e may have a value of 0 mm, and the "bottom" volume or "groove core volume" may have a conical shape tapering down toward the axis y,
- from Y13 to Y14 (fourth bottom volume zone) e may have a value of 0 mm, and the "bottom" volume or "groove core volume" may have a conical shape.

It has to be noted that the differential ovality parameter e (and therefore the eccentricity value) can be different, in a given cross section, for each one of the core body 2, the outer volume 28 and or/the bottom volume. The ovality parameter e can have a value comprised/chosen between 0.10 and 0.50 mm. In some embodiment the ovality parameter e can have a value of 0.15, 0.20, 0.23, or 0.30 mm.

An implant according to the invention can therefore comprise an enveloping volume 21 and/or a core body 2 and/or a groove core volume having:

- at least one coronal zone (also called first shaped zone) or portion extending along the implant's longitudinal axis y with a maximum, for example constant, eccentricity. Said maximum eccentricity can be comprised between 1.05 and 1.2 and can extend between for example 0 and 80% of the total length of the implant. In some embodiments, the coronal zone extends on about 30%, 45%, 60% or 70% of the total length of the implant;
- at least one transition zone or portion extending along the implant's longitudinal axis y with an eccentricity varying between said maximum eccentricity and a minimum eccentricity, said variation can be linear, and
- at least one apical zone (also called circular zone) or portion extending along the implant's longitudinal axis y with said minimum constant eccentricity.

An implant according to the invention can therefore comprise an enveloping volume 21 and/or a core body 2 and/or a groove core volume having:

- at least one coronal zone (also called first shaped zone) or portion extending along the implant's longitudinal axis y with a maximum, for example constant, eccentricity. Said maximum eccentricity can be comprised between 1.05 and 1.2. The coronal zone can extend, on at least 10%, on at least 15%, on at least 20 or on at least 25% of the total length of the implant,
- at least one transition zone or portion extending along the implant's longitudinal axis y with an eccentricity varying between said maximum eccentricity and a minimum eccentricity, said variation can be linear, the transition zone can extend on at least 10%, on at least 15%, on at least 20% or on at least 25% of the total length of the implant,
- and at least one apical zone (also called circular zone) or portion extending along the implant's longitudinal axis y with said minimum constant eccentricity. The apical zone can extend on at least 30%, on at least 35%, on at least 40%, on at least 45% or on at least 50% of the total length of the implant.

The table under gives different, non-limiting possible values of length of each zone of the implant depending on the total length of the implant.

| | End of coronal zone in mm | End of transition zone in mm | End of apical zone in mm |
|---|---|---|---|
| Implant lenght in mm: 13 | | | |
| 13 | 2.35 | 5 | 13 |
| % of implant enveloping volume | 18.07692308 | 20.38461538 | 61.53846154 |
| | 2.3 | 5.7 | 13 |
| % of implant core body | 17.69230769 | 26.15384615 | 56.15384615 |
| Implant lenght in mm: 9 | | | |
| 9 | 2.35 | 5 | 9 |
| % of implant enveloping volume | 26.11111111 | 29.44444444 | 44.44444444 |
| | 2.3 | 5.7 | 9 |
| % of implant core body | 25.55555556 | 37.77777778 | 36.66666667 |
| Implant lenght in mm: 11 | | | |
| 11 | 2.35 | 5 | 11 |
| % of implant enveloping volume | 21.36363636 | 24.09090909 | 54.54545455 |
| | 2.3 | 5.7 | 11 |
| % of implant core body | 20.90909091 | 30.90909091 | 48.18181818 |

Figure 35:
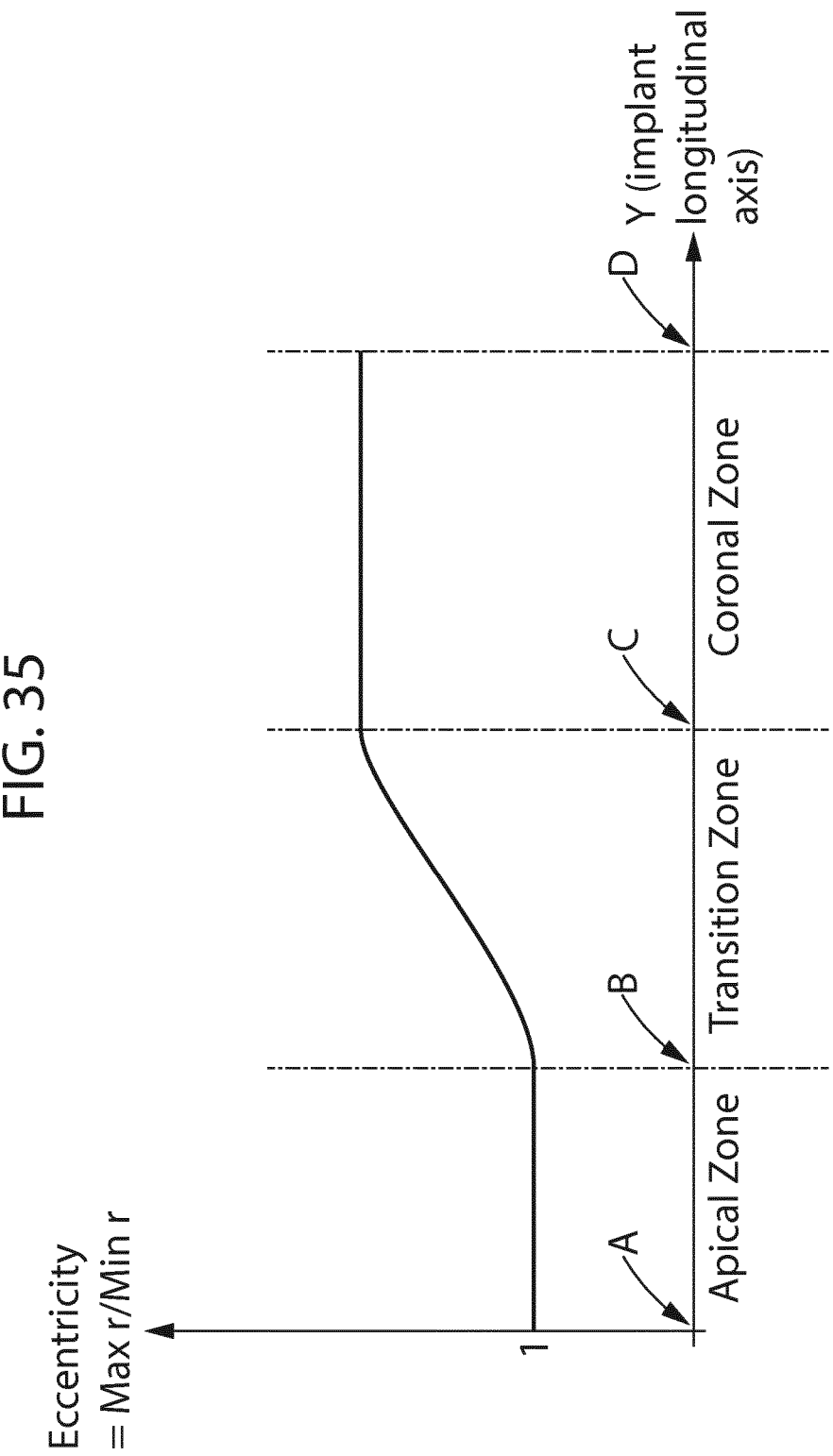
FIG. 35 is a graph showing a possible variation of an eccentricity for certain parts of the implant along the implant longitudinal axis.

FIG. 35 is a graph giving the different values (variation or evolution) of the eccentricity of the core body 2 and/or of the thread enveloping volume 28 and/or of the groove shaped zone 40 depending on the position along the implant's longitudinal axis in certain embodiments. As can be seen in FIG. 35, the apical zone of the core body 2 and/or of the thread enveloping volume 28 and/or of the groove shaped zone 40 can have a constant minimal eccentricity equal to 1 between a point A and a point B. The core body 2 and/or for the thread enveloping volume 28 and/or the groove shaped zone 40 can also have a transition zone, starting at point B, wherein the eccentricity varies from said constant minimal eccentricity until a maximum eccentricity value at point C. After point C, the core body 2 and/or the thread enveloping volume 28 and/or of the groove shaped zone 40 can have a coronal zone wherein the eccentricity has a constant maximal value. As previously mentioned said constant maximal eccentricity value can be comprised between 1.05 and 1.2.

In some embodiments and in particular for the core body 2 and/or for the thread enveloping volume 28, point A can represent the apical end of the implant and point D the coronal end of the implant. Point A, B, C and D do not always have the same coordinate for the core body 2, for the thread enveloping volume 28 or of the groove shaped zone 40. Point A is to be understood as being the most apical point of the core body 2, of the thread enveloping volume 28 or of the groove shaped zone 40. As can be seen on FIG. 35 the shape of the eccentricity curve has no sharp corners, it is a continuous line with only one tangent at every point.

In addition to the geometrical design of the core body 2 and/or the thread 12 as described above, in a preferred alternative embodiment, the details of which also are considered independent inventions, additional means may be provided in order to support reliable engagement with the bone tissue at high primary stability. For this purpose, in the embodiments shown in FIGS. 13 through 18 cutting flutes 46 are provided in the threaded portion of the implant 1, 1', 1". FIGS. 13 through 18 each show a perspective view of the respective implant in which the various core/thread zones 20, 22, 26, 30, 32, 34 are indicated by variations in the hatching. In these embodiments, in selected segments or in the entire core body 2 and thread 12, a number of cutting flutes 46, preferably equal to the number of main directions of the core body 2 and/or thread 12, may be provided in the transition zone 26 and/or in other zones 20, 22 of the implant 1. These cutting flutes 46 each feature a cutting edge 48 (see FIG. 19) which upon screwing in of the implant 1 takes off bone material, thereby allowing for enhanced cutting abilities of the implant 1 during screwing in. Obviously, even though the groove 38 is not shown in the embodiments of FIGS. 13 through 18, in another alternative embodiment any of these shown may also be equipped with the groove 38. With respect to arrangement and/or design, the cutting flutes 46 have specific features that are considered an independent invention and may be used, as shown in the FIGs., together with the features of the implant 1 and/or implant 1" and or implant 1' as explained above, or in otherwise conventional implant or screw systems.

FIGS. 13 through 15 show embodiments of the implant 1 of FIG. 1 in which the position and/or length of the cutting flutes vary, preferably in accordance with specific demands of the individual implant design. These embodiments form a variation with a number of cutting flutes 46 which in longitudinal direction extend along parts of the transition zones 28, 34 and parts of the shaped zones 22, 30.

In the embodiment shown in FIG. 13, the core body 2 and the outer thread are configured to have matching outer contours, i.e. next to the apical end 4, both the core circular zone 20 and the threaded circular zone 32 are positioned. Neighboring these, both the core transition zone 26 and the thread transition zone 34 are positioned in a manner overlapping each other. Next to the coronal end 6, the core shaped zone 22 is positioned together with the thread shaped zone 30, both in this embodiment having trioval cross-section.

FIG. 14 in contrast shows an embodiment in which zones of different type and cross-section overlap partly. In particular, next to the apical end 4, both the core circular zone 20 and the thread circular zone 32 are positioned, each starting at the apical end 4. As indicated by the variation in hatching, for the core 2—as seen in longitudinal direction—the transition from the core circular zone 20 to the core transition zone 26 is positioned at a crossover position 43 while the thread 12 still is within its circular zone 32. At crossover position 43a, the core transition zone 26 ends and the core shaped zone 22 starts, and at a position within the core shaped zone 22, the thread circular zone 32 crosses over into the thread transition zone 34. At a position even further towards the coronal end 10, at crossover position 43b, the core shaped zone 22 ends again and transitions into another transition zone 26. At the same crossover position 43b, the thread transition zone 34 transitions into the thread shaped zone 30. Therefore, in this embodiment various zones for the core and the thread overlap with each other partly in various combinations.

FIG. 15 again shows an embodiment in which the core body 2 and the outer thread 12 are configured to have matching outer contours, i.e. next to the apical end 4, both the core circular zone 20 and the threaded circular zone 32 are positioned. Neighboring these, both the core transition zone 26 and the thread transition zone 34 are positioned in a manner overlapping each other. Next to the coronal end 10, the core shaped zone 22 is positioned together with the thread shaped zone 30, both in this embodiment having trioval cross-section.

Figure 18:
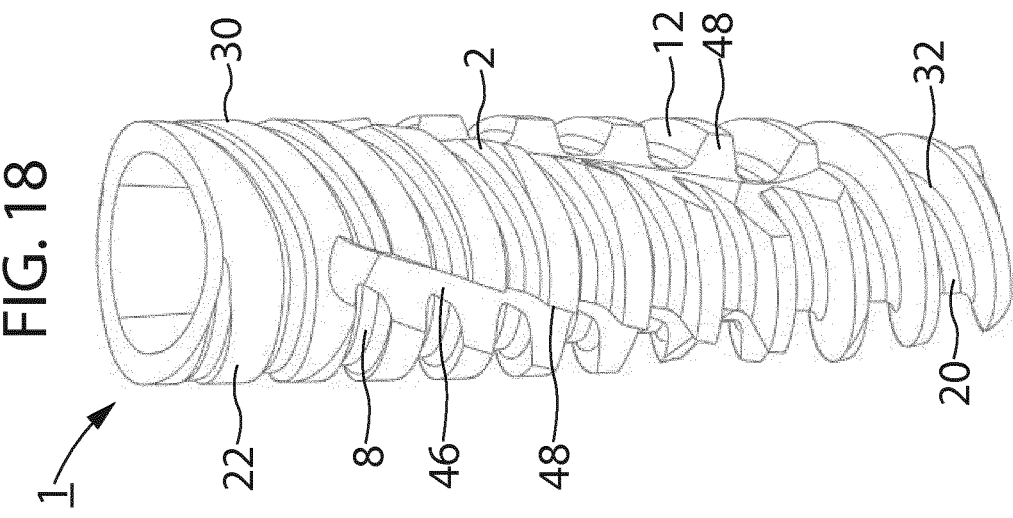
Figure 17:
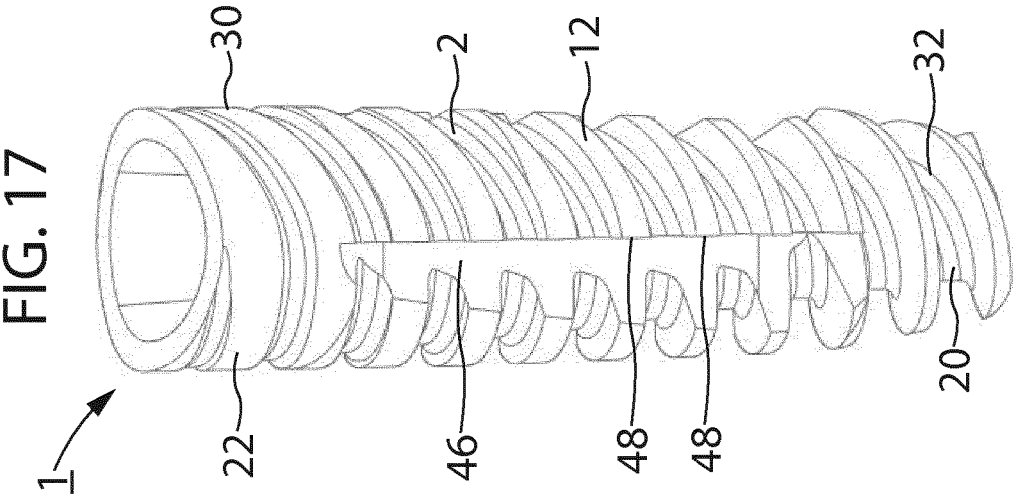
Figure 16:
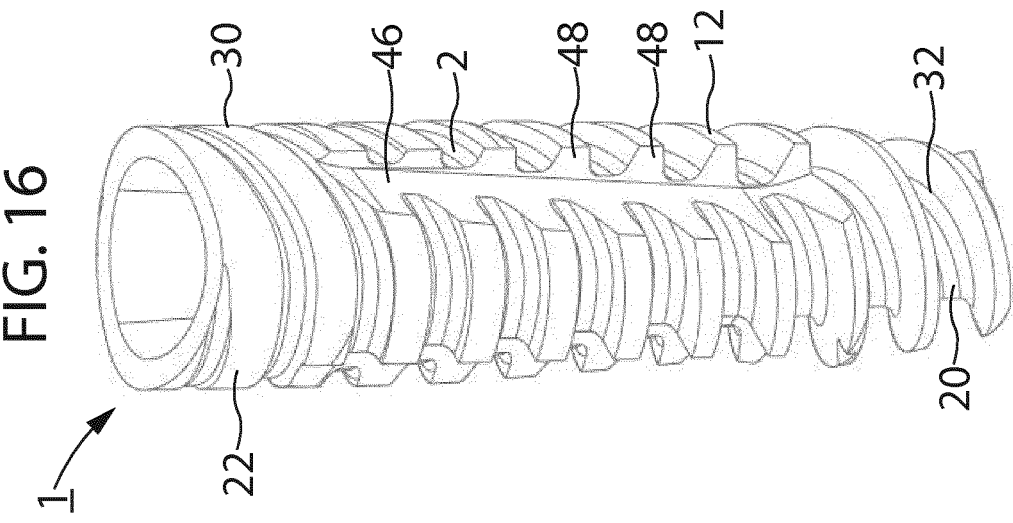

As shown in the examples according to FIGS. 16 through 18, the cutting flutes 46 may have various orientations such as basically parallel to the longitudinal axis of the implant 1 (example of FIG. 16), tilted with respect to the longitudinal axis of the implant 1 (as in FIG. 17) or curved and winding around the outer surface 8 of the core body 2 as shown in FIG. 18.

Figure 19:
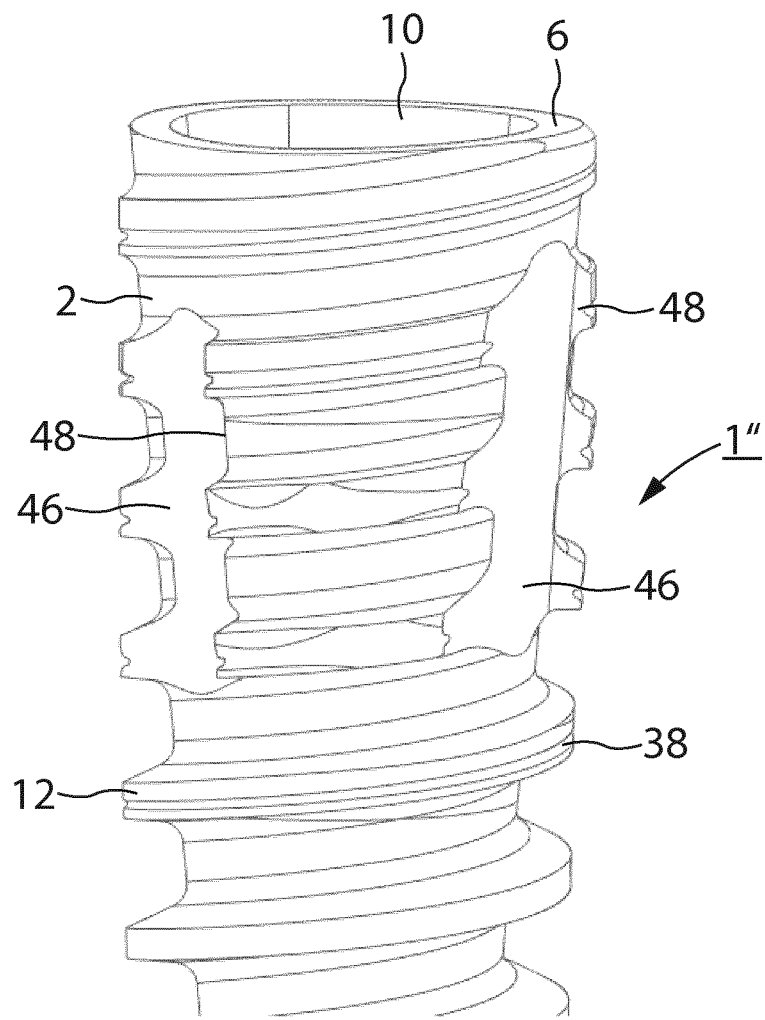
FIG. 19 is a side perspective view of the coronal section of a preferred embodiment of the implant of FIG. 11.

Another preferred embodiment is shown in FIG. 19, based upon the basic implant design of the implant 1". FIG. 19 shows a side view of the top or coronal section of the implant 1". Obviously, with respect to number and positioning of the cutting flutes 46, the concept shown may as well be used for any other of the preferred implant concept, or even for conventional implant/screw designs. In the embodiment as shown in FIG. 19, which also by itself is considered an independent invention, the cutting flutes 46 are positioned in the threaded region of the implant 1". With respect to their position in "z-direction", i.e. in longitudinal direction of the implant 1", they are positioned with a displacement relative to their neighboring cutting flute 46, such that in their positions the cutting flutes 46 follow the pitch of the thread 12. By this design, it can be made sure that on screwing in the implant 1" into the bone tissue, the individual thread 12 engaging the bone material will provide the cutting effect on the same bone zone by consecutive cutting edges 46.

Figure 21:
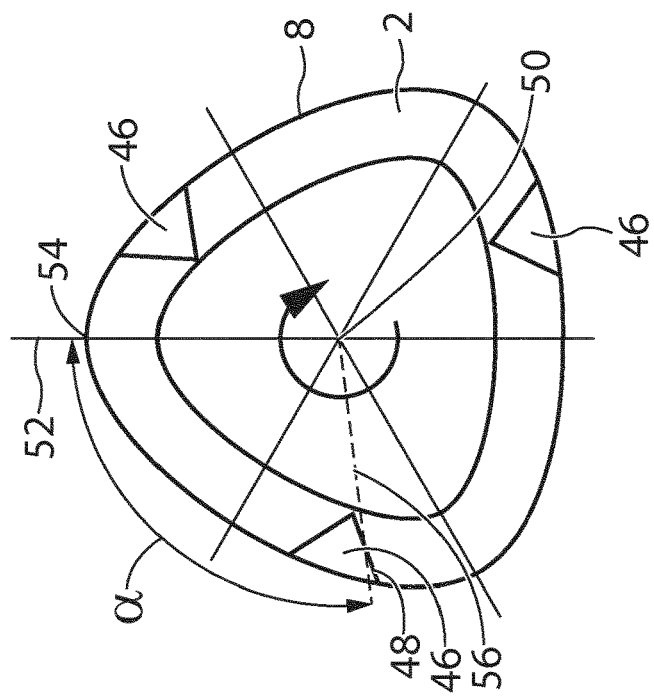
FIG. 21 is schematical a cross section of the implant of FIG. 20.
Figure 20:
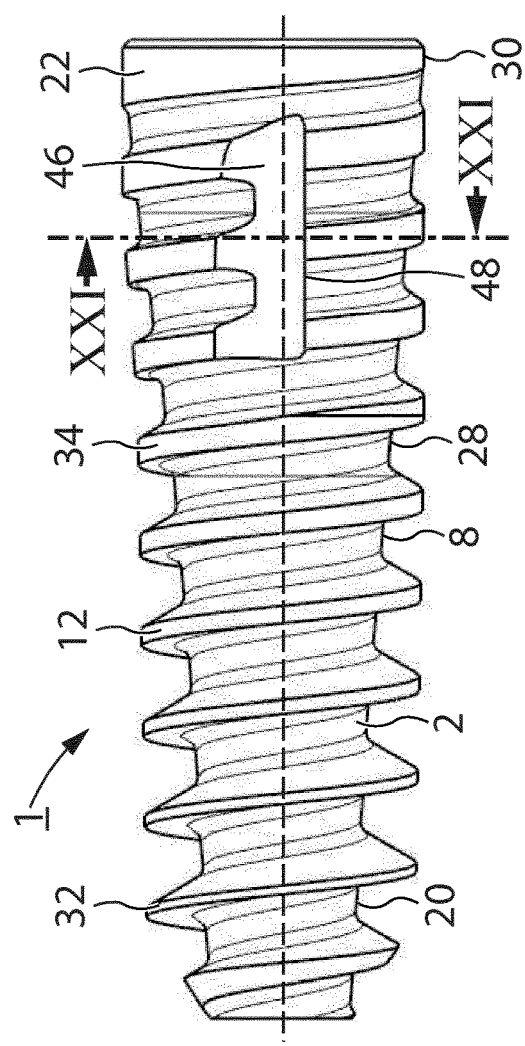
FIG. 20 is a side view of a dental implant according to an embodiment of the invention.

FIG. 20 shows the implant 1 of FIG. 1 in a variation with a number of cutting flutes 46 which in longitudinal direction extend along parts of the transition zones 28, 34 and parts of the shaped zones 22, 30. FIG. 21 shows (schematically) the cross section of the implant 1 of FIG. 20 in the position as indicated in FIG. 20. As can be seen in FIG. 21, the cross-section of the core body 2 and its outer surface 8 has trioval shape. In other words: in its core shaped zone 22, the cross section of the core body 2 (as well as the cross section of the enveloping volume 28 of the thread 12) has a number (i.e. three) of main directions in which the radius measuring the distance between the center 50 of the cross section and its outer contour takes a relative maximum value ("maximum radius") and thus a higher value than in neighbouring orientations. In the drawing of FIG. 21, one of these main directions is oriented parallel to the vertical upwards direction as represented by line 52. The local maximum of the radius of the outer contour of the core body 2 in this main direction is in point 54. The other two main directions due to the symmetric positioning of the main directions with respect to the center 50 are at an angle of 120° with respect to the line 52.

The cutting flutes 46 in this example are also positioned symmetrically around the center 50, i.e. the angle between two neighboring cutting flutes is 120° as well. The cutting flutes 46 in rotational orientation are positioned appropriately in order to maximize cutting efficiency in the bone material, taking into account the relaxation effects in the bone tissue after a local maximum of the radius has passed during the screwing process. For this purpose, each cutting flute 46, as seen in orientational direction around the center 50 or the central longitudinal axis of the core body 2, is positioned at a given rotational offset to a neighboring main direction. In FIG. 21, the core body 2 is shown from top view (so on insertion the core body will be turned in right hand direction (or clockwise), and the rotational offset is represented by the angle α between the leading maximum as represented by the line 52 and the next trailing cutting flute 46 as represented by dotted line 56 pointing towards the respective cutting edge 48 of the cutting flute 46.

In the embodiment shown, this angle α is chosen in accordance with a selection criterion which by itself is considered an independent invention. According to this selection criterion, the cutting edge 48 should be positioned such that the cutting edge radius as defined by the intersection of dotted line 56 and outer surface 8, i.e. the outer limit of the radial extension of the cutting edge 48 from center 50, is between 20 and 75 μm less than the maximum radius. This criterion takes into account the specific elastic properties of the bone which depending on its density rebounds or relaxes by about this amount after compression. In the embodiment shown, the cutting edge radius is chosen to be about 35 μm less than the maximum radius, which in accordance with the remaining geometry parameters of the core body 2 converts into a preferred angle α of about 106°.

This preferred offset angle may also vary in dependence of the value of the maximum radius in order to reliably take into account the elastic properties of the bone material. Due to the preferred tapered design of the core body 2 and/or the outer volume 28, this maximum radius may vary as a function of a coordinate in longitudinal direction of the implant 1, thereby also rendering the preferred offset angle to be dependent on this coordinate in longitudinal direction. As a consequence, the resulting cutting flute 46 may be winding around the core body 2 of the implant 1.

In general, the thread 12 may be of any convenient thread profile, in particular a flat thread. The free width 58 of the thread 12, in dependence of the respective position in the longitudinal direction of the implant 1, is continuously increasing with increasing distance from the apical end 4. In this design, the thread 12 in the region close to the apical end 4 may feature a relatively sharp small outer width, thereby providing for high cutting ability when the thread 12 enters the bone tissue. With progressing screwing in of the implant 1 (i.e. the implant entering the bone tissue further), at a given position in the bone tissue the width 58 of the thread 12 continuously increases, thereby continuously widening the respective local gap in the bone tissue and constantly enhancing the contact area between bone tissue and implant.

In the embodiment of the invention as shown in the figures, the thread 12 is designed to have a specific profile in order to interact beneficially with the non-round cross section of core body 2 and/or thread 12. In this modification, which also by itself is considered inventive, in particular considered an independent invention, as can be seen in FIG. 22 and in the enlarged representation of FIG. 23, the thread 12 has a profile with an apical face 60 and with a coronal face 62, in which the apical face 60 is oriented basically orthogonal to the longitudinal axis 64 of the implant 1, i.e. the plane normal of the apical face 60 is oriented basically parallel to the longitudinal axis 64 of the implant 1. Furthermore, the coronal face 62 is oriented at an angle of about 60° to the longitudinal axis 64, i.e. the plane normal of the coronal face 62 is oriented at an angle of about 30° to the longitudinal axis 64 of the implant 1. This angle is represented by line 66. In other words, the thread 12 in total forms a so called buttress thread.

Due to this specific selection of the orientation of the apical face 60, which by itself is considered an independent invention, a potentially effect of the non round, for example trioval, shape may be compensated. This effect is an oscillation of the bone where the thread 12 is in contact as it is inserted. This means that when the implant 1 is inserted, the thread 12 will be in contact with the bone at intervals only.

Figure 24:
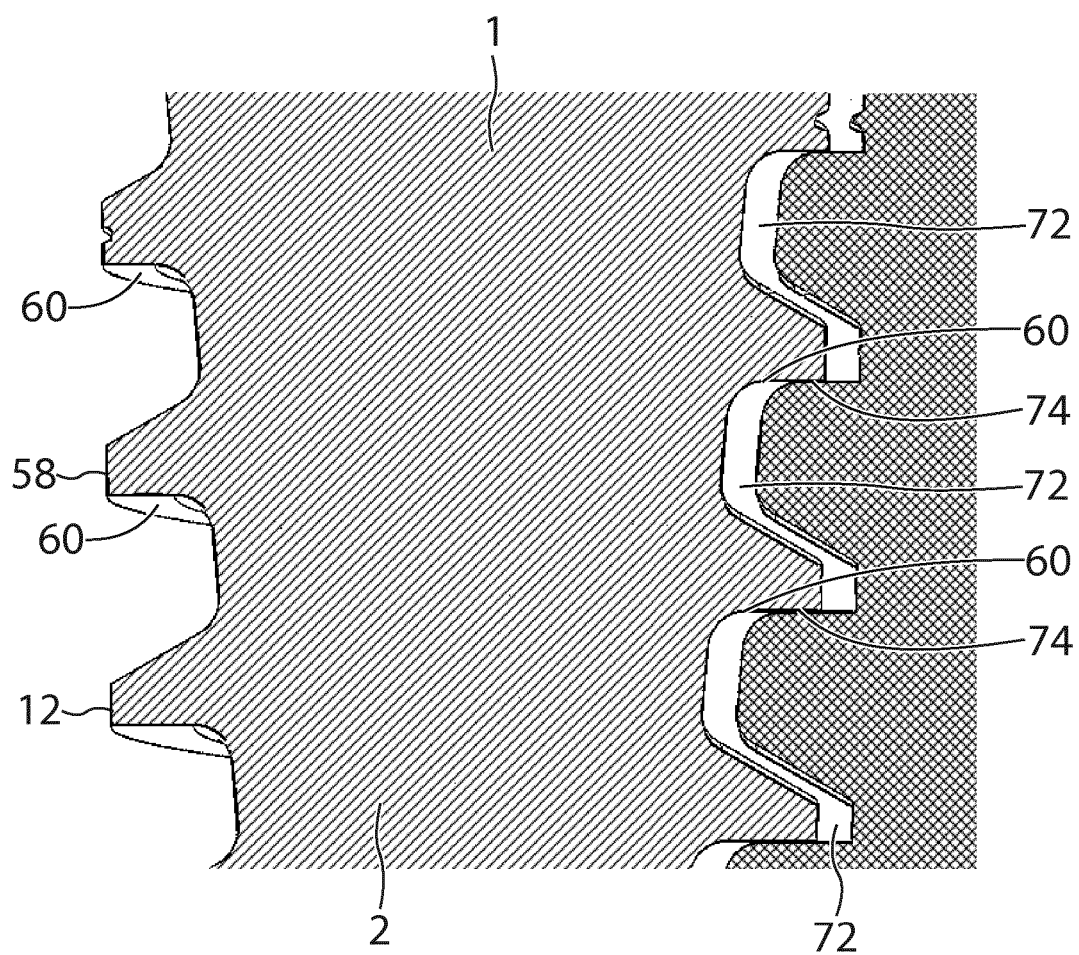
FIG. 24 is a longitudinal section of a portion of the implant of FIG. 1, 2, 11 after insertion into bone material, FIG. 25 are two views of the implant of FIG. 1, 2, 11 from a top perspective.

By making the apical side of the thread 12 at 90° to the longitudinal axis, the apical face will be in improved contact over the full thread length after insertion. This is shown in the enlarged segment according to FIG. 24. FIG. 24 in longitudinal section shows a segment of the implant 1 after being inserted into the bone material 70.

In the preferred embodiment shown, which also by itself is considered an independent invention, the depth of the thread 12 at its apical face 60 is selected with respect to enhanced primary stability after insertion. For this purpose, this preferred embodiment takes into account that in the core and/or thread shaped zone 22, 30 and/or in the core and/or thread transition zone 26, 34, after insertion, in order to absorb chewing forces, ideally the apical face 60 of the thread should be in physical contact with bone material 70 to the maximum extent possible. In this regard, the zones of minimum radius in the shaped/transition zone will assume final positions after insertion that have been passed by the preceding maxima, thereby creating voids 72 in which the bone tissue was pushed out. In order to nevertheless provide reliable platforms 74 in the bone material in which the apical face 60 of the thread can rest on a portion of bone material 70, the depth of the thread 12 at its apical face 60 is chosen to be larger, preferably at least twice as large, as the difference between the maximum and the minimum radius of the outer contour of the enveloping volume 28.

In yet another preferred embodiment, which also by itself is considered an independent invention, the implant 1 (as well as the implants 1', 1") is provided with an advanced connection system 80 for mechanically connecting the implant 1 and an associated abutment with each other. In the following, various embodiments for the advanced connection system 80 are described on the basis of implant 1. Obviously, all embodiments may as well be beneficially used for any other implant type in accordance with e.g. implants 1", 1''' as described above.

Figure 25A:
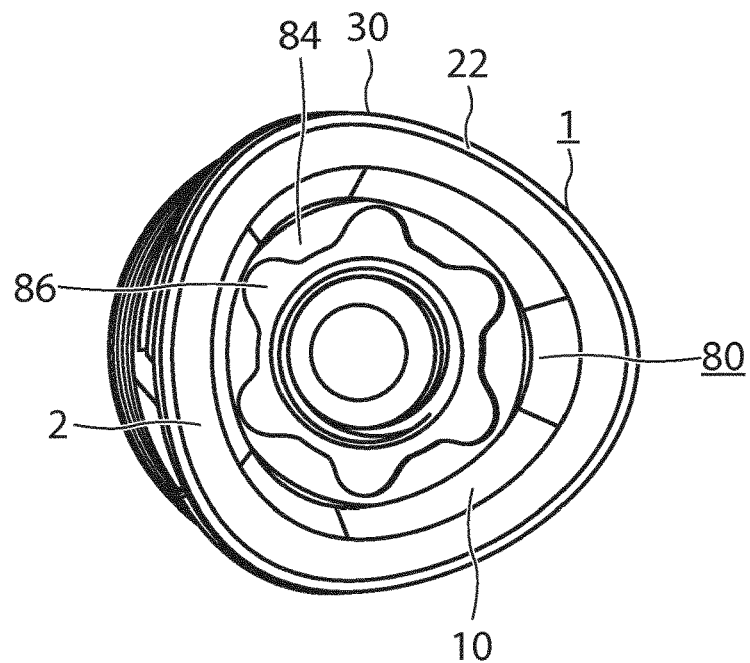
Figure 25B:
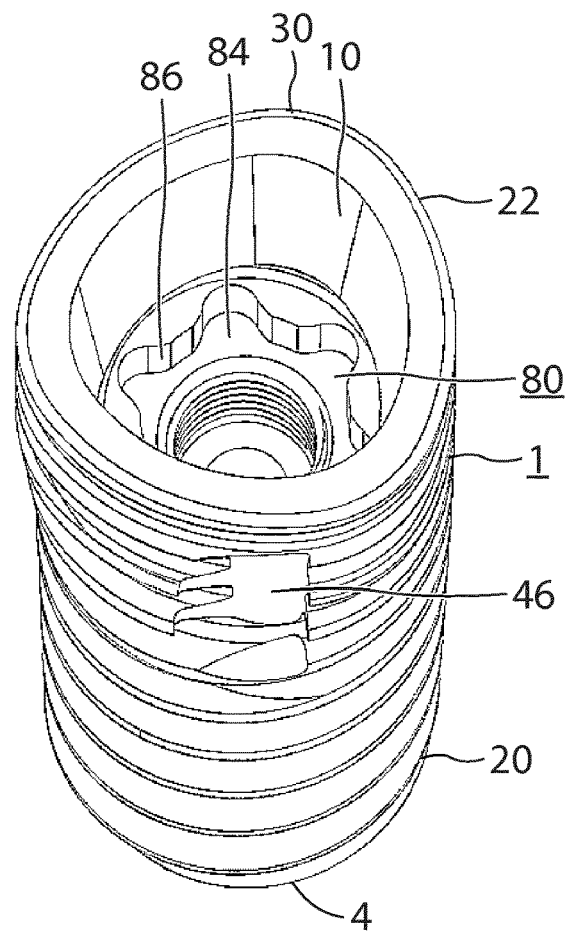

The connection system 80 comprises the receiving channel 10 into which a corresponding connection pin of the abutment can be inserted. In FIGS. 25a and 25b, the view onto the implant 1 from a direction as represented by arrow 82 in FIG. 4 is shown. As can be seen in FIG. 25, the cross section or outer contour in the non-round zones 22, 30 of the implant 1 is trioval, thereby providing three main directions in the transition zones 26, 34 and in the shaped zones 22, 30, respectively. These main directions, in which the respective radius of the cross section has a local maximum, are positioned symmetrically with respect to the central longitudinal axis of the core body 2. As is also evident from the representation in FIG. 25, the outer profile of the implant 1 as defined by the outer contour of the thread 12 matches or "follows" the outer contour of the core body 2. Accordingly, in those orientations in which the radius of the core body 2 has a local maximum, the outer contour of the thread 12 adopts a local maximum as well. Furthermore, due to the conical or tapered geometry of the core body 2 in the transition zone 26, the minimum radius of the core body 2 in the shaped zone 22 is bigger than the radius of outer contour of the thread 12 in the circular zone 20.

Figure 26:
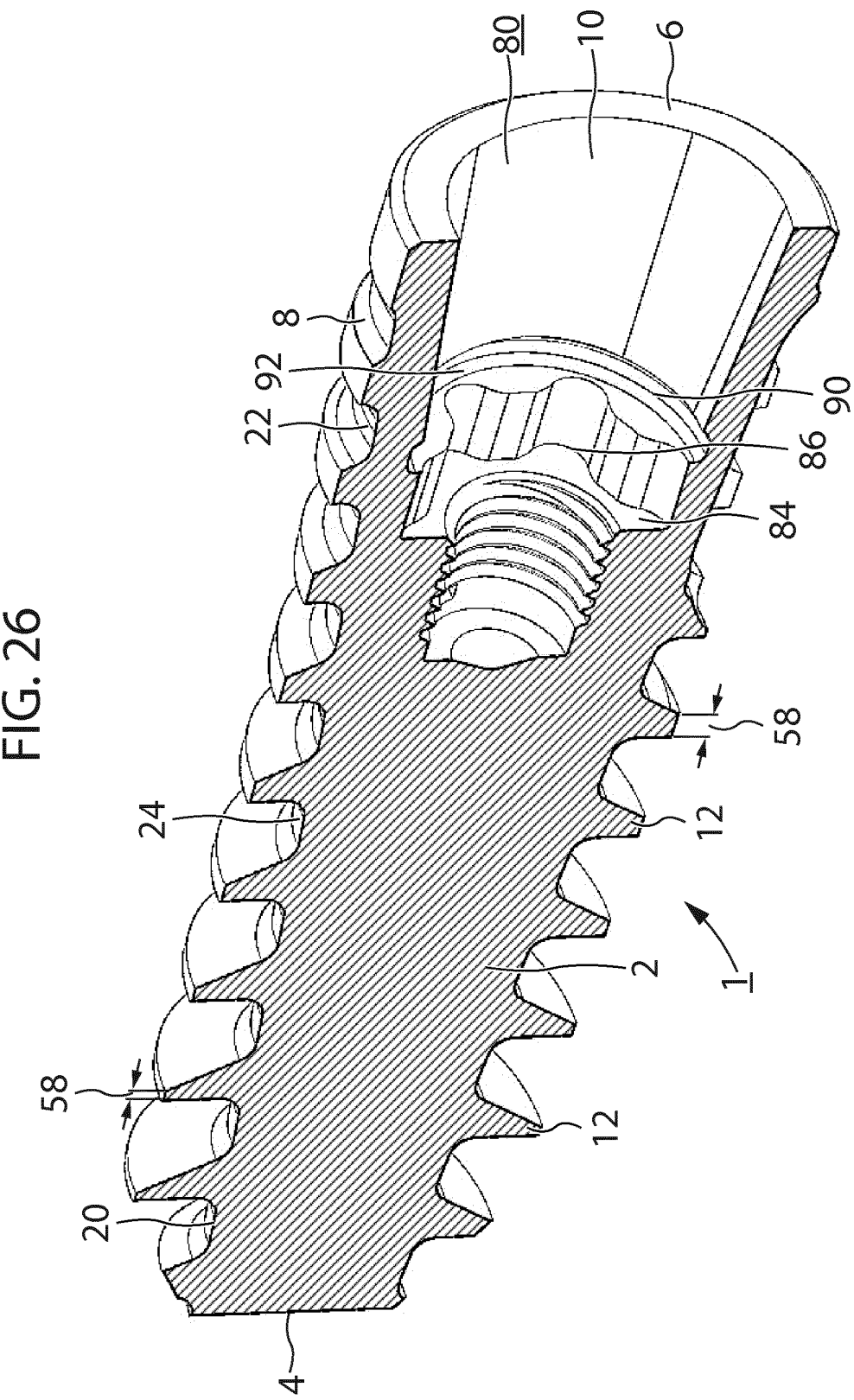
FIG. 26 is a longitudinal sectional perspective view of the implant of FIGS. 1, 2, and 11.
Figure 27:
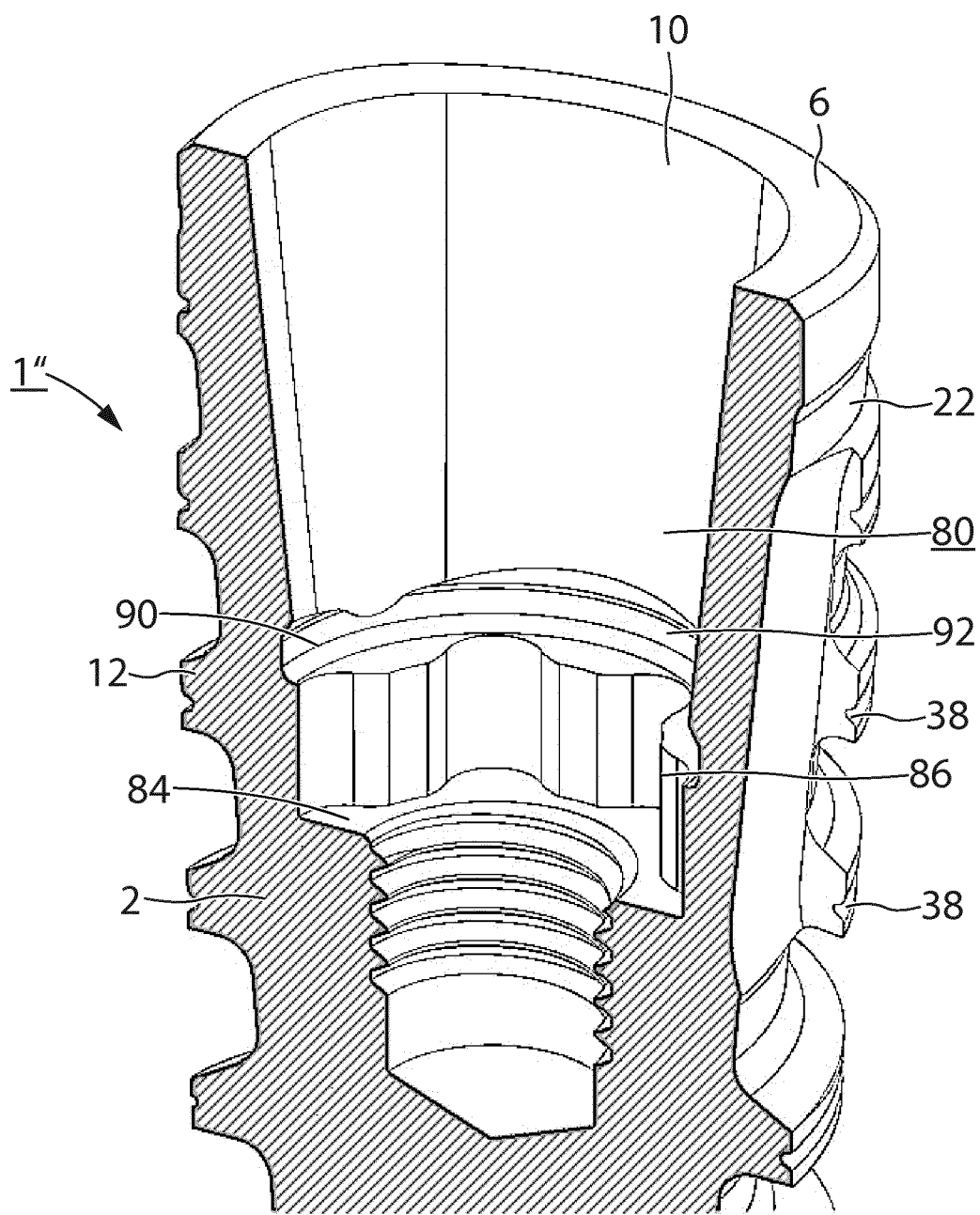
FIG. 27 is a longitudinal sectional perspective view of the top section of the implant of FIG. 1, 2, 11, showing the internal connection.

In addition, the receiving channel 10 also has an outer profile or contour that matches or "follows" both the outer contour of the thread 12 and the outer contour of the core body 2 of the implant 1. Accordingly, in those orientations in which the radius of the core body 2 and the outer contour of the thread 12 have a local maximum, the contour of the receiving channel 10 adopts a local maximum as well, i.e. also is trioval. Furthermore, the receiving channel 10 also is tapered, its cross section narrowing down on approaching its bottom end 84. Due to this shape, the receiving channel 10 together with its associated connector pin of the abutment provides a so called indexing structure which guarantees correct rotational alignment of the abutment when inserted. As can be seen in FIG. 25 and also in the longitudinal sectional view of the implant 1 according to FIGS. 26 and 27, for proper assembly of the abutment, the receiving channel 10 at its lower or bottom end 84 is provided with an indexing contour 86. This "second indexing", which in the preferred embodiment as shown in FIGS. 26, 27 has Torx-like cross section, may be used to transmit the torque required for insertion of the implant by inserting an appropriate tool. Due to the indexing contour 86, this torque can be applied without affecting the indexing contour of the actual receiving channel 10.

Figure 28:
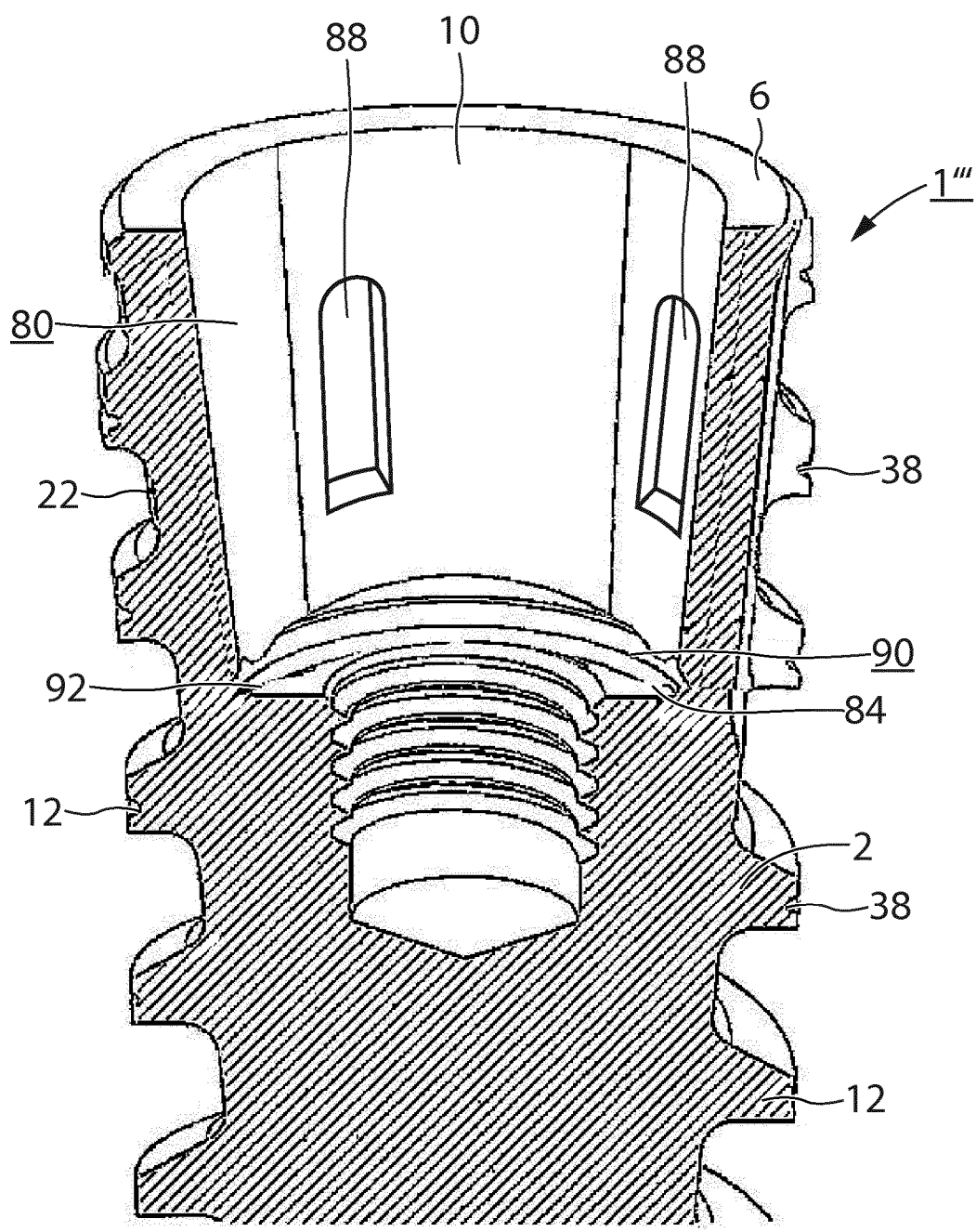
FIG. 28 is a longitudinal sectional perspective view of the top section of a dental implant according to another embodiment of the invention, showing an implant alternative internal connection.

In an alternative embodiment of an implant 1''' with a second indexing, as shown in FIG. 28, the second indexing contour may be integrated with the first indexing contour as provided by the receiving channel 10 with its non-round cross section. This in accordance with the embodiment shown is achieved by a number of slots 88 that are cut in the tapered side wall of the receiving channel 10. For the purpose of applying the torque necessary to insert the implant 1''' into the bone material, a corresponding tool in the manner of a screw driver may be applied to engage with the slots 88, thereby making sure that the inner surface of the receiving channel 10 is free of load and therefore cannot be damaged during insertion. With respect to the tri-oval cross section of the receiving channel 10 in the embodiment shown, the slots 88 may be positioned "matching" the cross section, i.e. they may be positioned in the main directions featuring the local maxima of the radius, or they may be positioned with a certain offset with respect to the main directions.

As shown in FIGS. 26 through 28, in all preferred embodiments, the implant 1, 1', 1", 1''' is equipped with a further highly beneficial feature, which also by itself or in combination of any number of the features disclosed above is considered an independent invention. According to this feature, the implant 1, 1', 1", 1''' as part of its inner connection system 80 comprises a feedback structure 90 giving feedback to the user after a connection pin or the like of an associated second implant part (e.g. an abutment) has been properly and fully inserted into the receiving channel of the implant 1, 1', 1". In order to provide this feedback, the feedback system 90 comprises a slot or groove 92 positioned on the inner surface of the receiving channel, in the embodiments shown at its bottom end 84, circularly surrounding the receiving channel 10. This circular groove 92 can interact with or receive one or more corresponding projection(s) of a dental fitting, such as the dental fitting described in the patent application EP16151231.4 and/or of a projection of a of a retention element such as the one described in the patent application EP15178180.4 with the same applicant, both applications being hereby incorporated by reference. As soon as the connection pin has been fully and correctly inserted into the receiving channel 10, these projections snap into the groove 92 with an audible "clicking" sound, thereby confirming to the user that proper insertion of the contact pin into the receiving channel 10 has been completed.

Figure 29:
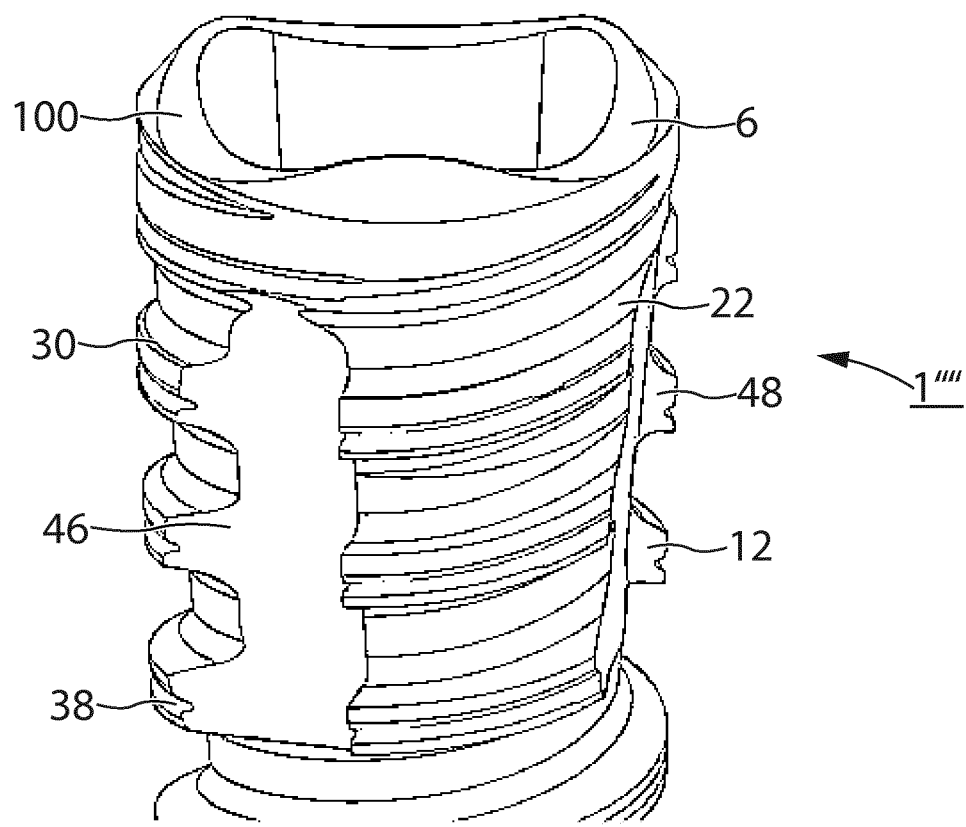
FIG. 29 is a side perspective view of the coronal section of a dental implant according to another embodiment of the invention.
Figure 30:
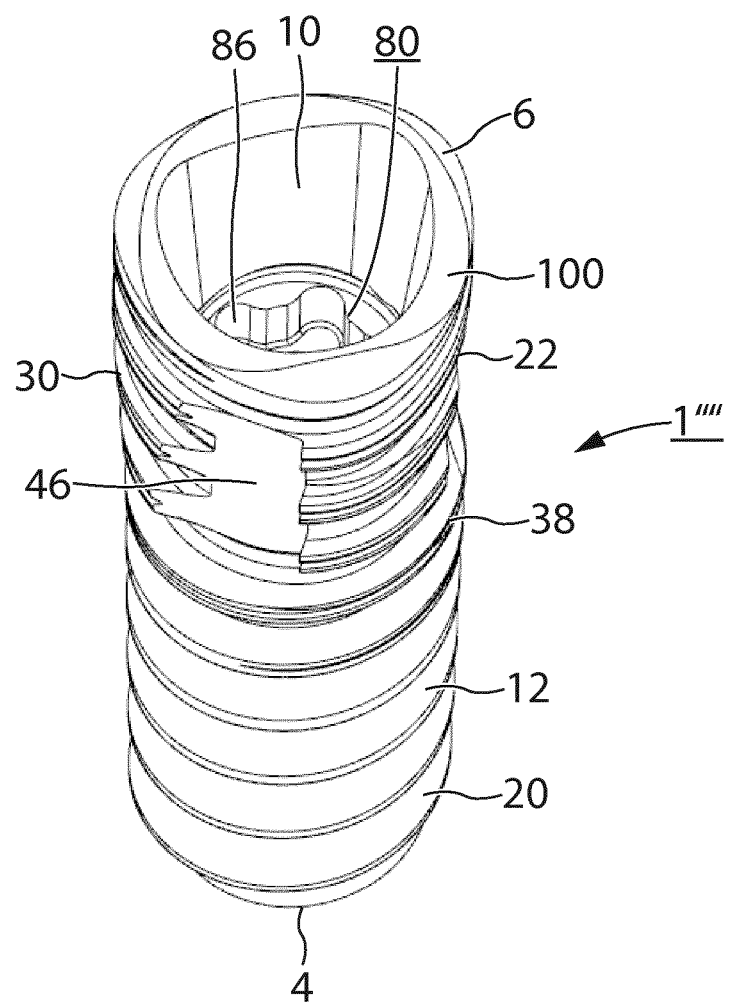
FIG. 30 is a side perspective view of the dental implant of FIG. 29.
Figure 31:
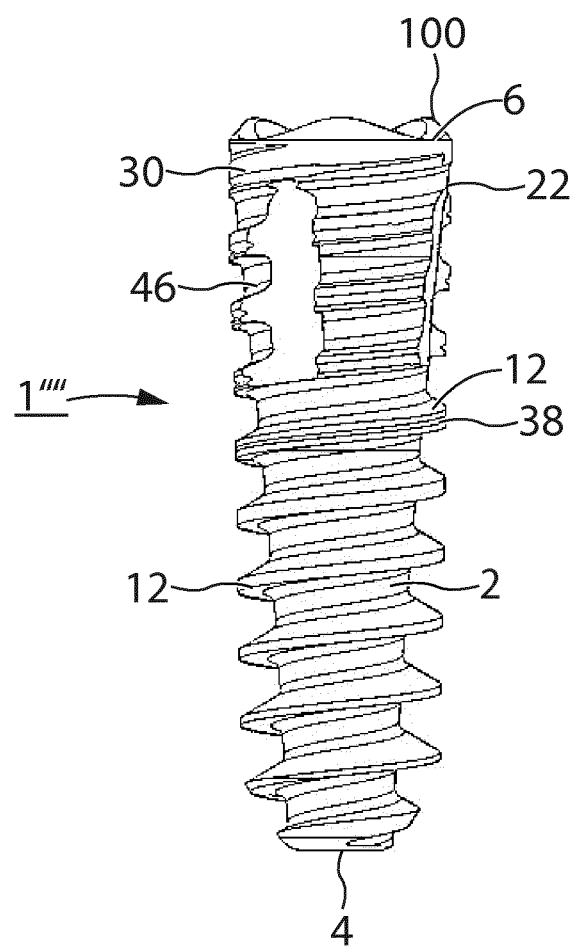
FIG. 31 is a side view of the dental implant of FIG. 29.

In yet another alternative embodiment of an implant 1'''' as shown in FIGS. 29, 30, and 31 (side view), the coronal end 6 has a specific, shaped design. This feature, which also by itself or in combination of any number of the features disclosed above is considered an independent invention, provides improved positional orientation of the implant 1'''' upon insertion together with improved overall system strength. This is realized by the fact that the width of the top/upper or coronal surface 100 of the implant 1'''', i.e., the wall width of the implant 1'''', changes as a consequence of back taper and peaks and valleys, the bigger width being at the valleys and the lower width being at the peaks, as is shown in FIGS. 29 and 30.

Specifically, the coronal surface 100 of the implant 1'''' has an undulating, wavy or sinusoidal contour, with maxima and minima of the coronal surface 100, i.e., height maxima and minima in the longitudinal direction of the implant 1'''', being alternatingly arranged along the circumference of the coronal end 6 of the implant 1''''. At the maxima of the coronal surface 100 and, preferably, also in the vicinity of these maxima, the coronal end 6 of the implant 1'''' has a tapered shape or configuration, i.e., a back tapered shape or configuration, such that the lateral dimensions or extensions of the cross-section of the coronal end 6 perpendicular to the longitudinal direction of the implant 1'''' decrease along the direction from the apical end 4 of the implant 1'''' towards the coronal end 6 of the implant 1'''' (see FIGS. 29 and 30).

Due to this undulating, wavy or sinusoidal contour and the back tapered shape or configuration of the implant 1'''', the wall width of the implant 1'''', i.e., the width of the wall of the implant 1'''', at the coronal end 6 also varies. Specifically, the wall width is larger at the minima of the coronal surface 100 and smaller at the maxima of the coronal surface 100.

The above-identified features of the coronal surface 100, by themselves or in combination with any number of the features disclosed further above, are considered an independent invention. These features allow for a particularly reliable and simple identification of the orientation of the implant.

In the embodiment shown in FIG. 29, the implant 1'''' in its core shaped zone 22 and—due to the preferred design of "matching contours"—also in its thread shaped zone 30 has tri-oval cross sections, i.e. the respective cross section features three main directions in which the radius has local maxima. In synchronization with this cross sectional shape, in positions matching these main directions the coronal end 6, as seen in a direction parallel to the longitudinal axis of the implant 1'''', also has local maxima. In other words: the coronal surface 100 of the implant 1'''' is not a flat surface, but rather has a wavy, sinusoidal structure, as has been detailed above, with its maxima positioned in the main directions as defined by the shaped zones 22, 30.

Figure 32:
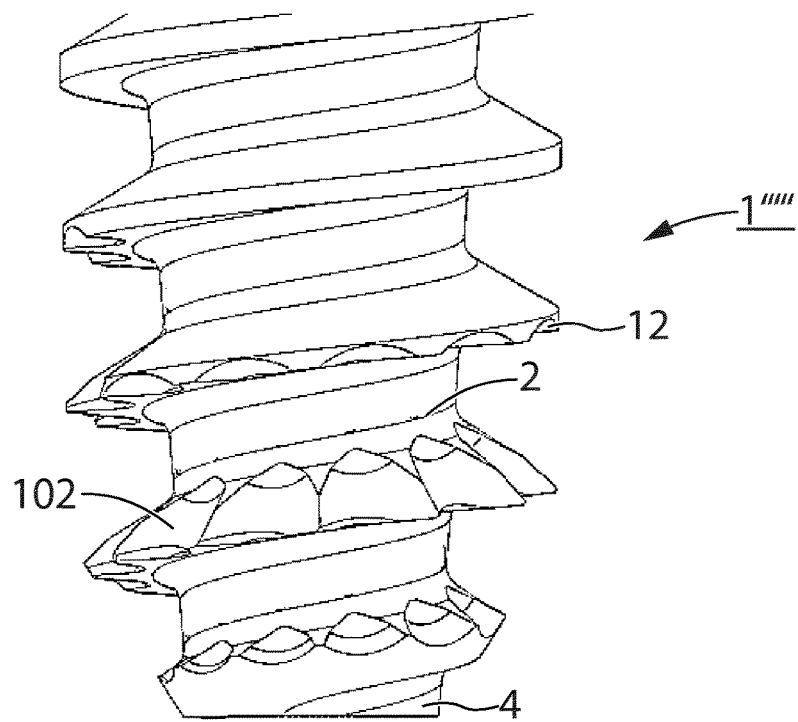
FIG. 32 is a side view of the tip portion of a dental implant according to another embodiment of the invention.

In yet another preferred embodiment of an implant 1'''', the tip or apical end 4, in particular with respect to the outer thread 12 in this section, may be designed specifically in order to facilitate insertion into the bone material. For this purpose, at least an apical portion of the thread 12 is serrated as can be seen in FIG. 32. In this embodiment a plurality of grooves 102 with at least a cutting edge can be defined in the apical and/or coronal face of the thread 12.

Figure 33:
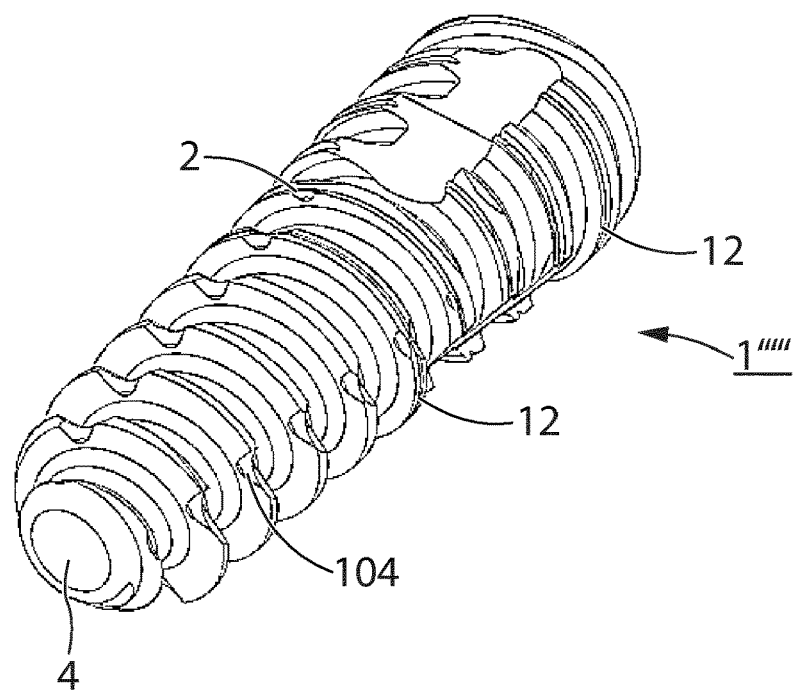
FIG. 33 is a bottom perspective view of a dental implant according to another embodiment of the invention.

FIG. 33 shows an embodiment of an implant according to the invention having at least one discontinued apical cutting flute 104 that can be defined (or milled or cut) at least in the apical half of the thread 12. As can be seen in FIG. 33, said cutting flute does not extend within the core of the implant. An implant according to this embodiment can also have two or more of such cutting flutes. Also in this embodiment, the thread can be considered as a serrated thread.

Said serrated thread helps insertion of the implant into a hole when used in a patient's extraction socket. As the angle of the socket wall is not perpendicular to the axis of the implant, one side of the wall will touch the implant first and influence the positioning of the implant. To help reduce this effect, the serrated thread cuts the bone on the side of the implant.

These features also by itself or in combination with any number of the features disclosed above is considered an independent invention.

Figure 34:
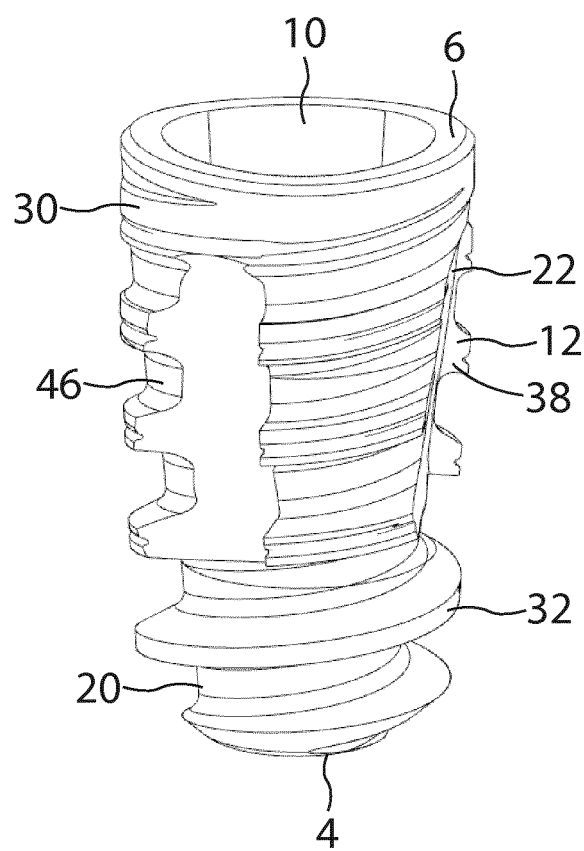
FIG. 34 is a side perspective view of a dental implant according to another embodiment of the invention.

The implant 1, 1', 1", 1''', 1'''', 1''''' in any of the embodiments described above or in any combination thereof in its total, overall length preferably is designed in accordance with the specific requirements as given by the individual treatment of the patient. In the embodiments shown in the figures above, a typical "standard" value of the overall length of the respective implant may be about 13 mm. In other embodiments, the implant may be designed in a "short version" with an overall length of e.g. about 7 mm. An example of this embodiment is shown in FIG. 34.

FIG. 36 shows an insertion tool 200 according to a first embodiment of the present invention.

Figure 36A:
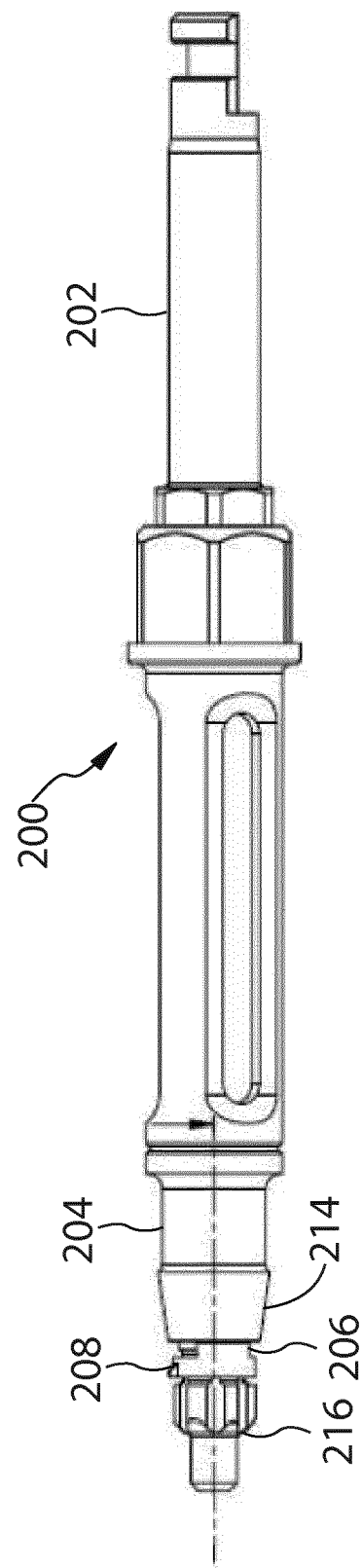
FIG. 36 shows an insertion tool according to a first embodiment of the present invention, wherein FIG. 36(*a*) is a side view of the entire insertion tool, FIG. 36(*b*) is an enlarged side view of a distal portion of the insertion tool, and FIG. 36(*c*) is a perspective view of the distal portion of the insertion tool.
Figure 36C:
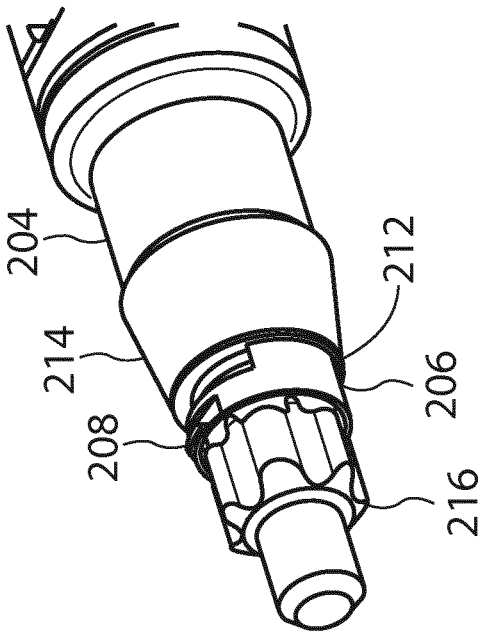
Figure 36B:
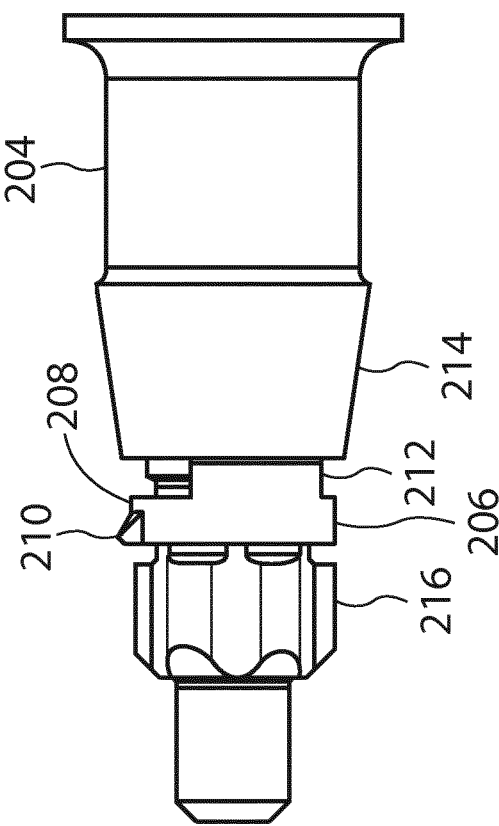

The insertion tool 200 is an insertion tool for inserting a dental implant into bone tissue of a patient. The insertion tool 200 comprises a proximal portion 202 and a distal portion 204, as is shown in FIG. 36(a). The distal portion 204 is configured for cooperation with the implant so as to screw the implant into the bone tissue.

The distal portion 204 has a retention element 206. The retention element 206 comprises an attachment portion 208 for attaching the insertion tool 200 to the dental implant. The retention element 206 is elastically deformable at least in all directions perpendicular to the longitudinal direction of the insertion tool 200, i.e., along all transverse directions of the retention element 206. The attachment portion 208 comprises one projection 210 (see FIG. 36(b)) extending in plural directions substantially perpendicular to the longitudinal direction of the insertion tool 200, i.e., along plural transverse directions of the retention element 206.

Figure 37A:
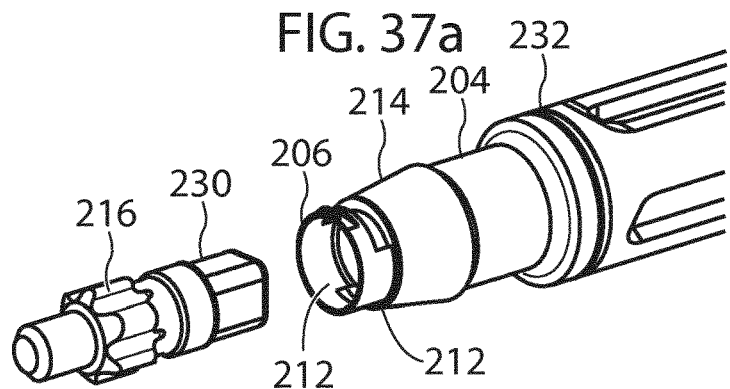
FIG. 37 shows the insertion tool according to the first embodiment of the present invention, wherein FIG. 37(*a*) is an exploded perspective view of the distal portion of the insertion tool, FIG. 37(*b*) is an exploded side view of the distal portion of the insertion tool, FIG. 37(*c*) is an exploded cross-sectional view of the distal portion of the insertion tool, and FIG. 37(*d*) is a cross-sectional view illustrating a state in which a part of the distal portion of the insertion tool is inserted into a dental implant.
Figure 37B:
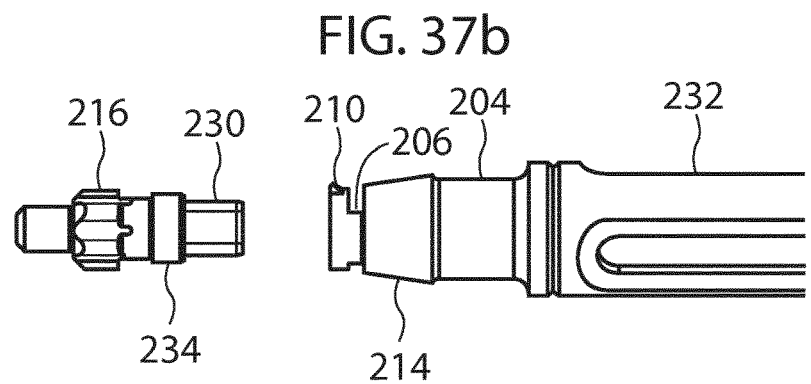
Figure 37C:
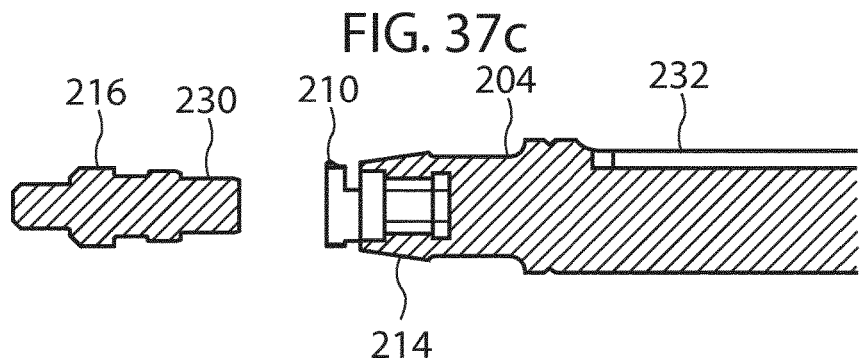

The retention element 206 is integrally formed with one of two parts, namely a proximal part, of the insertion tool 200 (see FIGS. 37(a) and (b)). Specifically, the retention element 206 is integrally formed with the proximal part of the insertion tool 200 through two link portions 212 arranged between the retention element 206 and the proximal part in the longitudinal direction of the retention element 206 (see FIGS. 36(c) and 37(a)). The link portions 212 each extend along only a part of the retention element 206 in a circumferential direction of the retention element 206, as is schematically shown, for example, in FIGS. 37(a) and (b). The link portions 212 are arranged substantially opposite to each other in the radial direction of the retention element 206.

The retention element 206 has a substantially cylindrical shape with a substantially circular cross-section perpendicular to the longitudinal direction of the retention element 206 (see FIG. 37(a)). The retention element 206 is formed as a hollow, tubular body. The retention element 206 has a closed ring shape or closed annular shape, i.e., the shape of a ring without an opening in the circumference thereof. The elastic deformability of the retention element 206 in all transverse directions thereof is provided by appropriately choosing the material and the wall thickness of the retention element 206.

The retention element 206 may be made of, for example, a metal, such as titanium, a titanium alloy or stainless steel, a polymer or a composite material.

Figure 37D:
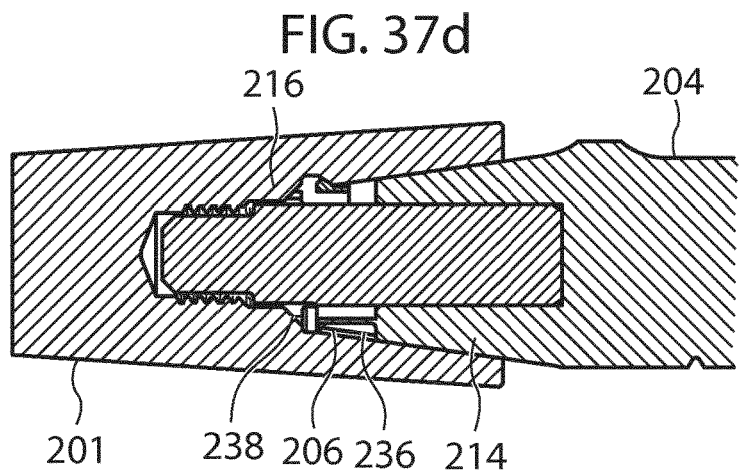

The retention element 206 can be elastically compressed in the transverse directions thereof when attaching the insertion tool 200 to the dental implant (e.g., FIGS. 37(d) and 39).

The projection 210 of the attachment portion 208 allows for the insertion tool 200 to be attached to the dental implant by snap fit, as will be explained in detail below with reference to FIGS. 37(d) and 39.

As is shown in FIG. 37(a), the projection 210 of the attachment portion 208 is provided between the two link portions 212. In this way, a particularly reliable and efficient snap fit of the attachment portion 208 and the dental implant can be ensured.

The distal portion 204 of the insertion tool 200 has a drive region 214 (see, e.g., FIGS. 36 to 38). In the drive region 214, the cross-section of the distal portion 204 perpendicular to the longitudinal direction of the insertion tool 200 has a number of main directions in which the radius measuring the distance between the center of the cross-section and its outer contour takes a relative maximum value and thus a higher value than in neighbouring orientations (see FIG. 38(d)).

The drive region 214 of the distal portion 204 of the insertion tool 200 cooperates with the implant. The drive region 214 constitutes an anti-rotational structure. The drive region 214 is configured to avoid relative rotation between the insertion tool 200 and the implant, about the longitudinal axis of the tool 200, when tool 200 and implant are engaged with each other, e.g., by partly introducing the distal portion 204 of the tool 200 into an implant socket.

The drive region 214 is configured to cooperate with a corresponding anti-rotational structure, i.e., a drive portion, of the implant (see FIGS. 37(d) and 39), as will be explained in further detail below.

The main directions in the drive region 214 of the insertion tool 200, in which the respective radius of the cross-section has a local maximum, are positioned axially symmetrically with respect to the central longitudinal axis of the insertion tool 200 (see FIG. 38(d)). The number of main directions in the drive region 214 is three, i.e., the drive region 214 has a trioval cross-section, as is shown in FIG. 38(d). In combination with the symmetrical positioning of the main directions with respect to the longitudinal direction of the insertion tool 200, this triovality results in a rotational offset angle between two neighboring main directions of 120°.

The drive region 214 has a tapered configuration such that, in the drive region 214, the lateral dimensions or extensions of the cross-section of the distal portion 204 perpendicular to the longitudinal direction of the insertion tool 200 decrease along the direction from the proximal end of the insertion tool 200 towards the distal end of the insertion tool 200 (see FIGS. 36, 37 and 38).

The drive region 214 is arranged proximally of the retention element 206.

The cross-sectional shape of the drive region 214 allows for an efficient, reliable and homogeneous transfer of a rotational force applied to the insertion tool 200 about its longitudinal axis to the implant.

In a modification of the first embodiment of the insertion tool 200 shown FIG. 38(e), the tool 200 does not have a drive region. Rather, as is depicted in FIG. 38(e), the cross-section taken along the line A-A in FIG. 38(c) has a circular shape.

The distal portion 204 of the insertion tool 200 further has a drive section 216. In the drive section 216, the cross-section of the distal portion 204 perpendicular to the longitudinal direction of the insertion tool 200 has a plurality of radially convex portions 218 and a plurality of radially concave portions 220 which are alternatingly arranged along the circumference of the cross-section (see FIG. 38(f)). Each of the radially outermost points 222, 224 of the radially convex portions 218 lies on a respective circle around the center of the cross-section, as is shown in FIG. 38(f).

The cross-section of the distal portion 204 of the insertion tool 200 in the drive section 216 has the same number of radially convex portions 218 and radially concave portions 220, namely 6 of each.

The radially convex portions 218 comprise first radially convex portions and second radially convex portions, wherein the radially outermost points 222 of the first radially convex portions all lie on a single first circle around the center of the cross-section, and the radially outermost points 224 of the second radially convex portions all lie on a single second circle around the center of the cross-section. The second circle has a smaller radius than the first circle (see FIG. 38(f)). The first radially convex portions and the second radially convex portions are alternatingly arranged along the circumference of the cross-section, with the respective radially concave portions 220 disposed therebetween. The number of the first radially convex portions is the same as the number of the second radially convex portions.

The radially convex portions 218 and the radially concave portions 220 of the cross-section of the drive section 216 each have a curved shape, e.g., an at least partially circular shape, an at least partially elliptical shape, an at least partially oval shape or the like. The radially convex portions 218 and the radially concave portions 220 are arranged directly adjacent to each other.

The radially innermost points 226 of the radially concave portions 220 lie on a single circle 228 around the center of the cross-section. Thus, all the radially innermost points 226 of the radially concave portions 220 lie on the same circle 228 around the center of the cross-section.

The drive section 216 may have a length in the longitudinal direction of the insertion tool in the range of 0.5 to 1.2 mm.

The drive section 216 of the distal portion 204 of the insertion tool 200 cooperates with the implant. The drive section 216 constitutes an anti-rotational structure. The drive section 216 is configured to avoid relative rotation between the insertion tool 200 and the implant, about the longitudinal axis of the tool 200, when tool 200 and implant are engaged with each other, e.g., by, at least partly, introducing the distal portion 204 of the tool 200 into an implant socket.

The drive section 216 is configured to cooperate with a corresponding anti-rotational structure, i.e., a drive zone, of the implant (see FIGS. 37(d) and 39), as will be explained in further detail below.

The distal portion 204 of the insertion tool 200 according to the first embodiment of the invention thus has the drive region 214 and the drive section 216. The drive region 214 is arranged proximally of the drive section 216 (see FIGS. 36 to 38).

Due to the presence of two anti-rotational structures on the distal portion 204 of the insertion tool 200, i.e., the drive region 214 and the drive section 216, which can cooperate with two corresponding anti-rotational structures on the implant, i.e., the drive portion and the drive zone, the rotational force or load applied to the implant upon insertion thereof into bone tissue can be shared by the two structures. Thus, any damage to either of these two structures in the implant can be minimised. Hence, one or both of these structures in the implant can be reliably and efficiently used as an index for an abutment, a scan post, an impression post or the like after insertion of the implant into bone tissue.

The drive region 214 and the drive section 216 further help in accurately positioning the insertion tool 200 relative to the implant. Due to the cross-sectional shapes of these elements, only three relative rotational positions between tool 200 and implant are possible.

The distal portion 204 of the insertion tool 200 further has the retention element 206, as has been detailed above. The drive section 216, the retention element 206 and the drive region 214 are arranged in this order in the direction from the distal end of the insertion tool 200 towards the proximal end of the insertion tool 200.

The insertion tool 200 consists of two separate parts, i.e., a distal part 230 and a proximal part 232, which are attached to each other, as is shown in FIG. 37 (a) to (c).

The distal part 230 of the insertion tool has a protrusion which fits into a corresponding recess of the proximal part 232 of the insertion tool 200 (see FIGS. 37 (c) and (d)). The distal part 230 and the proximal part 232 are attached to each other by inserting the protrusion into the recess. The protrusion is held in place inside the recess by friction fit by means of a press fit shoulder 234 of the distal part 230 arranged distally of the protrusion (see FIG. 37(b)). The press fit shoulder 234 further has a sealing function against liquids.

The protrusion and the recess have corresponding anti-rotational structures so as to prevent any rotation of the distal part 230 and the proximal part 232 relative to each other about the longitudinal axis of the insertion tool 200. The anti-rotational structure of the distal part 230 has a cross-section, i.e., an outer cross-section of the protrusion, perpendicular to the longitudinal direction of the insertion tool 200 which is non-circular, namely substantially square (see FIG. 37(a)). The anti-rotational structure of the distal part 230 of the insertion tool 200 can cooperate with the corresponding anti-rotational structure of the proximal part 232 of the insertion tool 200. The anti-rotational structure of the proximal part 232 of the insertion tool 200 has a cross-section, i.e., an inner cross-section of the recess, perpendicular to the longitudinal direction of the insertion tool 200 which is non-circular, namely substantially square. The cross-sections of the anti-rotational structures of the distal part 230 and the proximal part 232 are substantially the same.

The distal part 230 comprises the drive section 216 and the proximal part 232 comprises the retention element 206 and the drive region 214. In this way, production of the insertion tool 200, in particular, production of the retention element 206, can be significantly simplified.

The retention element 206 is integrally formed with the proximal part 232.

FIGS. 37(d) and 39 show a combination of the insertion tool 200 according to the first embodiment of the present invention and a dental implant 201 according to an embodiment of the present invention in a state in which a part of the distal portion 204 of the insertion tool 200 is inserted into the implant 201. In the state shown in these drawings, the insertion tool 200 is fully engaged with the implant 201.

The dental implant 201 is made of a metal, for example, titanium, a titanium alloy or stainless steel.

The dental implant 201 is for insertion into bone tissue of a patient. The dental implant 201 comprises a core body 205 having an apical end 207 and a coronal end 209, as is shown in FIG. 39(a).

Figure 39A:
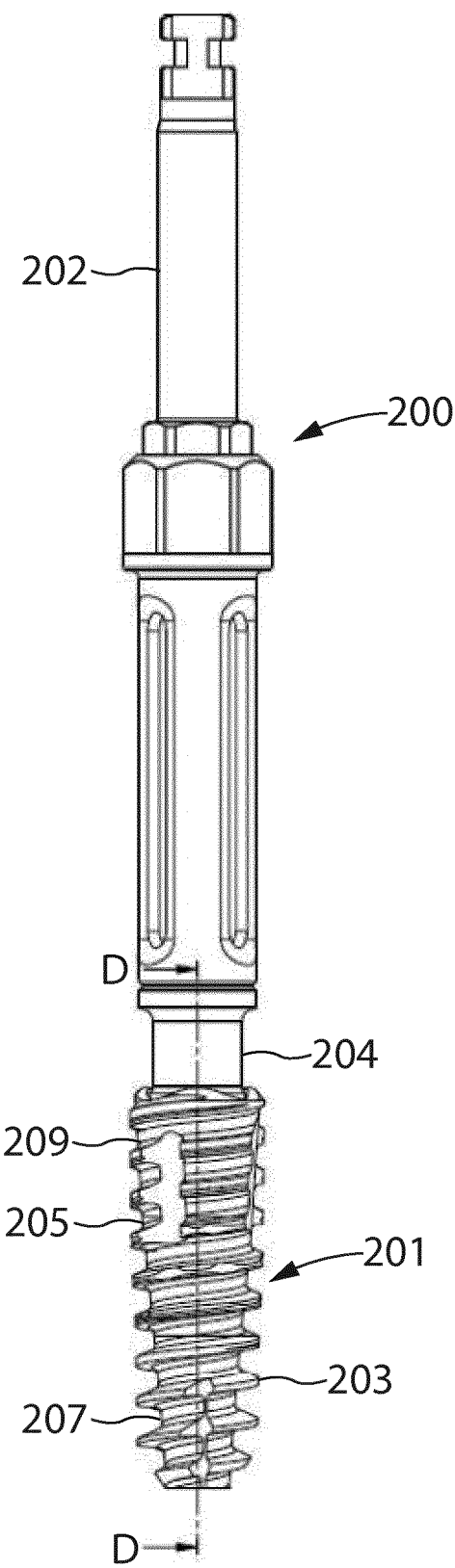
FIG. 39 shows a combination of the insertion tool according to the first embodiment of the present invention and a dental implant, wherein FIG. 39(*a*) is a side view of the combination in a state in which the insertion tool is attached to the implant, FIG. 39(*b*) is a cross-sectional view of the distal portion of the insertion tool and a coronal portion of the implant taken along the line D-D in FIG. 39(*a*), and FIG. 39(*c*) is a cross-sectional view of the coronal portion of the implant taken along the line E-E in FIG. 39(*b*)
Figure 39B:
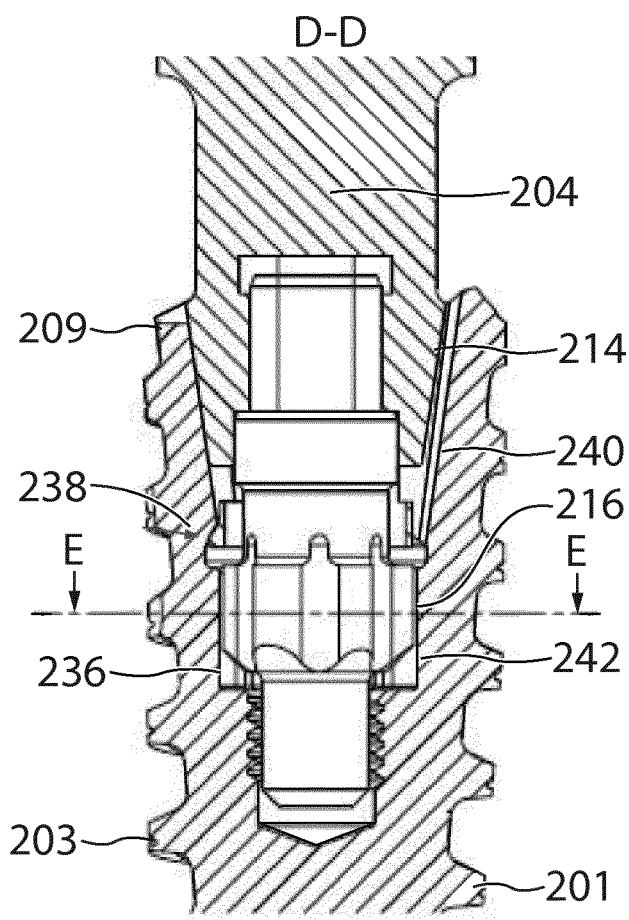

The dental implant 201 has a socket or channel 236 (see FIGS. 37(d) and 39(b)) formed at the coronal portion of the implant 201, for receiving a part of the distal portion 204 of the insertion tool 200 including the retention element 206. The core body 205 comprises the channel 236. The channel 236 is open to the coronal end 209 and extends along the longitudinal direction of the implant 201 from the coronal end 209 towards the apical end 207 (see FIGS. 39(a) and (b)).

The coronal portion of the implant 201 is formed with an annular cavity 238 (see FIGS. 37(d) and 39(b)) for receiving the projection 210 of the attachment portion 208 of the retention element 206. Therefore, the attachment portion 208 of the retention element 206 can be securely held within the coronal portion of the implant 201 by snap fit.

Further, the dental implant 201 has an outer threaded portion 203 for screwing the implant 201 into a patient's jaw bone tissue (see FIGS. 39(a) and (b)).

When attaching the insertion tool 200 to the dental implant 201, the part of the distal portion 204 of the insertion tool 200 is inserted into the channel 236 of the implant 201 so that the protrusion 210 of the attachment portion 208 of the retention element 206 are received in the annular cavity 238 formed in the coronal portion of the implant 201. Hence, the retention element 206 is securely held within this coronal portion by snap fit, thus reliably attaching the insertion tool 200 to the implant 201.

In the process of attaching the insertion tool 200 to the implant 201, the retention element 206 is first elastically deformed, i.e., elastically compressed, in the transverse directions thereof upon insertion of the retention element 206 into the channel 236, and subsequently restored to its initial shape, once the projection 210 is received in the annular cavity 238. This "snap in" process of the projection 210 provides an audible and tactile feedback to the user of the insertion tool 200, such as a clinician or a technician, e.g., in a dental laboratory, indicating that the insertion tool is properly seated in the implant 201 (see FIGS. 37(d) and 39).

In this fully engaged state of the insertion tool 200, the insertion tool 200 may be used to pick up the implant 201 and transport it to the implantation site where it is to be inserted into the bone tissue. Due to the reliable engagement of the tool 200 with the implant 201, any risk of the implant 201 dropping off from the insertion tool 200 before it has reached the desired location can be reliably avoided.

Further, in this fully engaged state of the insertion tool 200, the drive region 214 and the drive section 216 of the distal portion 204 of the insertion tool 200 are in engagement with a drive portion 240 and a drive zone 242 of the implant 201, respectively, as is shown in FIGS. 39(b) and (c). The core body 205 of the implant 201 has the drive portion 240 and the drive zone 242. The drive zone 242 is arranged apically of the drive portion 240, as is shown in FIG. 39(b).

In the drive portion 240 of the implant 201, the cross-section, i.e., the inner cross-section, of the channel 236 of the implant 201 perpendicular to the longitudinal direction of the implant 201 has a number of main directions in which the radius measuring the distance between the center of the cross-section and its outer contour takes a relative maximum value and thus a higher value than in neighbouring orientations. The cross-sections of the drive region 214 of the insertion tool 200 and the drive portion 240 of the implant 201 are substantially the same.

The drive portion 240 has a tapered configuration such that, in the drive portion 240, the lateral dimensions of the cross-section of the channel 236 perpendicular to the longitudinal direction of the implant 201 decrease along the direction from the coronal end 209 towards the apical end 207, as is shown in FIG. 39(b).

Figure 39C:
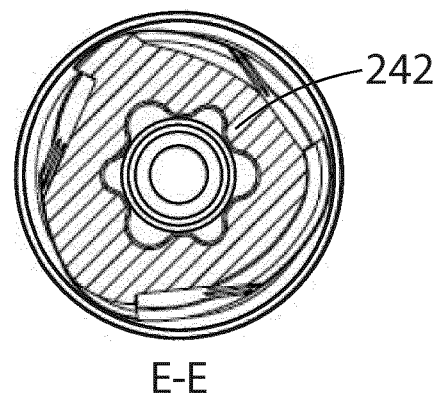

In the drive zone 242 of the implant 201, the cross-section, i.e., the inner cross-section, of the channel 236 of the implant 201 perpendicular to the longitudinal direction of the implant 201 has a plurality of radially convex portions and can have a plurality of radially concave portions which are alternatingly arranged along the circumference of the cross-section, wherein each of the radially outermost points of the radially convex portions lies on a respective circle around the center of the cross-section, as is shown in FIG. 39(c).

The cross-section of the channel 236 of the implant 201 in the drive zone 242 has the same number of radially convex portions and radially concave portions, namely 6 of each (see FIG. 39(c)).

The radially convex portions of the drive zone 242 comprise first radially convex portions and second radially convex portions, wherein the radially outermost points of the first radially convex portions all lie on a single first circle around the center of the cross-section, and the radially outermost points of the second radially convex portions all lie on a single second circle around the center of the cross-section. The second circle has a smaller radius than the first circle. The first radially convex portions and the second radially convex portions are alternatingly arranged along the circumference of the cross-section of the drive zone 242, with the respective radially concave portions disposed therebetween. The number of the first radially convex portions is the same as the number of the second radially convex portions.

The radially convex portions and the radially concave portions of the cross-section of the drive zone 242 each have a curved shape, e.g., an at least partially circular shape, an at least partially elliptical shape, an at least partially oval shape or the like. The radially convex portions and the radially concave portions are arranged directly adjacent to each other.

The radially innermost points of the radially concave portions lie on a single circle around the center of the cross-section. Thus, all the radially innermost points of the radially concave portions lie on the same circle around the center of the cross-section.

The drive zone 242 may have a length in the longitudinal direction of the dental implant 201 in the range of 0.5 to 1.2 mm.

The cross-sections of the drive section 216 of the insertion tool 200 and the drive zone 242 of the implant 201 are substantially the same.

Hence, the implant 201 can be screwed into the bone tissue by the cooperation or interaction between the drive region 214 and the drive section 216 of the distal portion 204 of the insertion tool 200 and the drive portion 240 and the drive zone 242 of the implant 201, respectively. As has been indicated above, due to the presence of the drive region 214 and the drive section 216, which can cooperate with the drive portion 240 and the drive zone 242, the rotational force or load applied to the implant 201 upon insertion thereof into bone tissue can be shared by the two structures, thus minimising the risk of damage to the implant 201.

Figure 40A:
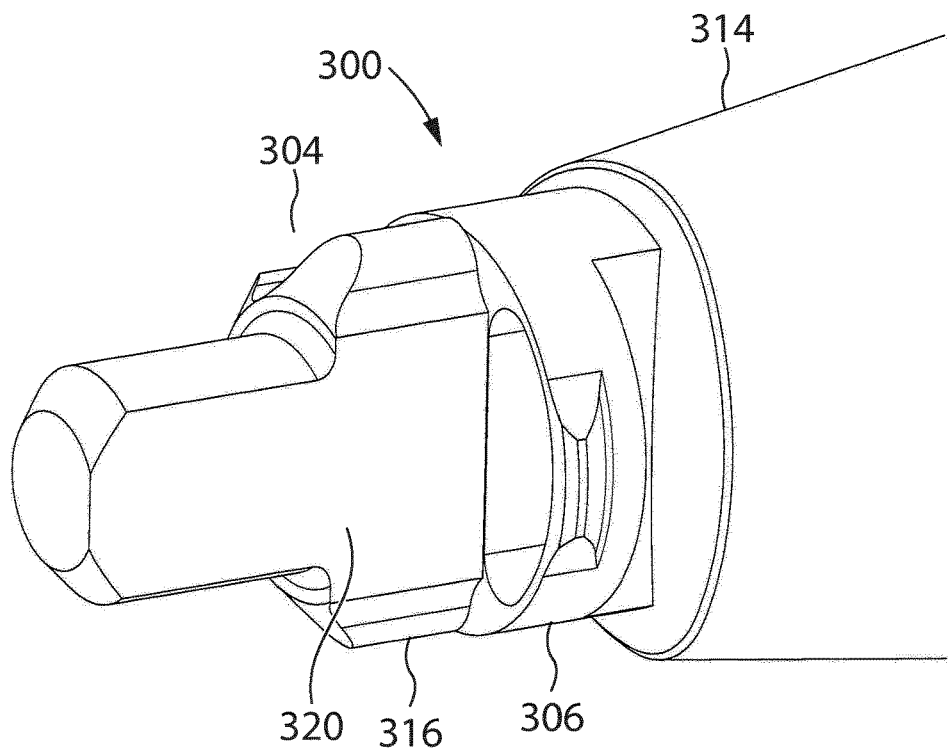
FIG. 40 shows an insertion tool according to a second embodiment of the present invention, wherein FIGS. 40(*a*) and (*b*) are perspective views of a distal portion of the insertion tool taken from different angles.
Figure 40B:
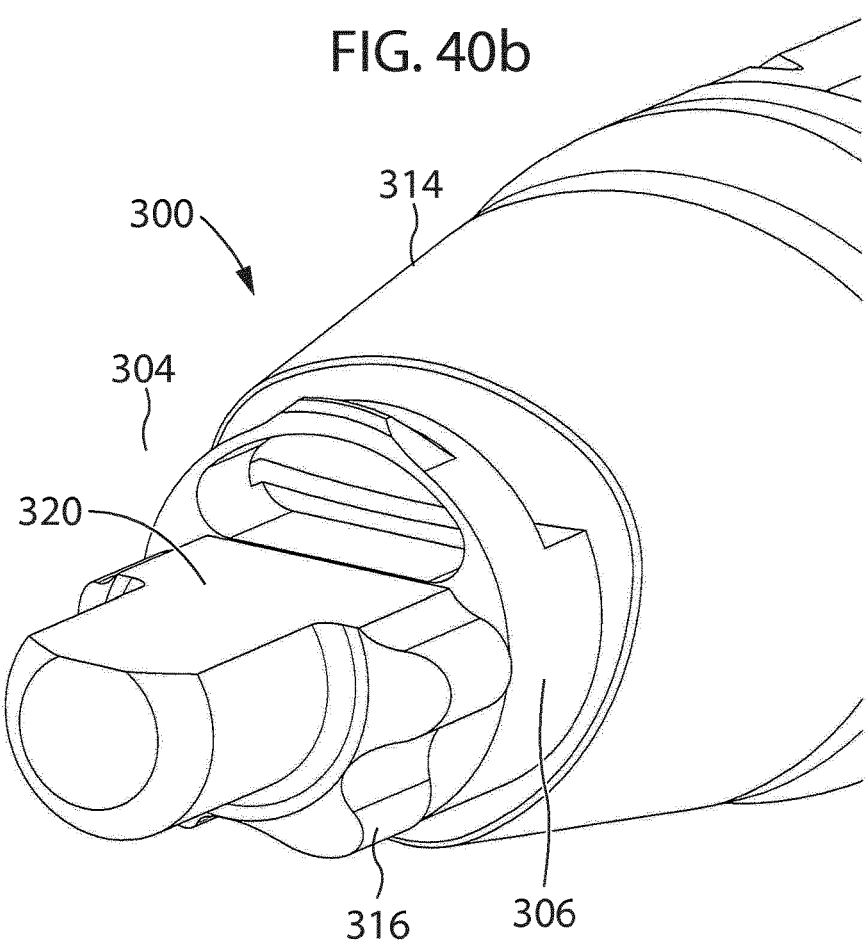

FIG. 40 shows an insertion tool 300 according to a second embodiment of the present invention. The insertion tool 300 according to the second embodiment differs from the insertion tool 200 according to the second embodiment, inter alia, in that the insertion tool 300 consists of a single piece of material. Thus, all the components of the insertion tool 300 are integrally formed with each other.

The general structure and functionality of the insertion tool 300 are substantially the same as those of the insertion tool 200. Specifically, the insertion tool 300 has a proximal portion (not shown) and a distal portion 304. The distal portion 304 has a drive section 316, a retention element 306 and a drive region 314 which are arranged in this order in the direction from the distal end of the insertion tool 300 towards the proximal end of the insertion tool 300, as is shown in FIGS. 40(a) and (b). Further, the insertion tool 300 has a cut-out portion 320 at the drive section 316 which facilitates production of the insertion tool 300, in particular, with regard to the manufacture of the retention element 306.

FIGS. 41 and 42 show a dental implant 401 according to an embodiment of the present invention.

The dental implant 401 is a self-cutting dental implant for insertion into a jawbone or bone tissue of a patient. The dental implant 401 comprises a core body 402 having an apical end 404, a coronal end 406, and an outer surface 408 extending along the longitudinal direction of the implant 401 between the apical end 404 and the coronal end 406, as is shown in FIG. 41(a).

The dental implant 401 is made of a metal, for example, titanium, a titanium alloy or stainless steel.

The implant 401 further comprises a thread 412 extending outwardly from the core body 402 (see FIGS. 41(a) and (c) and FIGS. 42 (a) and (b)). The thread 412 has a thread angle of approximately 10°.

The thread 412 has an apical surface 414, facing towards the apical end 404 of the core body 402, and a coronal surface 416, facing towards the coronal end 406 of the core body 402. The thread 412 has a first flute 418, i.e., a first cutting flute 418, formed therein (see FIG. 41 (a) and (b) and FIG. 42(b)). The first flute 418 extends from an apical end of the thread 412 towards a coronal end of the thread 412. As is shown in FIG. 42(b), the first flute 418 extends over the first three complete turns of the thread 412.

The thread 412 has, at an apical portion thereof, a recess 420 formed in its coronal surface 416, the recess 420 extending in the direction from the coronal surface 416 towards the apical surface 414 along part of the thickness of the thread 412. The recess 420 is open to the first flute 418, as is shown in FIGS. 41(a) and 42(b). The recess 420 is provided adjacent, i.e., directly adjacent, to the first flute 418. The recess 420 has a cutting function, i.e., a function of cutting bone tissue.

Figure 42A:
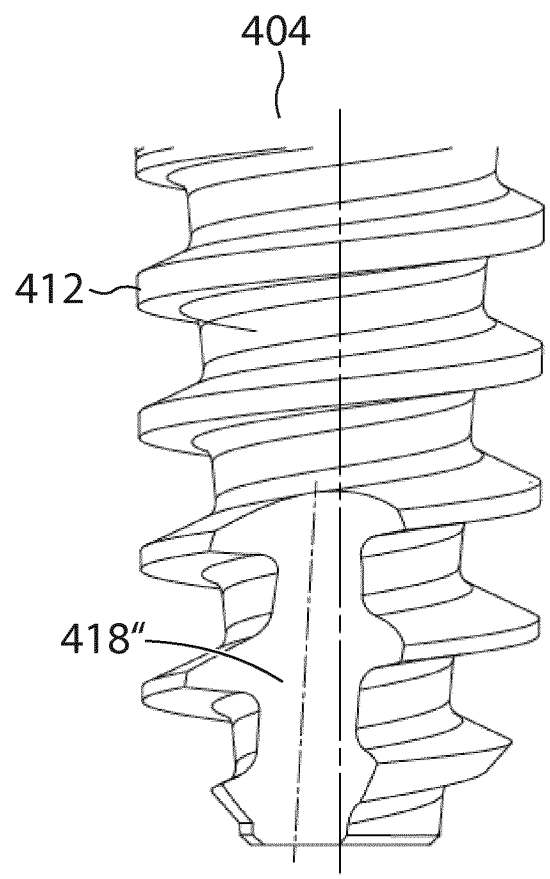
FIG. 42 shows the dental implant according to the embodiment of the present invention, wherein FIG. 42(*a*) is a side view of an apical portion of the implant in the direction of the arrow K shown in FIG. 41(*c*), FIG. 42(*b*) is a side view of the apical portion of the implant in the direction of the arrow J shown in FIG. 41(*c*), FIG. 42(*c*) is an enlarged view of the encircled area M shown in FIG. 41(*c*), and FIG. 42(*d*) is an enlarged view of the encircled area G shown in FIG. 41(*b*)
Figure 42B:
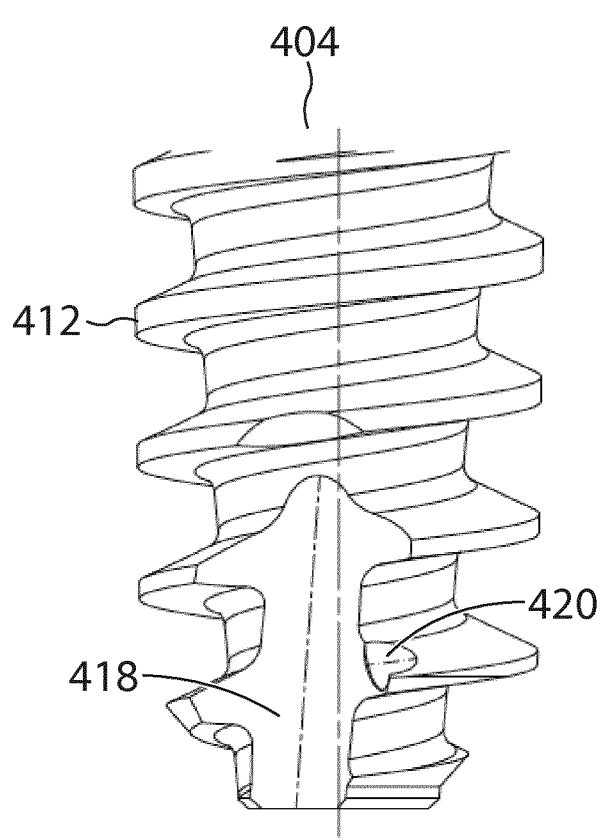
Figure 42C:
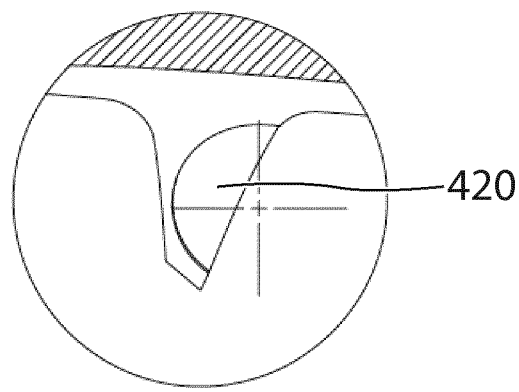
Figure 42D:
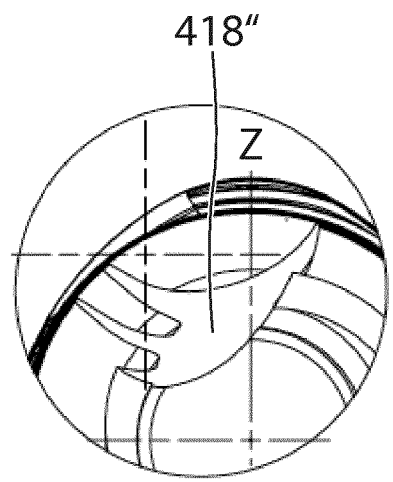

The thread 412 further has a second flute 418' and a third flute 418" (see FIGS. 41(a) and (b) and FIGS. 42(a) and (d)). The first to third flutes 418, 418', 418" are arranged in a staggered or shifted arrangement along the length of the thread 412 and along the circumference of the thread 412. Specifically, the second flute 418' is staggered or shifted relative to the first flute 418 along the length and the circumference of the thread 412, as is shown in FIG. 41(a). The third flute 418" is arranged opposite to the first flute 418 in the radial direction of the implant 401 and disposed at substantially the same height or length position of the thread 412 (see FIGS. 41(b) and 42(a) and (b)). The first to third flutes 418, 418', 418" and the recess 420 render the implant 401 self-cutting.

The first and third flutes 418, 418" extend in a direction which is inclined or tilted with respect to the longitudinal direction of the implant 401 (see FIGS. 42(a) and (b)). The second flute 418' extends in a direction substantially parallel to the longitudinal direction of the implant 401 (see FIG. 41(a)).

The first to third flutes 418, 418', 418" extend, in the width directions of the flutes, along part of the circumference of the core body 402.

The extension of the recess 420 in the direction from the coronal surface 416 towards the apical surface 414, i.e., the depth of the recess 420, varies along the directions parallel to the coronal surface 416 (see FIGS. 41 (c) and 42(b) and (c)). In particular, the depth of the recess 420 decreases along the direction circumferentially away from the first flute 418, as is shown in FIG. 42(b). In this way, a particularly efficient cutting functionality of the recess 420 is achieved.

The largest depth of the recess 420 thus exists at the portion of the recess 420 which is arranged directly adjacent to the first flute 418.

Specifically, the recess 420 has the approximate shape of a quarter sphere, as is indicated in FIGS. 41(c) and 42(b) and (c). This shape of the recess 420 allows for the recess 420, and thus also the implant 401, to be manufactured in a particularly simple and cost-efficient manner.

The recess 420 is arranged on the upstream side of the first flute 418 in the rotation direction of the implant 401 (see FIG. 42(b)).

The recess 420 is formed in the coronal surface 416 of the thread 412 at the first complete turn of the thread 412, i.e., the most apical complete turn of the thread 412, as is shown in FIGS. 41(a) and (c) and 42(b). This arrangement of the recess 420 allows for a particularly stable and robust engagement of the implant 401 with the jawbone or bone tissue.

The recess 420 helps to efficiently cut and remove bone material and, further, to transport the removed bone material towards the coronal end 406 of the core body 402.

The implant 401 of the present embodiment allows for the insertion thereof into bone tissue with reduced force and with a high degree of accuracy. In this way, a particularly stable and robust connection or engagement of the implant 401 with the bone tissue, i.e., a high implant stability, can be achieved.

Due to the arrangement of the recess 420 in the coronal surface 416 of the thread 412, these advantageous effects can be achieved for substantially all implant thread angles, in particular, for small implant thread angles, such as the thread angle of approximately 10° of the thread 412.

FIG. 43 shows a dental implant 501 according to an embodiment of the present invention.

Figure 43A:
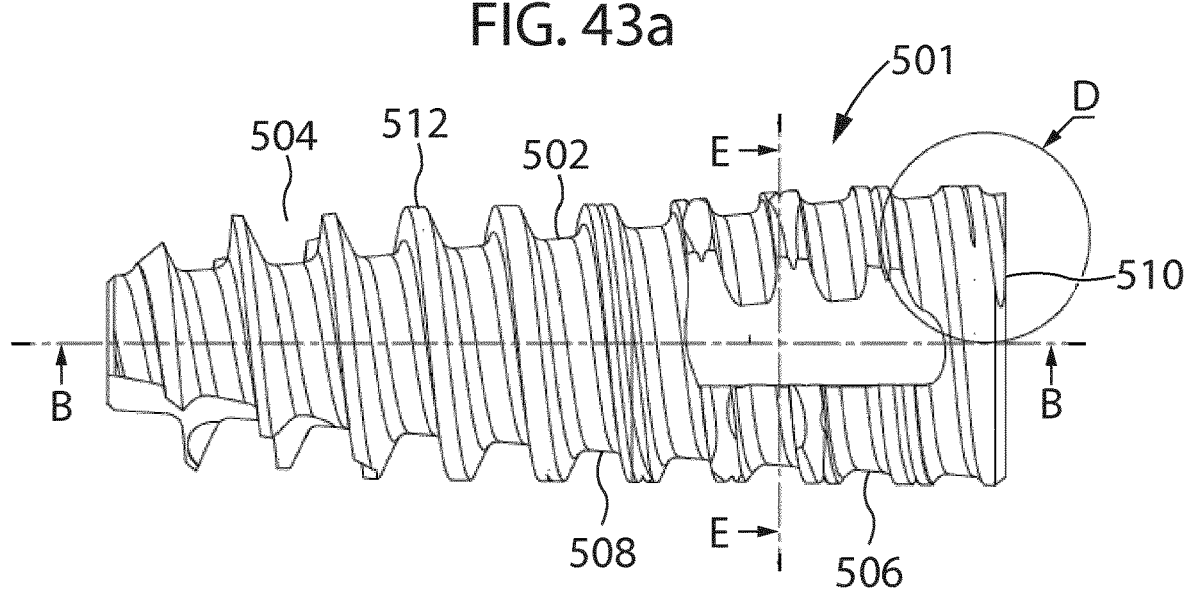
FIG. 43 shows a dental implant according to another embodiment of the present invention, wherein FIG. 43(*a*) is a side view of the implant, FIG. 43(*b*) is a cross-sectional view of the implant taken along the line B-B in FIG. 43(*a*), and FIG. 43(*c*) is a top view of the implant.

The dental implant 501 is a self-cutting dental implant for insertion into a jawbone or bone tissue of a patient. The dental implant 501 comprises a core body 502 having an apical end 504, a coronal end 506, and an outer surface 508 extending along the longitudinal direction of the implant 501 between the apical end 504 and the coronal end 506, as is shown in FIG. 43(a). The implant 501 further comprises a thread 512 extending outwardly from the core body 502 (see FIGS. 43(a) and (b)).

The dental implant 501 is made of a metal, for example, titanium, a titanium alloy or stainless steel.

The outer configuration of the dental implant 501 may be substantially the same as that of any one of the dental implants disclosed above, e.g., the dental implant 1 which is, for example, shown in FIGS. 1, 3, 6 and 7.

Specifically, the dental implant 501 may have a first core shaped zone in which the cross-section of the core body 502 has a number of main directions in which the radius measuring the distance between the center of the cross-section and its outer contour takes a relative maximum value and thus a higher value than in neighbouring orientations. In particular, the core body 502 in the first core shaped zone may have a trioval cross-section (see FIG. 43(c)).

The dental implant 501 may have a core circular zone in which the cross-section of the core body 502 is basically circularly shaped.

The dental implant 501 may have a core transition zone positioned between the core shaped zone and the core circular zone, in which core transition zone the geometry of the cross-section of the core body 502, as a function of a parameter characteristic for a coordinate in the longitudinal direction, changes continuously from a basically circular shape next to the core circular zone to a shape in which the cross-section of the core body 502 corresponds to the shape of the cross-section in the first core shaped zone. In particular, the core body 502 in the core transition zone may have a trioval cross-section.

Figure 43B:
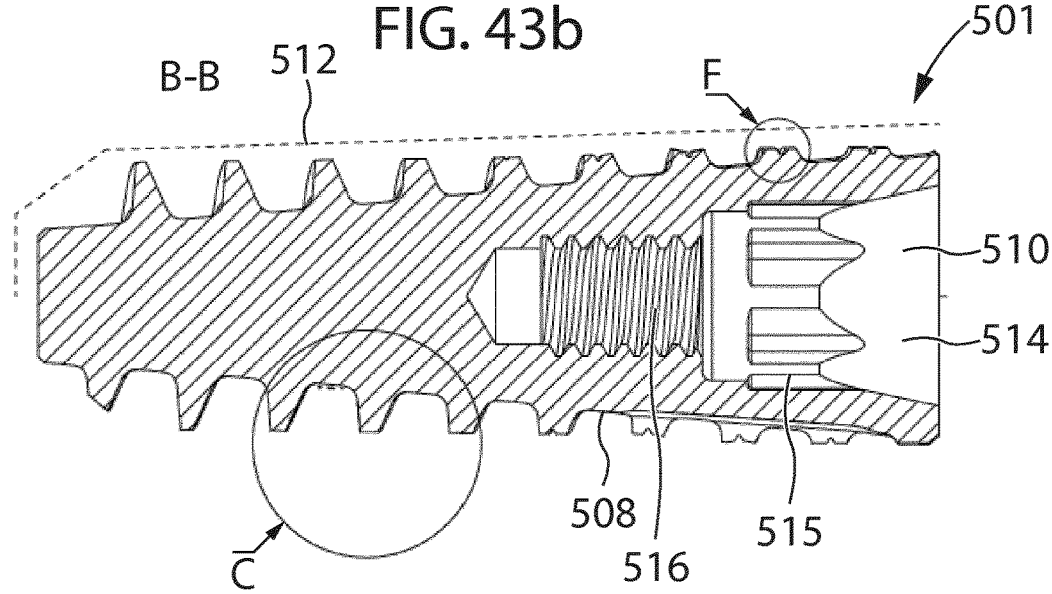
Figure 43C:
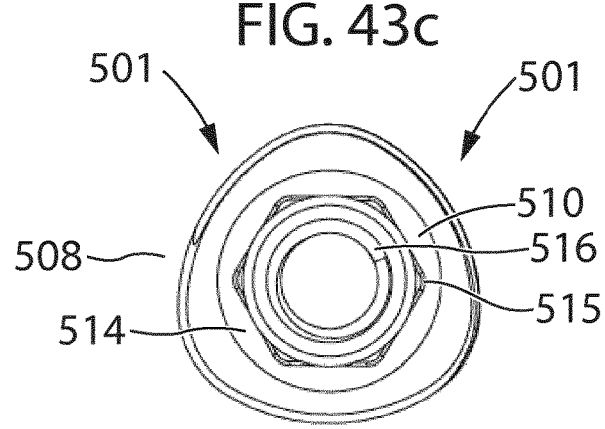

The dental implant 501 has a socket or channel 510 (see FIG. 43(a) to (c)) formed at the coronal portion of the implant 501. The channel 510 is open to the coronal end 506 of the implant 501 and extends along the longitudinal direction of the implant 501 from the coronal end 506 towards the apical end 504 thereof.

The core body 502 has a hexagonal interlock recess 515 in which the cross-section of the channel 510 perpendicular to the longitudinal direction of the implant 501 has a substantially hexagonal shape.

The channel 510 comprises a conical portion 514, the hexagonal interlock recess 515 and an internally threaded portion 516 (see FIGS. 43(b) and (c)) which are arranged in this order in the direction from the coronal end 506 of the implant 501 towards the apical end 504 of the implant 501. The conical portion 514 and the hexagonal interlock recess 515 are configured to receive an abutment and the tip portion of the insertion tool 200, 300, and the internally threaded portion 516 is configured to receive a coupling screw for fixing the abutment to the dental implant 501.

The conical portion 514 has a side wall that tapers inwardly with respect to the longitudinal axis of the dental implant 501, providing a wider initial opening for the channel 510 at the coronal end 506 of the implant 501. The particular geometry of the conical portion 514 defines a conical half angle with respect to the longitudinal axis of the dental implant 501. This conical half angle may be between about 10° and about 20° degrees. That is, the angle between the inner wall of the conical portion 514 and a longitudinal center line of the dental implant 501 may be between about 10° and about 20°. In one embodiment, the conical half angle is about 12°.

The ratio between the length of the conical portion 514 in the longitudinal direction of the implant 501 and the length of the hexagonal interlock recess 515 in the longitudinal direction of the implant 501 may be about 1:1. The length of the conical portion 514 may be at least about 1 mm and the length of the hexagonal interlock recess 515 may be at least about 1 mm. The length of the conical portion 514 is a distance measured in a vertical direction from the top surface of the implant 501 to the portion of the channel 510 in which the tapered surfaces of the conical portion 514 terminate. The length of the hexagonal interlock recess 515 is measured in a vertical direction from the end of the conical portion 514 to the end of the hexagonal interlock recess 515.

The ratios and lengths of the conical portion 514 and the hexagonal interlock recess 515 advantageously combine the benefits of a sufficiently long tapered connection to provide an effective seal and a sufficiently long hexagonal interlock recess 515 such that a sufficient driving torque can be transmitted to the implant 501 when the implant 501 is driven into the patient's jawbone.

The features of all the embodiments of the dental implant of the present invention described above can be combined with each other or be taken in isolation from each other. The features of all the embodiments of the insertion tool of the present invention described above can be combined with each other or be taken in isolation from each other.

LIST OF REFERENCE NUMERALS 1, 1', 1",
1''', 1'''',
201, 401,
501 Dental implant
2, 205,
402, 502 Core body
4, 207,
404, 504 Apical end
6, 209,
406, 506 Coronal end
8, 408,
508 Outer surface
10, 236,
510 Receiving channel
12, 203,
412, 512 Thread
20 Core circular zone
22 Core shaped zone
24 Crestal platform zone
26 Core transition zone
26' Second core shaped zone
28 Enveloping volume
30 Thread shaped zone
32 Thread circular zone
34 Thread transition zone
34' Second thread shaped zone
38 groove
40 groove shaped zone
42 Crestal zone
43 Crossover position
44 transition line
46 Cutting flute
48 cutting edge
50 center of cross section
52 line
54 point
56 dotted line
58 Free width
60 apical face
62 coronal face
64 longitudinal axis
66 line
70 bone tissue
72 void
74 platform
80 connection system
82 Arrow
84 bottom end
86 Indexing contour
88 slot
90 feedback structure
92 groove
100 coronal surface
102 grooves
104 apical cutting flute
200, 300 insertion tool
202 proximal portion
204, 304 distal portion
206, 306 retention element
208 attachment portion
210 projection
212 link portion
214, 314 drive region
216, 316 drive section
218 radially convex portion
220 radially concave portion
222, 224 radially outermost points of radially convex portions
226 radially innermost points of radially concave portions
228 circle around center of cross-section
230 distal part
232 proximal part
234 press fit shoulder
238 annular cavity 240 drive portion
242 drive zone
320 cut-out portion
414 apical thread surface
416 coronal thread surface
418, 418'
418" flutes
420 recess
514 conical portion
515 hexagonal interlock recess
516 internally threaded portion

The invention claimed is:

1. Dental implant, for insertion into bone tissue of a patient, comprising:
   a core body having an apical end, a coronal end, and an outer surface extending along a longitudinal direction between said apical end and said coronal end;
   at least one thread extending outwardly from said core body and extending longitudinally from an apical portion to a coronal portion of the core body, and
   a characteristic implant volume defined by said outer surface of said core body from which the at least one thread extends, in which each cross section of said characteristic implant volume perpendicular to the longitudinal direction is characterized by an eccentricity parameter, each eccentricity parameter defined as a ratio of a maximum distance of an outer contour of the cross section from a center to a minimum distance of the outer contour of the cross section from the center;
   wherein said characteristic volume comprises:
      at least one coronal zone in which said eccentricity parameter of the at least one coronal zone has a constant value, said coronal zone extending along an implant's longitudinal axis over a coronal zone length of at least 10% of a total length of the implant, wherein the at least one coronal zone comprises a maximum eccentricity parameter of the characteristic implant volume;
      at least one apical zone in which said eccentricity parameter of the at least one apical zone has a constant value, wherein the at least one apical zone comprises a minimum eccentricity parameter of the characteristic implant volume, and
      at least one transition zone positioned between said coronal zone and said apical zone in which said eccentricity parameter of the at least one transition zone, changes continuously along the longitudinal direction, from a minimum value next to said apical zone to a maximum value next to said coronal zone, said transition zone extending along the implant's longitudinal axis over a transition zone length of at least 10% of the total length of the implant.

2. The dental implant of claim 1, wherein said apical zone extends along the implant's longitudinal axis over an apical zone length of at least 30% of the total length of the implant.

3. The dental implant of claim 1, wherein in said apical zone, the cross section of said characteristic implant volume has an approximately circular shape.

4. The dental implant according to claim 1, wherein in said coronal zone the cross section of said characteristic implant volume has a number of maximum radii, each of the number of maximum radii of the coronal zone comprising the maximum distance of the outer contour of the cross section from the center of the coronal zone.

5. The dental implant according to claim 4, wherein said number of maximum radii are positioned symmetrically with respect to the implant's longitudinal axis.

6. The dental implant according to claim 4, wherein a number of cutting flutes is provided at least in said transition zone.

7. The dental implant according to claim 6, wherein the number of cutting flutes is equal to the number of maximum radii.

8. The dental implant according to claim 6, wherein said number of cutting flutes are positioned symmetrically with respect to the implant's longitudinal axis of said core body.

9. The dental implant of claim 1, further comprising a second characteristic implant volume defined by said thread, wherein each cross section of said characteristic implant volume along the longitudinal direction is characterized by a thread eccentricity parameter defined as the ratio of a maximum radius of the outer contour of the cross section of the thread to a minimum radius of the outer contour of the cross section of the thread,
   wherein said second characteristic volume comprises:
      at least one coronal zone in which said thread eccentricity parameter of the at least one coronal zone has a constant volume, said coronal zone extending along the implant's longitudinal axis over a coronal zone length of at least 10% of a total length of the implant, wherein the at least one coronal zone comprises a maximum thread eccentricity parameter of the second characteristic volume;
      at least one apical zone in which said thread eccentricity parameter of the at least one apical zone has a constant value, wherein the at least one apical zone comprises a minimum thread eccentricity parameter of the second characteristic volume, and
      at least one transition zone positioned between said coronal zone and said apical zone in which said thread eccentricity parameter of the at least one transition zone, changes continuously along the longitudinal direction, from a minimum value next to said apical zone to a maximum value next to said coronal zone, said transition zone extending along the implant's longitudinal axis over a transition zone length of at least 10% of the total length of the implant.

10. The dental implant according to claim 1, wherein an outer contour of said thread with respect to the implant's longitudinal axis matches the outer contour of said core body.

11. The dental implant according to claim 1, wherein said core body in at least part of said transition zone has a trioval cross section.

12. The dental implant according to claim 1, wherein said core body in said transition zone is tapered.

13. The dental implant according to claim 1, wherein said transition zone, as seen in said longitudinal direction, starts at a distance of 2 to 4 mm from said apical end.

14. The dental implant according to claim 1, wherein said thread comprises a flat outer surface, the flat outer surface parallel to the implant's longitudinal axis.

15. The dental implant according to claim 14, wherein a width of the thread, in said longitudinal direction and starting from the apical end of said core body, is continuously increasing along the longitudinal direction with increasing distance from said apical end.

16. The dental implant according to claim 1,
   wherein the core body comprises a channel which is open to the coronal end and extends along the longitudinal direction from the coronal end towards the apical end, and
   wherein the core body has a drive zone, wherein in the drive zone, the cross-section of the channel perpendicular to the longitudinal direction has a plurality of radially convex portions arranged along a circumference of the cross section,
   wherein each radially outermost point of the radially convex portions lies on a respective circle around the center of the cross-section, at least two of these circles having different radii from each other.

17. The dental implant according to claim 1, wherein said eccentricity parameter defined as the ratio of the maximum distance of the outer contour of the cross section from the center to the minimum distance of the outer contour of the cross section from the center of the at least one transition zone changes continuously in a linear manner along the longitudinal direction from the minimum value next to said apical zone to the maximum value next to said coronal zone.

18. Dental implant, for insertion into bone tissue of a patient, comprising:
a core body having an apical end, a coronal end, and an outer surface extending along a longitudinal direction between said apical end and said coronal end;
at least one thread extending outwardly from said core body and extending longitudinally from an apical portion to a coronal portion of the core body, and
a characteristic implant volume defined by said thread, in which each cross section of said characteristic implant volume perpendicular to the longitudinal direction is characterized by an eccentricity parameter, each eccentricity parameter defined as a ratio of a maximum distance of an outer contour of the thread of the cross section from a center to a minimum distance of the outer contour of the thread of the cross section from the center;
wherein said characteristic volume comprises:
at least one coronal zone in which said eccentricity parameter of the at least one coronal zone has a constant value, said coronal zone extending along an implant's longitudinal axis over a coronal zone length of at least 10% of a total length of the implant, wherein the at least one coronal zone comprises a maximum eccentricity parameter of the characteristic implant volume;
at least one apical zone in which said eccentricity parameter of the at least one apical zone has a constant value, wherein the at least one apical zone comprises a minimum eccentricity parameter of the characteristic implant volume, and
at least one transition zone positioned between said coronal zone and said apical zone in which said eccentricity parameter of the at least one transition zone, changes continuously along the longitudinal direction, from a minimum value next to said apical zone to a maximum value next to said coronal zone, said transition zone extending along the implant's longitudinal axis over a transition zone length of at least 10% of the total length of the implant.

19. The dental implant of claim 18, wherein said apical zone extends along the implant's longitudinal axis over an apical zone length of at least 30% of the total length of the implant.

20. The dental implant of claim 18, wherein in said apical zone, the cross section of said characteristic implant volume has an approximately circular shape.

21. The dental implant according to claim 18, wherein in said coronal zone, the cross section of said characteristic implant volume has a number of maximum radii, each of the number of maximum radii of the coronal zone comprising the maximum distance of the outer contour of the cross section from the center of the coronal zone.

22. The dental implant according to claim 21, wherein said number of maximum radii are positioned symmetrically with respect to the implant's longitudinal axis.

23. The dental implant according to claim 21, wherein a number of cutting flutes is provided at least in said transition zone.

24. The dental implant according to claim 23, wherein the number of cutting flutes is equal to the number of maximum radii.

25. The dental implant according to claim 23, wherein said number of cutting flutes are positioned symmetrically with respect to the implant's longitudinal axis.

26. The dental implant of claim 18, further comprising a second characteristic implant volume defined by said outer surface of said core body from which the at least one thread extends, wherein each cross section of said characteristic implant volume perpendicular to the longitudinal direction is characterized by a core eccentricity parameter defined as a ratio of a maximum radius of an outer contour of the cross section to a minimum radius of the outer contour of the cross section,
wherein said characteristic volume comprises:
at least one coronal zone in which said core eccentricity parameter of the at least one coronal zone has a constant volume, said coronal zone extending along the implant's longitudinal axis over a coronal zone length of at least 10% of a total length of the implant, wherein the at least one coronal zone comprises a maximum core eccentricity parameter of the second characteristic volume;
at least one apical zone in which said core eccentricity parameter of the at least one apical zone has a constant value, wherein the at least one apical zone comprises a minimum core eccentricity parameter of the second characteristic volume, and
at least one transition zone positioned between said coronal zone and said apical zone in which said core eccentricity parameter of the at least one transition zone, changes continuously along the longitudinal direction, from a minimum value next to said apical zone to a maximum value next to said coronal zone, said transition zone extending along the implant's longitudinal axis over a transition zone length of at least 10% of the total length of the implant.

27. The dental implant according to claim 18, wherein the outer contour of said thread with respect to the implant's longitudinal axis matches an outer contour of said core body.

28. The dental implant according to claim 18, wherein said core body in at least part of said transition zone has a trioval cross section.

29. The dental implant according to claim 18, wherein said core body in said transition zone is tapered.

30. The dental implant according to claim 18, wherein said transition zone, as seen in said longitudinal direction, starts at a distance of 2 to 4 mm from said apical end.

31. The dental implant according to claim 18, wherein said thread comprises a flat outer surface, the flat outer surface parallel to the implant's longitudinal axis.

32. The dental implant according to claim 31, wherein a width of the thread, in said longitudinal direction and starting from the apical end of said core body, is continuously increasing along the longitudinal direction with increasing distance from said apical end.

33. The dental implant according to claim 18,
wherein the core body comprises a channel which is open to the coronal end and extends along the longitudinal direction from the coronal end towards the apical end, and
wherein the core body has a drive zone, wherein in the drive zone, the cross-section of the channel perpendicular to the longitudinal direction has a plurality of radially convex portions arranged along a circumference of the cross section,
wherein each radially outermost point of the radially convex portions lies on a respective circle around the center of the cross-section, at least two of these circles having different radii from each other.

\* \* \* \* \*

UNITED STATES PATENT AND TRADEMARK OFFICE
CERTIFICATE OF CORRECTION

PATENT NO. : 11,602,417 B2
APPLICATION NO. : 16/073744
DATED : March 14, 2023
INVENTOR(S) : Jorg Weitzel It is certified that error appears in the above-identified patent and that said Letters Patent is hereby corrected as shown below:

On the Title Page

Column 1, Item (30), Line 1, under Foreign Application Priority Data, delete "Dec. 22, 2016 (EP) … 16206385" and insert
--Jan. 29, 2016 (EP) … 161534664
Sep. 27, 2016 (EP) … 16190958.5
Dec. 22, 2016 (EP) … 16206385.3--.

In the Specification

In Column 6, Line 5, delete "e. g." and insert --e.g.--.

In Column 33, Line 21, delete "34"," and insert --34',--.

In Column 48, Line 3, delete "FIG." and insert --FIGS.--.

In Column 51, Line 21 (Approx.), delete "FIG." and insert --FIGS.--.

In Column 53, Line 6, delete "FIG." and insert --FIGS.--.

In Column 53, Line 65, delete "1'''', 1''''',", and insert --1''', 1'''',--.

In the Claims

In Column 55, Claim 4, Line 57 (Approx.), delete "zone" and insert --zone,--.

Signed and Sealed this
Tenth Day of September, 2024

Katherine Kelly Vidal
*Director of the United States Patent and Trademark Office*